(12) United States Patent
Cooper et al.

(10) Patent No.: US 9,956,974 B2
(45) Date of Patent: May 1, 2018

(54) VEHICLE CONSIST CONFIGURATION CONTROL

(71) Applicant: General Electric Company, Schenectady, NY (US)

(72) Inventors: Jared Klineman Cooper, Melbourne, FL (US); Ajith Kuttannair Kumar, Erie, PA (US); Eugene Smith, Melbourne, FL (US); Nick David Nagrodsky, Melbourne, FL (US); William Cherrick Schoonmaker, Melbourne, FL (US); Todd William Goodermuth, Melbourne, FL (US)

(73) Assignee: General Electric Company, Schenectady, NY (US)

(*) Notice: Subject to any disclaimer, the term of this patent is extended or adjusted under 35 U.S.C. 154(b) by 486 days.

(21) Appl. No.: 13/900,307

(22) Filed: May 22, 2013

(65) Prior Publication Data

US 2013/0261842 A1 Oct. 3, 2013

Related U.S. Application Data

(63) Continuation-in-part of application No. 11/183,369, filed on Jul. 17, 2005, now abandoned, and a
(Continued)

(51) Int. Cl.
*G05D 1/00* (2006.01)
*G05D 3/00* (2006.01)
(Continued)

(52) U.S. Cl.
CPC .......... *B61L 15/0036* (2013.01); *B61C 17/12* (2013.01); *B61L 15/0027* (2013.01);
(Continued)

(58) Field of Classification Search
CPC ............ B61L 15/0063; B61L 15/0081; B61L 15/0027; B61L 15/0036; B61C 17/12
(Continued)

(56) References Cited

U.S. PATENT DOCUMENTS 2,628,335 A 2/1953 Drake
3,517,307 A 6/1970 Wallen, Jr. et al.
(Continued)

FOREIGN PATENT DOCUMENTS

CN 1451148 A 10/2003
CN 101184059 A 5/2008
(Continued)

OTHER PUBLICATIONS

Aharoni et al., "A Novel high-speed rail inspection system", NDT. net., vol. No.7, Issue No. 10, pp. 1-8, Oct. 2002.
(Continued)

*Primary Examiner* — Imran Mustafa
(74) *Attorney, Agent, or Firm* — Global Patent Operation; John A. Kramer

(57) ABSTRACT

A method includes obtaining data relating to operation of a first vehicle in a vehicle consist that includes the first vehicle and a second vehicle communicatively coupled with each other by a communication channel. The first vehicle includes a first electronic component performing functions for the first vehicle using the first data. The method also includes communicating the first data over the communication channel from the first vehicle to a second electronic component disposed onboard the second vehicle responsive to the first electronic component being unable to perform the one or more functions for the first vehicle using the first data. The method further includes performing the functions of the first electronic component with the second electronic component using the first data that is received from the first vehicle.

9 Claims, 29 Drawing Sheets

Related U.S. Application Data continuation-in-part of application No. 12/908,214, filed on Oct. 20, 2010, now Pat. No. 8,645,010.

(60) Provisional application No. 60/590,555, filed on Jul. 23, 2004, provisional application No. 61/253,877, filed on Oct. 22, 2009.

(51) Int. Cl.
  *G06F 7/00* (2006.01)
  *G06F 17/00* (2006.01)
  *B61L 15/00* (2006.01)
  *B61C 17/12* (2006.01)
  *B61L 25/02* (2006.01)

(52) U.S. Cl.
  CPC ....... *B61L 15/0063* (2013.01); *B61L 15/0072* (2013.01); *B61L 15/0081* (2013.01); *B61L 25/028* (2013.01); *Y02T 30/10* (2013.01)

(58) Field of Classification Search
  USPC .................................................. 701/1, 19
  See application file for complete search history.

(56) References Cited

U.S. PATENT DOCUMENTS

| | | |
|---|---|---|
| 3,562,419 A | 2/1971 | Stewart et al. |
| 3,594,912 A | 7/1971 | Sauterel |
| 3,604,359 A | 9/1971 | Doorley et al. |
| 3,696,243 A | 10/1972 | Risely |
| 3,821,932 A | 7/1974 | Theurer et al. |
| 3,828,440 A | 8/1974 | Plasser et al. |
| 3,835,950 A | 9/1974 | Asano et al. |
| 3,850,390 A | 11/1974 | Geiger |
| 3,864,039 A | 2/1975 | Wilmarth |
| 3,870,952 A | 3/1975 | Sibley |
| 3,875,865 A | 4/1975 | Plasser et al. |
| 3,896,665 A | 7/1975 | Goel |
| 3,924,461 A | 12/1975 | Stover |
| 3,937,068 A | 2/1976 | Joy |
| 3,960,005 A | 6/1976 | Vezina |
| 3,962,908 A | 6/1976 | Joy |
| 3,987,989 A | 10/1976 | Geiger |
| 3,995,560 A | 12/1976 | MacKintosh |
| 4,005,601 A | 2/1977 | Botello |
| 4,040,738 A | 8/1977 | Wagner |
| 4,044,594 A | 8/1977 | Owens et al. |
| 4,069,590 A | 1/1978 | Effinger |
| 4,117,529 A | 9/1978 | Stark et al. |
| 4,143,553 A | 3/1979 | Martens et al. |
| 4,145,018 A | 3/1979 | Poggio et al. |
| 4,155,176 A | 5/1979 | Goel et al. |
| 4,165,648 A | 8/1979 | Pagano |
| 4,173,073 A | 11/1979 | Fukazawa et al. |
| 4,174,636 A | 11/1979 | Pagano |
| 4,181,430 A | 1/1980 | Shirota et al. |
| 4,198,164 A | 4/1980 | Cantor |
| 4,207,569 A | 6/1980 | Meyer |
| 4,222,275 A | 9/1980 | Sholl et al. |
| 4,229,978 A | 10/1980 | Sholl et al. |
| 4,235,112 A | 11/1980 | Kaiser |
| 4,259,018 A | 3/1981 | Poirier |
| 4,288,855 A | 9/1981 | Panetti |
| 4,306,694 A | 12/1981 | Kuhn |
| 4,383,448 A | 5/1983 | Fujimoto et al. |
| 4,389,033 A | 6/1983 | Hardman |
| 4,391,134 A | 7/1983 | Theurer et al. |
| 4,417,466 A | 11/1983 | Panetti |
| 4,417,522 A | 11/1983 | Theurer et al. |
| 4,429,576 A | 2/1984 | Norris |
| 4,430,615 A | 2/1984 | Calvert |
| 4,442,988 A | 4/1984 | Laurent et al. |
| 4,457,178 A | 7/1984 | Turbe et al. |
| 4,467,430 A | 8/1984 | Even et al. |
| 4,468,966 A | 9/1984 | Bradshaw |
| 4,487,071 A | 12/1984 | Pagano et al. |
| 4,490,038 A | 12/1984 | Theurer et al. |
| 4,531,837 A | 7/1985 | Panetti |
| 4,538,061 A | 8/1985 | Jaquet |
| 4,541,182 A | 9/1985 | Panetti |
| 4,548,070 A | 10/1985 | Panetti |
| 4,577,494 A | 3/1986 | Jaeggi |
| 4,578,665 A | 3/1986 | Yang |
| 4,593,569 A | 6/1986 | Joy |
| 4,609,870 A | 9/1986 | Lale et al. |
| 4,615,218 A | 10/1986 | Pagano |
| 4,625,412 A | 12/1986 | Bradshaw |
| 4,654,973 A | 4/1987 | Worthy |
| 4,655,142 A | 4/1987 | Theurer et al. |
| 4,662,224 A | 5/1987 | Turbe |
| 4,689,995 A | 9/1987 | Turbe |
| 4,691,565 A | 9/1987 | Theurer |
| 4,700,223 A | 10/1987 | Shoutaro et al. |
| 4,700,574 A | 10/1987 | Turbe |
| 4,723,738 A | 2/1988 | Franke |
| 4,728,063 A | 3/1988 | Petit et al. |
| 4,735,384 A | 4/1988 | Elliott |
| 4,741,207 A | 5/1988 | Spangler |
| 4,763,526 A | 8/1988 | Pagano |
| 4,779,095 A | 10/1988 | Guerreri |
| 4,886,226 A | 12/1989 | Frielinghaus |
| 4,915,504 A | 4/1990 | Thurston |
| 4,932,618 A | 6/1990 | Davenport et al. |
| 4,979,392 A | 12/1990 | Guinon |
| 4,986,498 A | 1/1991 | Rotter et al. |
| 5,009,014 A | 4/1991 | Leach |
| 5,036,594 A | 8/1991 | Kesler et al. |
| 5,075,772 A | 12/1991 | Gebel |
| 5,086,591 A | 2/1992 | Panetti |
| 5,094,004 A | 3/1992 | Wooten |
| 5,101,358 A | 3/1992 | Panetti |
| 5,134,808 A | 8/1992 | Panetti |
| 5,140,776 A | 8/1992 | Isdahl et al. |
| 5,161,891 A | 11/1992 | Austill |
| 5,199,176 A | 4/1993 | Theurer et al. |
| 5,203,089 A | 4/1993 | Trefouel et al. |
| 5,253,830 A | 10/1993 | Nayer et al. |
| 5,275,051 A | 1/1994 | De Beer |
| 5,301,548 A | 4/1994 | Theurer |
| 5,339,692 A | 8/1994 | Shoenhair et al. |
| 5,341,683 A | 8/1994 | Searle |
| 5,353,512 A | 10/1994 | Theurer et al. |
| 5,386,727 A | 2/1995 | Searle |
| 5,419,196 A | 5/1995 | Havira et al. |
| 5,429,329 A | 7/1995 | Wallace et al. |
| 5,433,111 A | 7/1995 | Hershey et al. |
| 5,452,222 A | 9/1995 | Gray et al. |
| 5,475,597 A | 12/1995 | Buck |
| 5,522,265 A | 6/1996 | Jaeggi |
| 5,529,267 A | 6/1996 | Giras et al. |
| 5,530,328 A | 6/1996 | Fernandez et al. |
| 5,574,224 A | 11/1996 | Jaeggi |
| 5,578,758 A | 11/1996 | Havira et al. |
| 5,579,013 A | 11/1996 | Hershey et al. |
| 5,586,130 A | 12/1996 | Doyle |
| 5,598,782 A | 2/1997 | Wiseman et al. |
| 5,605,099 A | 2/1997 | Sroka et al. |
| 5,613,442 A | 3/1997 | Ahola et al. |
| 5,623,244 A | 4/1997 | Cooper |
| 5,627,508 A | 5/1997 | Cooper et al. |
| 5,628,479 A | 5/1997 | Ballinger |
| 5,636,026 A | 6/1997 | Mian et al. |
| 5,680,054 A | 10/1997 | Gauthier |
| 5,698,977 A | 12/1997 | Simpson et al. |
| 5,719,771 A | 2/1998 | Buck et al. |
| 5,720,455 A | 2/1998 | Kull et al. |
| 5,721,685 A | 2/1998 | Holland et al. |
| 5,738,311 A | 4/1998 | Fernandez |
| 5,740,547 A | 4/1998 | Kull et al. |
| 5,743,495 A | 4/1998 | Welles, II et al. |
| 5,751,144 A | 5/1998 | Weischedel |
| 5,756,903 A | 5/1998 | Norby et al. |
| 5,769,364 A | 6/1998 | Cipollone |

(56) References Cited

U.S. PATENT DOCUMENTS

| | | |
|---|---|---|
| 5,777,891 A | 7/1998 | Pagano et al. |
| 5,785,392 A | 7/1998 | Hart |
| 5,786,535 A | 7/1998 | Takeuchi et al. |
| 5,786,750 A | 7/1998 | Cooper |
| 5,791,063 A | 8/1998 | Kesler et al. |
| 5,804,731 A | 9/1998 | Jaeggi |
| 5,813,635 A | 9/1998 | Fernandez |
| 5,820,226 A | 10/1998 | Hart |
| 5,833,325 A | 11/1998 | Hart |
| 5,867,404 A | 2/1999 | Bryan |
| 5,924,654 A | 7/1999 | Anderson |
| 5,927,822 A | 7/1999 | Hart |
| 5,934,764 A | 8/1999 | Dimsa et al. |
| 5,950,967 A | 9/1999 | Montgomery |
| 5,956,664 A | 9/1999 | Bryan |
| 5,969,643 A * | 10/1999 | Curtis ............ B61L 3/004 340/933 |
| 5,970,438 A | 10/1999 | Clark et al. |
| 5,978,718 A | 11/1999 | Kull |
| 5,986,547 A | 11/1999 | Korver et al. |
| 5,986,577 A | 11/1999 | Bezos |
| 5,986,579 A | 11/1999 | Halvorson |
| 5,987,979 A | 11/1999 | Bryan |
| 5,992,241 A | 11/1999 | Posgay et al. |
| 5,995,881 A | 11/1999 | Kull |
| 6,026,687 A | 2/2000 | Jury |
| 6,055,862 A | 5/2000 | Martens |
| 6,064,428 A | 5/2000 | Trosino et al. |
| 6,102,340 A | 8/2000 | Peek et al. |
| 6,114,974 A | 9/2000 | Halvorson |
| 6,119,353 A | 9/2000 | Gronskov |
| 6,125,311 A | 9/2000 | Lo |
| 6,128,558 A | 10/2000 | Kernwein |
| 6,128,559 A | 10/2000 | Saitou et al. |
| 6,163,089 A | 12/2000 | Kull |
| 6,216,095 B1 | 4/2001 | Glista |
| 6,262,573 B1 | 7/2001 | Wojnarowski et al. |
| 6,273,521 B1 | 8/2001 | Halvorson et al. |
| 6,275,165 B1 | 8/2001 | Bezos |
| 6,322,025 B1 | 11/2001 | Colbert et al. |
| 6,324,659 B1 | 11/2001 | Pierro |
| 6,324,912 B1 | 12/2001 | Wooh |
| 6,347,265 B1 | 2/2002 | Bidaud |
| 6,349,653 B1 | 2/2002 | Siedlarczyk |
| 6,360,998 B1 | 3/2002 | Halvorson et al. |
| 6,377,215 B1 | 4/2002 | Halvorson et al. |
| 6,401,015 B1 | 6/2002 | Stewart et al. |
| 6,405,141 B1 | 6/2002 | Carr et al. |
| 6,415,522 B1 | 7/2002 | Ganz |
| 6,416,020 B1 | 7/2002 | Gronskov |
| 6,417,765 B1 | 7/2002 | Capanna |
| 6,435,624 B1 | 8/2002 | Kull et al. |
| 6,445,150 B1 | 9/2002 | Tanner et al. |
| 6,476,603 B2 | 11/2002 | Clark et al. |
| 6,499,339 B1 | 12/2002 | Hedstroem |
| 6,515,249 B1 | 2/2003 | Valley et al. |
| 6,516,668 B2 | 2/2003 | Havira et al. |
| 6,525,658 B2 | 2/2003 | Streetman et al. |
| 6,549,005 B1 | 4/2003 | Hay et al. |
| 6,553,838 B2 | 4/2003 | Amini |
| 6,556,945 B1 | 4/2003 | Burggraf et al. |
| 6,570,497 B2 | 5/2003 | Puckette, IV et al. |
| 6,571,636 B1 | 6/2003 | McWhorter |
| 6,574,748 B1 | 6/2003 | Andress et al. |
| 6,588,114 B1 | 7/2003 | Daigle |
| 6,604,421 B1 | 8/2003 | Li |
| 6,634,112 B2 | 10/2003 | Carr et al. |
| 6,647,891 B2 | 11/2003 | Holmes et al. |
| 6,668,239 B1 | 12/2003 | Gilbert et al. |
| 6,681,160 B2 | 1/2004 | Bidaud |
| 6,725,782 B1 | 4/2004 | Bloom et al. |
| 6,728,515 B1 | 4/2004 | Wooh |
| 6,742,392 B2 | 6/2004 | Gilmore et al. |
| 6,763,292 B1 | 7/2004 | Smith et al. |
| 6,778,284 B2 | 8/2004 | Casagrande |
| 6,779,761 B2 | 8/2004 | Holgate |
| 6,781,524 B1 | 8/2004 | Clark et al. |
| 6,782,044 B1 | 8/2004 | Wright et al. |
| 6,830,224 B2 | 12/2004 | Lewin et al. |
| 6,833,554 B2 | 12/2004 | Wooh |
| 6,845,953 B2 | 1/2005 | Kane et al. |
| 6,895,362 B2 | 5/2005 | Davenport et al. |
| 6,945,114 B2 | 9/2005 | Kenderian et al. |
| 6,951,132 B2 | 10/2005 | Davenport et al. |
| 6,976,324 B2 | 12/2005 | Theurer et al. |
| 7,007,561 B1 | 3/2006 | Otto et al. |
| 7,023,539 B2 | 4/2006 | Kowalski |
| 7,036,232 B2 | 5/2006 | Casagrande |
| 7,050,926 B2 | 5/2006 | Theurer et al. |
| 7,053,606 B2 | 5/2006 | Buttle et al. |
| 7,054,762 B2 | 5/2006 | Pagano et al. |
| 7,062,381 B1 | 6/2006 | Rekow et al. |
| 7,081,824 B2 | 7/2006 | Gilbert |
| 7,082,881 B2 | 8/2006 | Schneider et al. |
| 7,152,330 B2 | 12/2006 | Kleeberg |
| 7,164,368 B1 | 1/2007 | Ireland |
| 7,164,975 B2 | 1/2007 | Bidaud |
| 7,181,851 B2 | 2/2007 | Theurer et al. |
| 7,197,932 B2 | 4/2007 | Sakai et al. |
| 7,226,021 B1 | 6/2007 | Anderson et al. |
| 7,228,747 B2 | 6/2007 | Pieper |
| 7,263,886 B2 | 9/2007 | Jury |
| 7,264,208 B2 | 9/2007 | Kovach et al. |
| 7,285,926 B2 | 10/2007 | McGarry et al. |
| 7,296,770 B2 | 11/2007 | Franke |
| 7,305,885 B2 | 12/2007 | Barshinger et al. |
| 7,312,607 B2 | 12/2007 | Nygaard |
| 7,392,117 B1 | 6/2008 | Bilodeau et al. |
| 7,394,553 B2 | 7/2008 | Carr et al. |
| 7,403,296 B2 | 7/2008 | Farritor et al. |
| 7,416,262 B2 | 8/2008 | Ring |
| 7,463,348 B2 | 12/2008 | Chung |
| 7,502,670 B2 | 3/2009 | Harrison |
| 7,520,415 B2 | 4/2009 | Kral et al. |
| 7,539,596 B2 | 5/2009 | Zoll et al. |
| 7,575,201 B2 | 8/2009 | Bartonek |
| 7,616,329 B2 | 11/2009 | Villar et al. |
| 7,653,465 B1 | 1/2010 | Geiger et al. |
| 7,659,972 B2 | 2/2010 | Magnus et al. |
| 7,716,010 B2 | 5/2010 | Pelletier |
| 7,725,252 B2 | 5/2010 | Heddebaut et al. |
| 7,752,913 B2 | 7/2010 | Heckel et al. |
| 7,755,660 B2 | 7/2010 | Nejikovsky et al. |
| 7,869,909 B2 | 1/2011 | Harrison |
| 7,882,742 B1 | 2/2011 | Martens |
| 7,920,984 B2 | 4/2011 | Farritor |
| 7,937,246 B2 | 5/2011 | Farritor et al. |
| 7,938,370 B1 | 5/2011 | Lechevin et al. |
| 7,954,770 B2 | 6/2011 | Tomlinson, Jr. et al. |
| 8,020,446 B2 | 9/2011 | Bestebreurtje |
| 8,037,763 B2 | 10/2011 | Brignac et al. |
| 8,081,320 B2 | 12/2011 | Villar et al. |
| 8,125,219 B2 | 2/2012 | Jungbluth et al. |
| 8,157,218 B2 | 4/2012 | Riley et al. |
| 8,345,948 B2 | 1/2013 | Zarembski et al. |
| 8,428,798 B2 | 4/2013 | Kull |
| 9,108,640 B2 | 8/2015 | Jackson |
| 2001/0019263 A1 | 9/2001 | Kwun et al. |
| 2001/0045495 A1 | 11/2001 | Olson et al. |
| 2002/0087578 A1 | 7/2002 | Vroman |
| 2002/0113170 A1 | 8/2002 | Grappone |
| 2002/0148931 A1 | 10/2002 | Anderson |
| 2002/0183901 A1 | 12/2002 | Wolf et al. |
| 2003/0020469 A1 | 1/2003 | Katragadda et al. |
| 2003/0034423 A1 | 2/2003 | Hess, Jr. et al. |
| 2003/0070492 A1 | 4/2003 | Buttle et al. |
| 2003/0128030 A1 | 7/2003 | Hintze et al. |
| 2003/0213875 A1* | 11/2003 | Hess, Jr. ............ B61C 17/12 246/167 R |
| 2003/0214417 A1 | 11/2003 | Bryant et al. |
| 2003/0223387 A1 | 12/2003 | Conrath et al. |
| 2004/0095135 A1 | 5/2004 | Nejikovsky et al. |
| 2004/0100938 A1 | 5/2004 | Aiken, II et al. |
| 2004/0105608 A1 | 6/2004 | Sloman |

(56) References Cited

U.S. PATENT DOCUMENTS

| | | |
|---|---|---|
| 2004/0117073 A1 | 6/2004 | Horst |
| 2005/0024001 A1 | 2/2005 | Donnelly et al. |
| 2005/0060068 A1 | 3/2005 | Ruckser |
| 2005/0099061 A1* | 5/2005 | Hollandsworth ..... B60T 13/662 303/7 |
| 2005/0121971 A1 | 6/2005 | Ring |
| 2005/0125112 A1 | 6/2005 | LaDuc et al. |
| 2005/0125113 A1 | 6/2005 | Wheeler et al. |
| 2006/0025903 A1 | 2/2006 | Kumar |
| 2006/0098843 A1 | 5/2006 | Chew |
| 2006/0138285 A1 | 6/2006 | Oleski et al. |
| 2006/0180709 A1 | 8/2006 | Breton et al. |
| 2006/0274930 A1 | 12/2006 | Laurent et al. |
| 2007/0093946 A1 | 4/2007 | Gideoni |
| 2007/0132463 A1 | 6/2007 | Anderson |
| 2007/0163352 A1 | 7/2007 | Nielsen et al. |
| 2007/0179681 A1 | 8/2007 | Shaffer et al. |
| 2007/0217670 A1 | 9/2007 | Bar-Am |
| 2007/0219680 A1 | 9/2007 | Kumar et al. |
| 2008/0173770 A1 | 7/2008 | Ruggiero et al. |
| 2008/0201089 A1 | 8/2008 | Diaz et al. |
| 2008/0246338 A1 | 10/2008 | Donnelly et al. |
| 2008/0296441 A1 | 12/2008 | Anderson et al. |
| 2008/0306640 A1 | 12/2008 | Rosenthal et al. |
| 2009/0037038 A1 | 2/2009 | Mollet et al. |
| 2009/0132179 A1 | 5/2009 | Fu et al. |
| 2009/0173839 A1 | 7/2009 | Groeneweg et al. |
| 2009/0248226 A1 | 10/2009 | Kellner et al. |
| 2009/0254231 A1 | 10/2009 | Bartling |
| 2009/0265733 A1 | 10/2009 | McKelvey |
| 2009/0266166 A1 | 10/2009 | Pagano |
| 2009/0282923 A1 | 11/2009 | Havira |
| 2009/0326746 A1 | 12/2009 | Mian |
| 2010/0049384 A1* | 2/2010 | Kraeling ................. B60L 15/32 701/20 |
| 2010/0063673 A1 | 3/2010 | Anderson |
| 2010/0145557 A1 | 6/2010 | Katzer |
| 2010/0207620 A1 | 8/2010 | Gies |
| 2010/0217462 A1 | 8/2010 | Shaffer et al. |
| 2010/0286853 A1 | 11/2010 | Goodermuth et al. |
| 2010/0312493 A1 | 12/2010 | Purekar et al. |
| 2011/0006167 A1 | 1/2011 | Tolmei |
| 2011/0043199 A1 | 2/2011 | Crocker |
| 2011/0183605 A1 | 7/2011 | Smith, Jr. et al. |
| 2011/0185010 A1 | 7/2011 | Shatsky et al. |
| 2011/0199607 A1 | 8/2011 | Kanellopoulos et al. |
| 2011/0216996 A1 | 9/2011 | Rogers |
| 2011/0233293 A1 | 9/2011 | Kral et al. |
| 2011/0255077 A1 | 10/2011 | Rogers |
| 2011/0276203 A1 | 11/2011 | Haese |
| 2011/0284700 A1 | 11/2011 | Brand et al. |
| 2012/0078452 A1 | 3/2012 | Daum et al. |
| 2012/0078453 A1 | 3/2012 | Daum et al. |
| 2012/0181870 A1 | 7/2012 | Ichikawa et al. |

FOREIGN PATENT DOCUMENTS

| | | |
|---|---|---|
| DE | 102005001404 A1 | 7/2006 |
| DE | 202010006811 U1 | 7/2010 |
| EP | 0499199 A2 | 8/1992 |
| EP | 1886893 | 2/2008 |
| KR | 10-2011-0039071 | 4/2011 |
| KZ | 386 U | 8/2008 |
| RU | 2025310 C1 | 12/1994 |
| RU | 2238860 C1 | 10/2004 |
| WO | 9601431 A1 | 1/1996 |
| WO | 9960735 A1 | 11/1999 |
| WO | 0009377 A1 | 2/2000 |
| WO | 0071399 A1 | 11/2000 |
| WO | 0076828 A1 | 12/2000 |
| WO | 2004001406 A1 | 12/2003 |
| WO | 2004024531 A1 | 3/2004 |
| WO | 2004077378 A1 | 9/2004 |
| WO | 2006062056 A1 | 6/2006 |
| WO | 2006065730 A2 | 6/2006 |
| WO | 2007095402 A2 | 8/2007 |
| WO | 2007110613 A1 | 10/2007 |
| WO | 2008012535 A2 | 1/2008 |
| WO | 2008099177 A1 | 8/2008 |
| WO | 2010039680 A1 | 4/2010 |
| WO | 2011042943 A1 | 4/2011 |
| WO | 2011146088 A1 | 11/2011 |
| WO | 2012021225 A2 | 2/2012 |
| WO | 2014026086 A2 | 2/2014 |
| ZA | 200101708 A | 8/2001 |

OTHER PUBLICATIONS

Rose et al., "Application and Potential of Guided Wave Rail Inspection", Insight, pp. 353-358, vol. No. 44, Issue No. 6, pp. 353-358, Jun. 2002.

McCartney et al., "Redundancy in measurement systems", World Pipelines, pp. 27-30, Feb. 2003.

Innotrack, "Rail Inspection Technologies", University of Birmingham, Nov. 4, 2008.

Agenjos et al., "Energy Efficiency in Railways: Energy Storage And Electric Generation in Diesel Electric Locomotives", 20th International Conference on Electricity Distribution, Prague, pp. 1-7, Jun. 8-11, 2009.

Hang et al., "Forward Error Correction for 100 G Transport Networks", IEEE Communications Magazine, pp. 1-8, Mar. 2010.

Progressive Railroading, "Maintenance of Way: Track inspection technology", Dec. 2011, available at http://www.progressiverailroading.com/mow/article/Maintenance-of-Way-Track-inspection.

PCT Search Report and Written Opinion issued in connection with related PCT Application No. PCT/US2012/043579 dated Nov. 26, 2012.

U.S. Non-Final OA issued in connection with related U.S. Appl. No. 13/478,388 dated Mar. 13, 2013.

U.S. Non-Final OA issued in connection with related U.S. Appl. No. 13/183,626 dated May 7, 2013.

PCT Search Report and Written Opinion issued in connection with related PCT Application No. PCT/US2012/068852 dated Jun. 3, 2013.

U.S. Non-Final OA issued in connection with related U.S. Appl. No. 13/339,008 dated Jun. 20, 2013.

Hocking, "Rail Inspection, The Eddy Current Solution", retrieved from https://www.scribd.com/document/41818503/ Eddy-Current-Rail-Inspection dated Jul. 10, 2013.

Popov, "Automated Ultrasonic Inspection of Rails", STARMANS electronics, retrieved from www.starmans.net dated Jul. 10, 2013.

Sperry Rail Service, "Sperry B-Scan Dual Rail Inspection System" retrieved from http://www.sperryrail.com/_customelements/uploadedResources/SperryDUALweb.pdf dated Jul. 10, 2013.

U.S. Final OA issued in connection with related U.S. Appl. No. 13/478,388 dated Sep. 11, 2013.

U.S. Final OA issued in connection with related U.S. Appl. No. 13/339,008 dated Sep. 19, 2013.

U.S. Non-Final OA issued in connection with related U.S. Appl. No. 14/152,517 dated Mar. 11, 2014.

Unofficial English Translation of Chinese Office Action issued in connection with corresponding CN Application No. 2012544517 dated Apr. 3, 2014.

Knight, "10-4, Good Computer: Automated System Lets Trucks Convoy as One; A Recent Demonstration Involving Two Trucks Tethered by Computer Control Shows How Automation and Vehicle-To-Vehicle Communication are Creeping onto the Roads", MIT Technology Review, May 28, 2014, http://www.technologyreview.com/ news/527476/10-4-good-computer-automated-system-lets-trucks- convoy-as-one/ retrieved on Feb. 22, 2016.

PCT Search Report and Written Opinion issued in connection with related PCT Application No. PCT/US2013/037951 dated May 2, 2014.

U.S. Non-Final OA issued in connection with related U.S. Appl. No. 13/960,053 dated Aug. 12, 2014.

(56) References Cited

OTHER PUBLICATIONS

U.S. Final OA issued in connection with related U.S. Appl. No. 13/960,053 dated Jan. 6, 2015.
U.S. Non-Final OA issued in connection with related U.S. Appl. No. 14/152,159 dated Jan. 16, 2015.
KZ Office Action issued in connection with related KZ Application No. 2014/1501.1 dated Mar. 5, 2015.
EA Office Action issued in connection with related EA Application No. 201290166 dated Mar. 21, 2015.
AU Examination Report issued in connection with related AU Application No. 2012362895 dated May 26, 2015.
Unofficial English Translation of Chinese Office Action issued in connection with corresponding CN Application No. 2013800266526.6 dated Jul. 24, 2015.
KZ Office Action issued in connection with related KZ Application No. 2014/1623.1 dated Oct. 29, 2015.
U.S. Non-Final OA issued in connection with related U.S. Appl. No. 14/679,462 dated Dec. 4, 2015.
U.S. Non-Final OA issued in connection with related U.S. Appl. No. 14/525,326 dated Feb. 23, 2016.
AU Notice of Allowance issued in connection with related AU Application No. 2012362895 dated Mar. 2, 2016.
U.S. Non-Final OA issued in connection with related U.S. Appl. No. 14/864,243 dated Apr. 11, 2016.
U.S. Final OA issued in connection with related U.S. Appl. No. 14/679,462 dated Jun. 1, 2016.

\* cited by examiner

Consist Monitor

| Road Number | 7013 | 7014 | 7015 | 7015 |
|---|---|---|---|---|
| Fuel (Gal) | 5000 | 3500 | 4830 | 1290 |
| Mode | READY-P | READY-P | READY-P | READY-P |
| Active Axles | 6 | 6 | 6 | 6 |
| Effort (Lbs) | 180000 | 180000 | 180000 | 180000 |
| Traction HP | 4400 | 4400 | 4400 | 4400 |
| Engine RPM | 1000 | 1010 | 1000 | 990 |
| Oil Temp (°F) | 150 | 150 | 150 | 150 |
| | No Motor | No Motor | No Motor | No Motor |
| | No DB | No DB | No DB | No DB |
| | No Batt | No Batt | No Batt | No Batt |
| | Alarm Bell | Alarm Bell | Alarm Bell | Alarm Bell |

100

LI
4600-0

Modify Order

Exit

Ready

Restart Network

FIG. 1

Prior Art

VEHICLE CONSIST CONFIGURATION CONTROL

CROSS-REFERENCE TO RELATED APPLICATIONS

This application is a continuation-in-part of U.S. patent application Ser. No. 11/183,369, filed 17 Jul. 2005, and titled "Locomotive Consist Configuration Control" (referred to herein as the "'369 Application") and is a continuation-in-part of U.S. patent application Ser. No. 12/908,214, filed 20 Oct. 2010, and titled "System And Method For Locomotive Inter-Consist Equipment Sparing And Redundancy" (referred to herein as the "'214 Application"). The '369 Application claims priority to U.S. Provisional Patent Application Ser. No. 60/590,555, filed 23 Jul. 2004 (referred to herein as the "'555 Application"). The '214 Application claims priority to U.S. Provisional Patent Application Ser. No. 61/253,877, filed 22 Oct. 2009 (referred to herein as the "'877 Application"). The entire disclosures of these applications (e.g., the '369 Application, the '214 Application, the '555 Application, and the '877 Application) are incorporated herein by reference.

TECHNICAL FIELD

Aspects of the inventive subject matter described herein generally relate to communications between propulsion-generating vehicles (e.g., locomotives) and, more particularly, to communication between propulsion-generating vehicles in a vehicle consist. Aspects of the inventive subject matter also relate to data communications, such as data communications in a locomotive consist or other vehicle consist.

BACKGROUND

A vehicle or locomotive "consist" is a group of two or more vehicles (e.g., locomotives) that are mechanically coupled or linked together to travel along a route. Trains may have one or more locomotive consists. Locomotives in a consist include a lead locomotive and one or more trail locomotives. A train may have at least one lead consist, and may also have one or more remote consists positioned further back in the train. More generally, a "vehicle consist" is a group of locomotives or other vehicles that are mechanically coupled or linked together to travel along a route, e.g., the route may be defined by a set of one or more rails, with each vehicle in the consist being adjacent to one or more other vehicles in the consist.

Locomotives that are used for heavy haul applications tend to experience extreme environmental conditions, including low/high temperatures and/or high altitudes. In some situations, many locomotives are typically connected together to be able to pull heavy trains. These locomotives are interconnected electrically by multiple unit ("MU") trainlines so that an operator in the front locomotive can control the operation of the trailing locomotives. For example, freight trains are often hauled by multiple locomotive ensembles ("consists") placed together at the front or rear of the train or dispersed among the freight cars. A single crew at the front of the train coordinates all of the locomotive throttles and brake commands via a connection called the multiple unit line ("MU-line") that runs among the locomotives. Another example is, if the front, or lead, locomotive is in dynamic braking operation at a specified brake level (controlled by an operator request), then all of the locomotives in the consist are also operating in dynamic braking operation at the same specified level. As such, it should be appreciated that there may be multiple consists in a train and that these consists may be set up such that all of the locomotives in each consist act in unison.

In addition to this kind of information, trainline modems (and other communication systems, like radio frequency or "RF" systems) are used to send other types of information regarding the operation of the trailing locomotives to the front locomotive (where the operator is typically located), including, but not limited to, operating mode, tractive/braking effort, horsepower, engine speed, motoring/braking failure, engine failure, battery charger failure and locked axle failure. Referring to FIG. 1, one example of a locomotive consist screen display 100, in accordance with the prior art, is shown and may include several indications of fault occurrences. Currently, when an operator receives a fault occurrence indication, he/she has to travel back to the trailing locomotives to obtain further information regarding the fault, such as the fault code and/or the fault data, or at this point he/she can reset the fault, retry or reconfigure the locomotive (for example, cut out a traction motor).

One disadvantage to this configuration is that when these locomotives are operating at higher altitudes it is difficult, and in some cases dangerous, for the operator to get down from the leading, or front, locomotive and get on a trailing locomotive, since only the operator cab in the front locomotive is provided with an oxygen supply and the locomotives may be covered in snow and/or ice. One possible way to address this problem might be to have the operator carry a portable oxygen tank when he/she is traveling between locomotives. Unfortunately however, these tanks can be cumbersome and heavy and in some situations, carrying these tanks can increase the likely hood of injury and/or death due to a potential buildup of ice and/or snow. Another disadvantage involves stopping the train at higher altitudes. Since it is not advisable to travel between the locomotives while the train is moving, in most cases the train must be stopped and since travel at higher altitudes typically includes traversing steep grades which may have snow and ice on the tracks, restarting the train tends to be difficult and may cause delays along the railroad line. Still another disadvantage with traveling between locomotives while the train is moving involves the operational disadvantage of the operator not being able to watch the track. As such, if there was debris, such as snow, rocks and/or trees or if there were an animal on the track, the operator would be unable to react and thus, would not be able to respond or even be aware of a dangerous situation until it is too late. Moreover, there may be other terrains, such as tunnels and very steep grades, and climate conditions, such as sub-zero temperatures and storms, where traveling between locomotives is not desirable, especially if the locomotive units are spaced a large distance apart from each other.

Additionally, a propulsion-generating vehicle (e.g., a locomotive) typically includes a number of different electro-mechanical and electrical systems. These systems include a plurality of different electronic components, which process or otherwise utilize data/information for operational purposes. Examples of electronic components in a locomotive include data and voice radios and other communication equipment, positioning equipment (e.g., GPS components), data and video recorders, engine control systems, navigation equipment, and on-board computer and other computer systems.

Certain electrical components may be part of a critical or vital system in a vehicle. In a critical or vital system, one or more functions of the system must be performed with a very low likelihood of failure, and/or with a very long projected mean time between system failures, for safety purposes or otherwise. To achieve this, for those electronic components that carry out a vital function, a locomotive must be outfitted with redundant electronic components. This can greatly increase the costs associated with implementing vital systems in a vehicle. Additionally, even with redundant components in a vehicle, a vital system is still subject to failure if both the primary and redundant components fail.

BRIEF DESCRIPTION

In an embodiment, a vehicle system (such as a railroad train) includes a first propulsion-generating vehicle (e.g., a first locomotive) having one or more first electronic processors, a first communication device in electrical communication with the one or more first processors, and a first operator interface in electrical communication with the one or more first processors. The vehicle system also includes a second propulsion-generating vehicle (e.g., a second locomotive) having one or more second electronic processors, a second communication device in electrical communication with the one or more second processors and in communication with the first communication device, a second sensor in electrical communication with the one or more second processors for monitoring operation of the second propulsion-generating vehicle and generating signals indicative of the operations that are monitored (e.g., monitored operations), and a second controller device in electrical communication with the one or more second processors for controlling operation of the second propulsion-generating vehicle, with the one or more second processors receiving the signals indicative of the operation of the second propulsion-generating vehicle, determining faults in the operation of the second propulsion-generating vehicle, and communicating signals indicative of the faults to the second communication device for transmission to the first operator interface via the first communication device and the one or more first processors, and with the second controller device being controllable from the first operator interface via the first and second processors and the first and second communication devices, wherein faults in the operation of the second propulsion-generating vehicle are communicated to the first operator interface and control actions on the operation of the second propulsion-generating device in response to the faults may be effected by an operator on the first propulsion-generating device.

A communication/control system for a vehicle system (e.g., a railroad train) having a first propulsion-generating vehicle (e.g., a first locomotive) and a second propulsion-generating vehicle (e.g., a second locomotive) is provided and includes a first electronic processor (e.g., one or more processors), a first communication device in electrical communication with the first processor, and a first operator interface in electrical communication with the first processor. The communication/control system also includes a second electronic processor (e.g., one or more processors), a second communication device in electrical communication with the second processor and in communication with the first communication device, a second sensor in electrical communication with the second processor for monitoring operation of the second locomotive and generating signals indicative of the monitored operations, and a second controller device in electrical communication with the second processor for controlling the operation of the second locomotive, with the second processor receiving the signals indicative of the operation of the second locomotive, determining faults in the operation of the second locomotive, and communicating signals indicative of the faults to the second communication device for transmission to the first operator interface via the first communication device and the first processor, and with the second controller device being controllable from the first operator interface via the first and second processors and the first and second communication devices, wherein faults in the operation of the second locomotive are communicated to the first operator interface and control actions on the operation of the second locomotive in response to the faults may be effected by an operator on the first locomotive.

A method for ensuring control of a propulsion-generating vehicle (e.g., a locomotive) within a vehicle consist (e.g., a locomotive consist), wherein the locomotive consist includes a first processor (e.g., one or more first processors), a second processor (e.g., one or more second processors), and a second controller device communicated with the second processor, wherein the first processor is communicated with the second processor and wherein the second processor is configurable to allow the first processor to control the second controller device is provided, wherein the method includes monitoring the second controller device to determine whether a fault condition of the second controller device has occurred and if a fault condition has occurred, communicating the fault condition to an operator of the locomotive consist and operating the first processor to control the second controller device.

In an embodiment, a system and method for communicating data in a locomotive consist or other vehicle consist are provided. In an embodiment of the method, the method comprises receiving, at a second vehicle in a vehicle consist, first data related to a first vehicle in the vehicle consist. (Data "related" to a vehicle means data originating from the vehicle, and/or data addressed to other otherwise intended for the vehicle, and/or data about the vehicle, and/or data used as a basis, indirect or direct, for controlling the vehicle.) The vehicle consist comprises at least the first vehicle and the second vehicle, with each vehicle in the consist being adjacent to and mechanically coupled with one or more other vehicles in the consist; the first vehicle and the second vehicle are linked by a communication channel (e.g., wireless or wired). The method further comprises, in a second electronic component on board the second vehicle, processing the first data according to a function unavailable to the first vehicle. (An "unavailable" function is one which the first vehicle is unable to perform, due to the first vehicle not being equipped to perform the function or due to a failure, e.g., of an electronic component, on board the first vehicle.)

In an embodiment, a system for communicating data in a vehicle consist comprises a data receiver module and a data processor module operably connected to the data receiver module. The data receiver module is configured for deployment in a second vehicle in a vehicle consist, and is further configured to receive first data related to a first vehicle in the vehicle consist. (In operation, the first vehicle is linked with the second vehicle by a communication channel.) The data processor module is configured for processing the first data according to a function unavailable to the first vehicle.

In an embodiment, the method further comprises determining that a first electronic component in the first vehicle of the vehicle consist is in a failure state. In the failure state, the first electronic component is unable to perform the function unavailable to the first vehicle, which is a designated function of the first electronic component (meaning a function that the first electronic component would perform but for the failure state). Upon determining the failure state, the first data is transmitted from the first vehicle to the second vehicle (over the communication channel), for the second electronic component to perform the designated function that the first electronic component is unable to perform.

In this manner, when an electronic component in one vehicle in a vehicle consist fails (is unable to perform a designated function), data designated or intended for the failed electronic component is instead transmitted to a similar electronic component in another vehicle in the consist. (An electronic component is "similar" to another electronic component if it can perform one or more functions of the other electronic component, such as the designated function the failed component is unable to perform, within designated tolerance/performance levels.) This "swapping" or "sparing" of the functional aspects of failed electronic components in a vehicle consist eliminates the need for multiple redundant components in a single vehicle, and improves system reliability and performance, e.g., a train may in effect include three, four, or even more redundant components for a particular function, across the various locomotives within a consist in the train.

An embodiment relates to a method for communicating data in a vehicle consist. For each vehicle of a plurality of vehicles in the vehicle consist, the method comprises monitoring at least one electronic component (i.e., one or more electronic components) in the vehicle to determine if the at least one electronic component has failed. For each of the at least one electronic component determined to have failed, "first" data from the vehicle or a second vehicle in the consist is transmitted to a similar electronic component in a third vehicle in the consist. The first data is data designated for the electronic component determined to have failed. The first data is transmitted over a communication channel linking vehicles in the vehicle consist. The method further comprises transmitting return data from the similar electronic component to one of the vehicles in the consist. The return data is generated by the similar electronic component based on the first data.

An embodiment relates to a method for communicating data in a vehicle consist. The method comprises transmitting first data from a first vehicle in the consist to each of a second vehicle and a third vehicle in the consist. The first data comprises non-network control information, which is data or other information that is not packet data, and/or, in an embodiment, data or other information that is not packet data and that does not include recipient network addresses, and/or, in an embodiment, data or other information that is low bandwidth or very low bandwidth data. The method further comprises initiating transmission of second data from the first vehicle to at least the third vehicle. The second data comprises high bandwidth data and/or network data that at least partially overlaps the first data. By "overlaps," it is meant relating to the same command function in a vehicle or vehicle consist, e.g., the first and second data may each contain throttle commands. If the second data is available to the third vehicle (meaning received at the third vehicle and of sufficient quality to be usable by the third vehicle), the third vehicle is controlled based on the second data; otherwise, the third vehicle is controlled based on the first data. The second vehicle is a legacy vehicle incompatible with the second data, and is controlled based on the first data.

In this manner, in one aspect, the vehicle consist includes both legacy vehicles (vehicles unable to use high bandwidth data and/or network data) and "updated" vehicles that already include legacy equipment but that are also able to use high bandwidth data and/or network data. Throttle and other commands are transmitted in formats suitable for both vehicle types, with both formats being transmitted to the updated vehicles. The updated vehicles take advantage of the high bandwidth data and/or network data, but if such data becomes unavailable due to a failure of the communication system for transmitting such data, the updated vehicles instead use the other, legacy-formatted data.

BRIEF DESCRIPTION OF THE FIGURES

The foregoing and other features and advantages of the inventive subject matter will be more fully understood from the following detailed description of illustrative embodiments, taken in conjunction with the accompanying drawings in which like elements are numbered alike in the several Figures:

FIG. 1 is a screen capture of a Consist Monitor Screen;

DETAILED DESCRIPTION

Although example embodiments of the inventive subject matter are described with respect to trains, locomotives, and other rail vehicles, embodiments of the inventive subject matter also are applicable for use with vehicles generally, such as off-highway vehicles (e.g., vehicles that are not designed and/or permitted to travel on public roadways), agricultural vehicles, and/or transportation vehicles, each of which may include a vehicle consist. As noted above, a vehicle consist is a group of locomotives or other vehicles that are mechanically coupled or linked together to travel along a route, with each vehicle in the consist being adjacent to one or more other vehicles in the consist.

Figure 2:
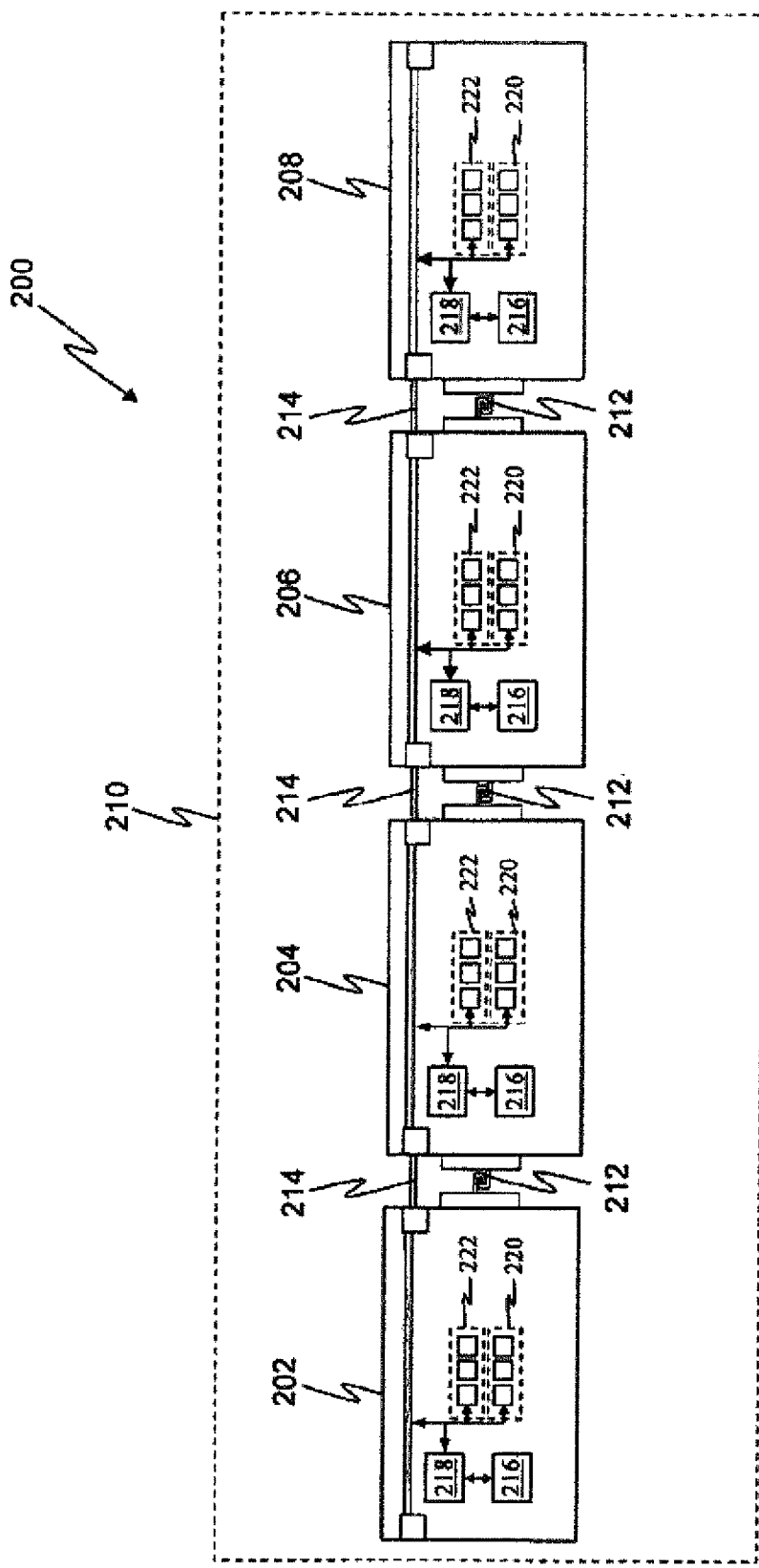
FIG. 2 is a block diagram showing an embodiment of a communication connection between propulsion-generating vehicles (e.g., locomotives) in a vehicle consist (e.g., a locomotive consist)

Referring to FIG. 2, a schematic block diagram illustrating an embodiment of a vehicle consist system 200 (e.g., a locomotive consist system) is shown and includes a first locomotive 202, a second locomotive 204, a third locomotive 206 and a fourth locomotive 208 connected in a consist 210 via a plurality of connection devices, such as a plurality of mechanical connection devices 212. While the description herein focuses on and uses locomotives and locomotive consists as examples, not all embodiments described herein are limited to locomotives and locomotive consists. One or more embodiments may be used in conjunction with and/or include propulsion-generating vehicles other than locomotives and vehicle consists other than locomotive consists.

Each of the first locomotive 202, the second locomotive 204, the third locomotive 206 and the fourth locomotive 208 are communicated with each other via a conductive body, such as a Multiple Unit (MU) line 214. Each locomotive may include a processing device 216, an input/output device 218, at least one controller device 220 and at least one sensing device 222, wherein the processing device 216, the input/output device 218, the at least one controller device 220 and the at least one sensing device 222 may communicate with each other. Moreover, the processing device 216, the input/output device 218, and the at least one controller device 220 on each of the locomotives 202, 204, 206, 208 may communicate with the remaining locomotives 202, 204, 206, 208 via the MU line 214 such that the processing device 216, the input/output device 218, the at least one controller device 220 and the at least one sensor device 222 on at least one of the locomotives 202, 204, 206, 208 is capable of establishing communication with the processing device 216, the input/output device 218, the at least one controller device 220 and the at least one sensor device 222 on at least one of the other locomotives 202, 204, 206, 208. It should be appreciated that although the MU line 214 is shown as being a hardwired connection, the MU line 214 may utilize a wireless communications link, such as infrared (IR), radio frequency (RF), satellite, and the like.

Figure 3:
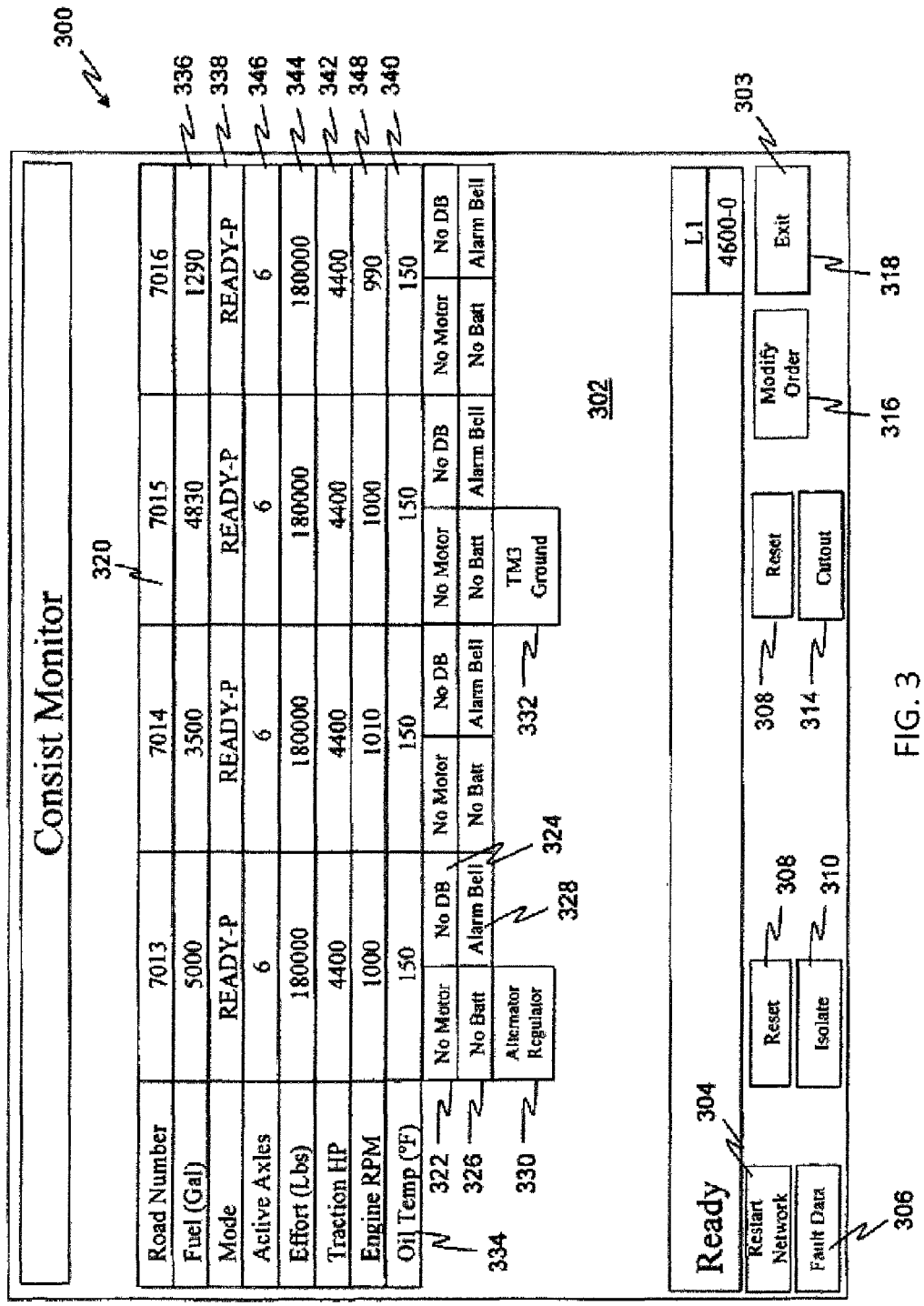
FIG. 3 is a screen capture of a Consist Monitor Screen for the consist of FIG. 2.

In the configuration shown in FIG. 2, as the consist 210 is operating, sensor data is being generated by the at least one sensor device 222 on one or more of the locomotives 204, 206, 208. The data generated by the at least one sensor device 222 ("generated data") on the second locomotive 204, the third locomotive 206, and/or the fourth locomotive 208 is communicated to the first locomotive 202 via the MU line 214. This data may be displayed on the input/output device 218 of the first locomotive 202 to an operator. Referring to FIG. 3, an embodiment of a sensor display 300 on the input/output device 218 is shown and may include a Touch Menu Item (TMI) (softkey) screen 302 and/or a keyboard for command and/or data entry from the operator. The TMI screen 302 may include a plurality of software configurable input devices 303 such as a Network Restart switch 304 which is a request that the network information be resent to the sensor display 300, a Fault Data switch 306 which is a request that all or some of the data that was generated at the time of the failure, which may or may not include fault data, be sent to the sensor display 300, a Reset switch 308 which is a request to reset the faulted equipment, an Isolation switch 310 which is a request to isolate the faulted equipment and/or locomotive from the rest of the system, a Cutout switch 314 which is a request to cutout the faulted equipment from the rest of the system, an Order Modification switch 316 and an Exit switch 318.

Upon a condition that requires attention from the locomotive operator, such as a fault condition, an indication will be communicated to the operator that tells the operator that a condition has occurred that needs his/her attention and a condition indicator, which may be specific and/or general, will be displayed on the input/output device 218, wherein the condition indicator may be in the form of a plurality of software configurable display indicators 320 and switches, which may be specific and/or general. It should be appreciated that the plurality of software configurable display indicators 320 may include, but not be limited to, a No Motor indicator 322, a No DB (Dynamic Braking) indicator 324, a No Batt indicator 326, an Alarm Bell indicator 328, an alternator regulator fault indicator 330 and a TM Ground Fault indicator 332. Additionally, the plurality of software configurable display indicators 320 may also include a plurality of configurable operational performance indicators 334, such as fuel level 336, operational mode 338, Oil Temperature 340, traction HP 342, Effort 344, number of active axles 346 and Engine RPM 348.

This should allow the locomotive consist system 200 to inform the operator of an active fault or problem and a suggested course of action (from a stored databank and/or from personnel at a remote facility) and/or the operator may access a fault data display to link directly with and/or to obtain help from central service personnel. If the operator requires more information about the condition, he/she may operate the input/output device 218 to obtain more data which may be transmitted via the MU line 214 to the processing device 216. Once the operator has obtained the desired information regarding the fault indication, the operator may send commands to the trailing locomotive(s), e.g., the second locomotive 204, third locomotive 206 and/or the fourth locomotive 208, responsive to the indicated fault condition. These commands may include, but may not be limited to, a fault reset command, a fault reevaluation command, a reconfiguration command to reconfigure the locomotives (individually or together) and a fault data display command. This would allow an operator in the lead locomotive to obtain critical/non-critical information and to control the operation of the remaining locomotives 202, 204, 206, 208 within the consist 210.

Figure 4:
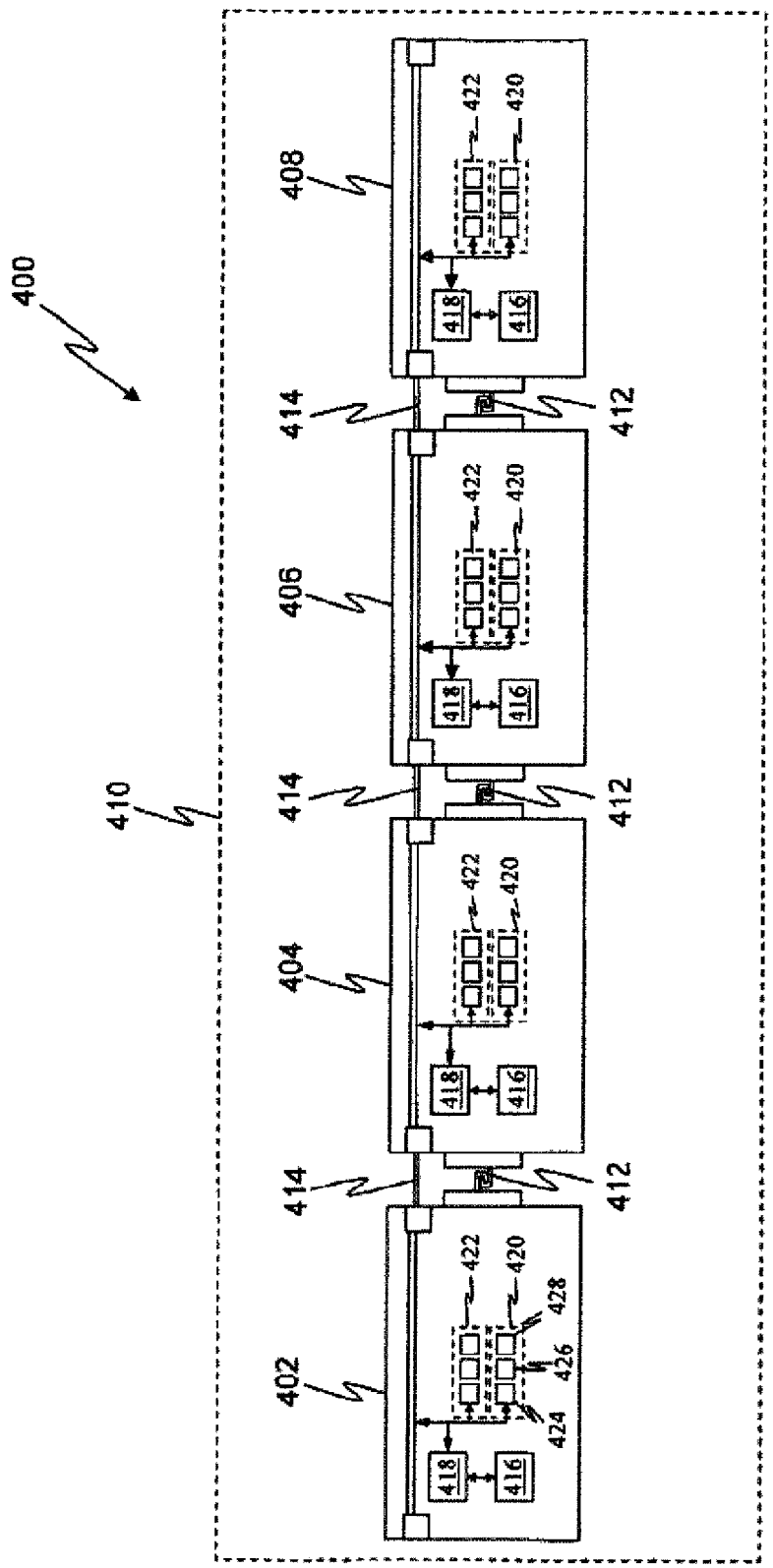
FIG. 4 is a block diagram showing an embodiment of a communication connection between propulsion-generating vehicles in the consist of FIG. 2.

It should be appreciated that the following scenarios are only meant to illustrate certain aspects of the inventive subject matter and thus are not meant to limit all embodiments of the inventive subject matter to only these scenarios. As such, the inventive subject matter is intended to be applicable to any scenario that may require action by the operator of the train. Referring to FIG. 4, consider the situation where there are four (4) locomotives operating in a locomotive consist system 400. A schematic block diagram illustrating the locomotive consist system 400 is shown and includes a first locomotive 402, a second locomotive 404, a third locomotive 406 and a fourth locomotive 408 connected in a consist 410 via a plurality of connection devices, such as a plurality of mechanical connection devices 412. Additionally, each of the first locomotive 402, the second locomotive 404, the third locomotive 406 and the fourth locomotive 408 may be communicated with each other via a Multiple Unit (MU) line 414. As shown, each of the locomotives 402, 404, 406, 408 may include a processing device 416, an input/output device 418, at least one controller device 420 and at least one sensing device 422, wherein the processing device 416, the input/output device 418, the at least one controller device 420 and the at least one sensing device 422 are communicated with each other. It should be appreciated that the at least one controller device 420 may include at least one of a traction alternator regulator 424, a traction motor 426 and a dynamic braking system 428, an alternator device, a circuit breaker device, a switching device, a power electronics device, a blower, a fan and an electrical contactor. Moreover, the processing device 416, the input/output device 418 and the at least one controller device 420 on each of the locomotives 402, 404, 406, 408 are further communicated with the remaining locomotives 402, 404, 406, 408 via the MU line 414 such that the processing device 416, the input/output device 418, the at least one controller device 420 and the at least one sensor device 422 on at least one of the locomotives 402, 404, 406, 408 is capable of establishing communication with and control of the processing device 416, the input/output device 418, the at least one controller device 420 and the at least one sensor device 422 on at least one of the other locomotives 402, 404, 406, 408, either separately and/or collectively.

Figure 5:
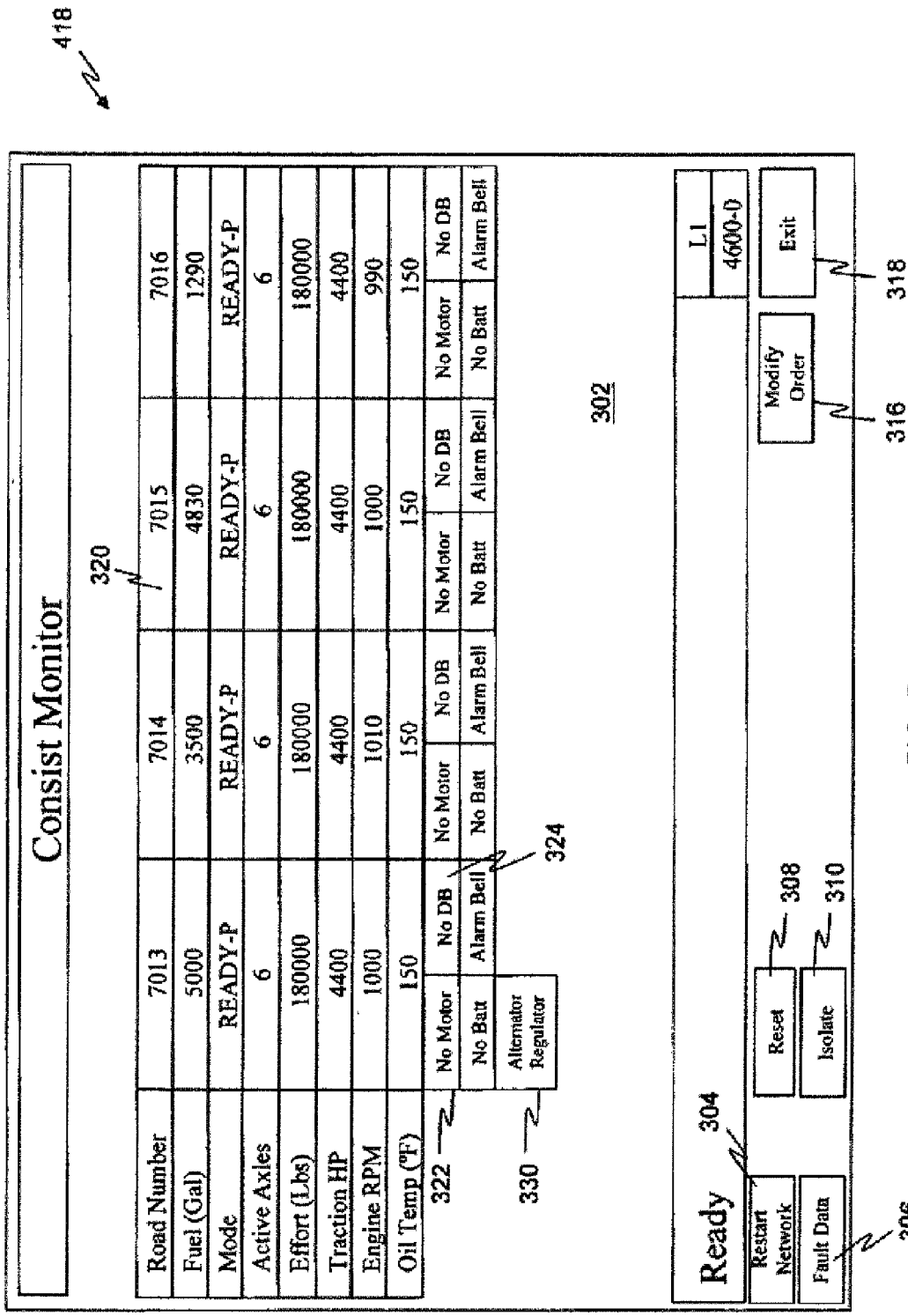
FIG. 5 is a screen capture of a Consist Monitor Screen for the consist of FIG. 4.

Referring to FIG. 4 and FIG. 5, consider a first situation where a failure of one of the controller devices 420, such as the fraction alternator regulator 424, occurs on the first locomotive 402. In this case, the following scenario is likely. As the consist 410 is operating, sensor data is being generated and communicated from the second locomotive 404, the third locomotive 406 and the fourth locomotive 408 to the first locomotive 402 and is displayed to the operator on the input/output device 418 of the first locomotive 402. Upon a failure of the alternator regulator 424 on the first locomotive 402, a failure indication of the alternator regulator 424 is communicated to the operator via the TMI softkey screen 302 on the input/output device 418, as indicated by the highlighted "Alternator Regulator" softkey 330. Additionally, because a failure of the alternator regulator 424 may result in a motoring operation failure and a braking operation failure, the operator is also informed of a motoring operation failure and a braking operation failure, as indicated by the highlighted "No Motor" softkey 322 and "No DB" softkey 324, respectively. In this case, the operator has the option of isolating the first locomotive 402 from the rest of the consist 410 via an isolate softkey switch 310 or the operator may try to reset the fault via a reset softkey switch 308. Additionally, the operator may attempt to restart the system network via a reset network softkey switch 304 or the operator may request fault data via a fault data softkey switch 306. As such, the operator may be informed of the situation and may perform the appropriate actions without leaving the lead locomotive. The operator may then modify instructions given to the consist system 400 or exit the consist monitor screen 302 via a Modify Order softkey switch 316 and an Exit softkey switch 318, respectively.

Figure 6:
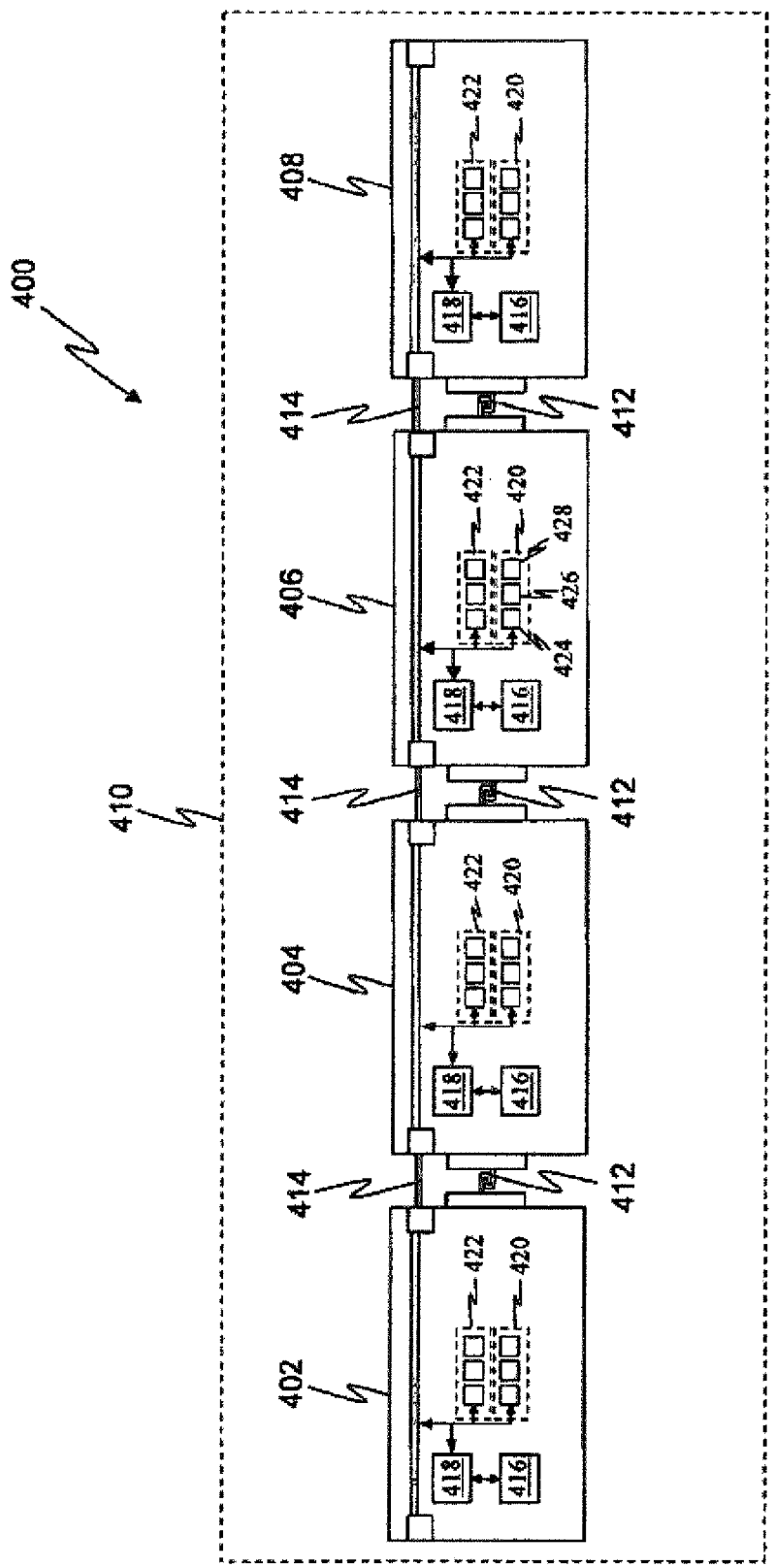
FIG. 6 is a block diagram showing an embodiment of a communication connection between propulsion-generating vehicles in a consist.
Figure 7:
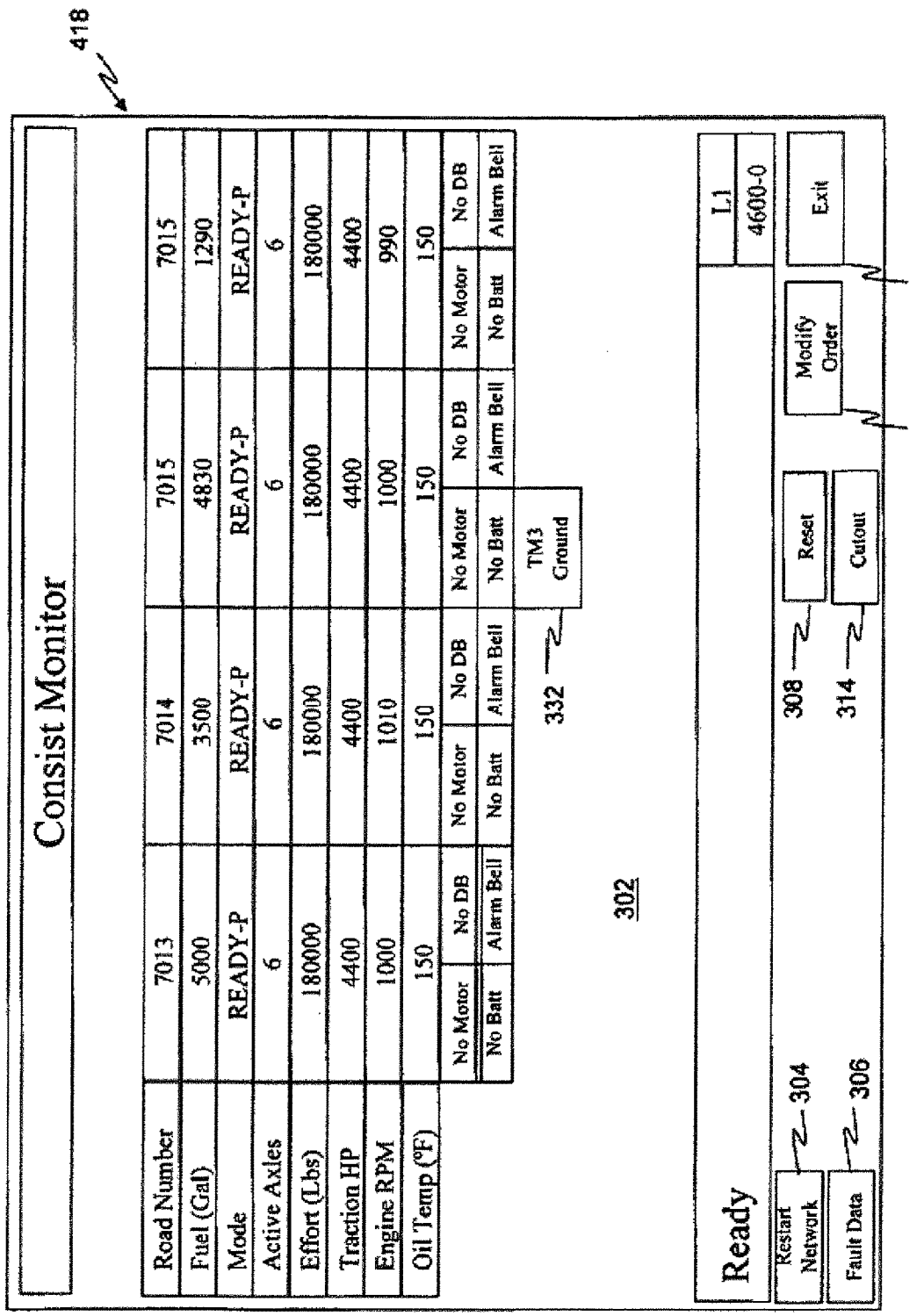
FIG. 7 is a screen capture of a Consist Monitor Screen for the consist of FIG. 6.

Referring to FIG. 6 and FIG. 7, consider a second situation where there are four (4) locomotives operating in the locomotive consist 410 and a ground fault occurs involving the third traction motor 426 on the third locomotive 406. As above, the operator in the lead locomotive may be informed of this condition via the input/output device 418, wherein the failure of the third traction motor 426 is communicated to the operator via a highlighted "TM3 Ground" softkey indicator 332 on the input/output device 418. In this case, the operator has the option to cut out the traction motor 426 (e.g., shut the motor down) via a "Cutout" softkey 314 or the operator has the option to try to reset the ground fault via the "Reset" softkey 308. As above, the operator may attempt to restart the system network via a Reset Network softkey switch 304 or the operator may request fault data via a Fault Data softkey switch 306 allowing the operator to be informed of and control the situation without leaving the lead locomotive. The operator may then modify instructions given to the consist system 400 or exit the consist monitor screen 302 via a Modify Order softkey switch 316 and an Exit softkey switch 318, respectively. Additionally, it should be appreciated that fault data may be communicated to a storage database and/or a remote receiving center which will log the data for future repair. For example, in the ground fault example above, the fault information may be sent to the next destination of the locomotive, either at the command of the operator or automatically, so that by the time the locomotive arrives at its destination, the parts and/or personnel will be ready to begin work on the motor to correct the fault condition. This would allow for a reduction in the amount of downtime of the locomotive and ultimately would translate into fewer and/or shorter delays.

Figure 8:
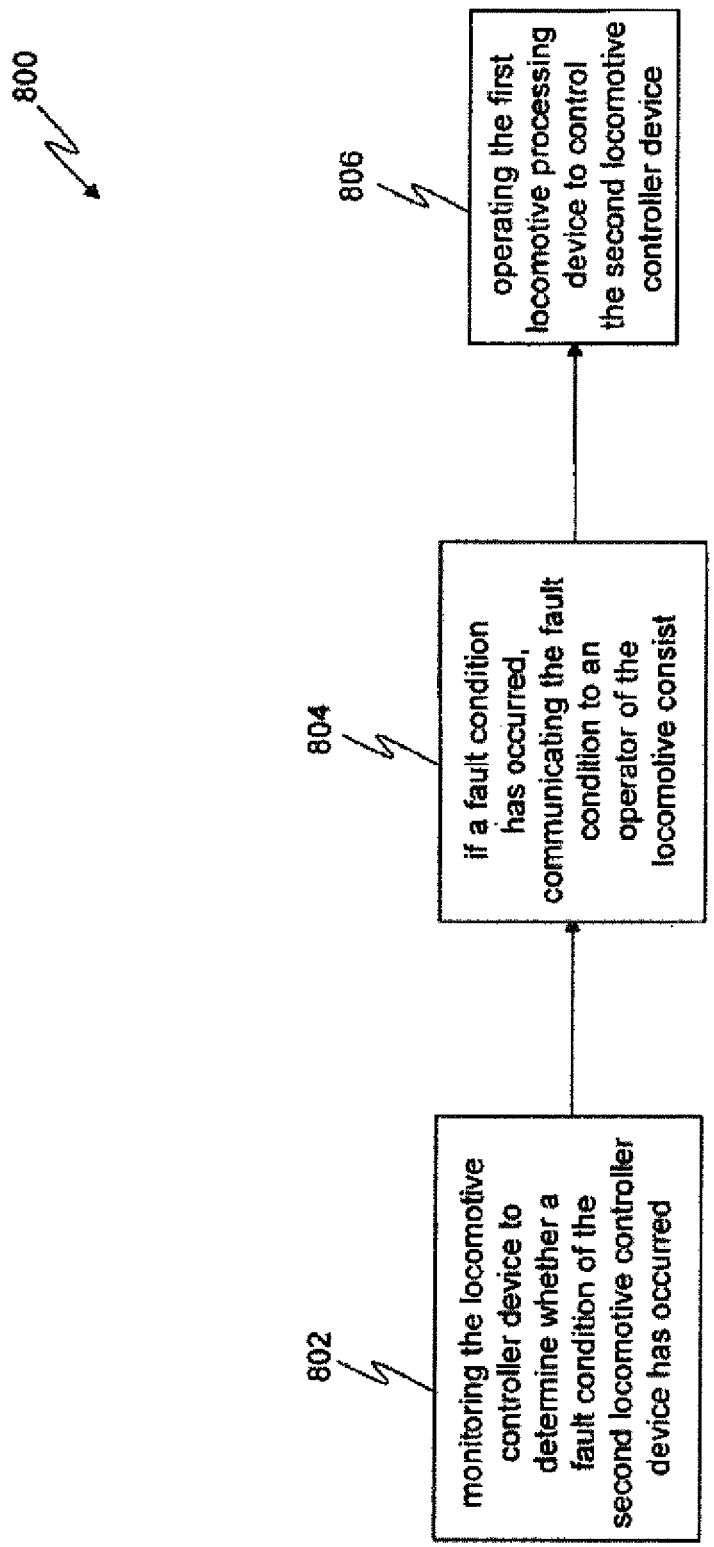
FIG. 8 is a block diagram illustrating a method for ensuring control of a propulsion-generating vehicle within a vehicle consist.

Referring to FIG. 8, a block diagram illustrating a method 800 for ensuring control of a locomotive 202, 204, 206, 208, 402, 404, 406, 408 within a locomotive consist 210, 410 is provided. The locomotive consist 210, 410 may include a first locomotive 202, 402 and a second locomotive 204, 404, wherein the first locomotive 202, 402 includes a first locomotive display device 218, 418 and a first locomotive processing device 216, 416, and wherein the second locomotive 204, 404 includes a second locomotive processing device 216, 416 and a second locomotive controller device 220, 420 communicated with the second locomotive processing device 216, 416. Additionally, the first locomotive processing device 216, 416 is communicated with the second locomotive processing device 216, 416 via a Multiple Unit line 214, 414 and the second locomotive processing device 216, 416 is configurable to allow the first locomotive processing device 216, 416 to control the locomotive controller device 220, 420. The processing devices may include or represent one or more processors, sensors, and the like. The method 800 includes monitoring the locomotive controller device 220, 420 to determine whether a fault condition of the second locomotive controller device 220, 420 has occurred, as shown in operational block 802. If a fault condition has occurred, then the method 800 includes communicating the fault condition to an operator of the locomotive consist 208, 400, as shown in operational block 804 and operating the first locomotive processing device 216, 416 to control the second locomotive controller device 220, 420, as shown in operational block 806, such that the first locomotive processing device 216,416 is able to control the second locomotive controller device 220, 420 from the first locomotive 202, 402.

Moreover, other features and functions suitable to the desired end purpose may be included, such as a self-testing, diagnostic, and/or monitoring capability. This would allow the operator the ability to initiate a self-test routine for preventive maintenance and or fault isolation and/or detection. Moreover, the diagnostic capability may be used for trouble shooting and/or fault repair and/or reconfiguration, such as isolation and/or cutout. It should be appreciated that the self testing, diagnostic, and/or monitoring capabilities may be implemented by the on-site operator or by a remote operator prior to a fault occurrence, immediately following a fault occurrence and/or after fault data has been received. Additionally, each of the locomotives in the consist 210, 410 may be tested as a group or individually in any order. This would allow an on-site operator and/or a remote operator to perform function and safety tests prior to each departure.

Additionally, it should be appreciated that the locomotive consist system 200, 400 may be used to implement operations not currently under control of a control system. For example, the traction alternator field cutout is currently controlled by a circuit breaker which requires that the physical connection be broken manually. It is contemplated that these types of system and/or connections may be controlled via a configurable softkey (e.g., software) switch 303 from the display device 218, 418. Additionally, it is contemplated that the above may be implemented by an on-site operator who may be assisted by remote experts that is in communication with the locomotive consist system 200, 400 via a wireless communications system, such as satellite, RF, IR, and the like. Furthermore, the locomotive consist system 200, 400 may also be used to monitor the MU line 214, 414 to detect if a fault occurrence is due to the MU cables/connection or due to the actual unit indicating a fault occurrence.

It should be appreciated that all communications may be conducted via a hardwired system or by a wireless system, such as satellite, RF, IR, etc. Moreover, in some situations, such as incapacity of the crew, a wireless system may allow a central service office to assume control of the consist 210, 410 and/or specific locomotives 202, 204, 206, 208, 402, 404, 406, 408 and to operate the consist 210, 410 and/or specific locomotives 202, 204, 206, 208, 402, 404, 406, 408 remotely, collectively or individually. Thus, all of the information and control available to an operator on the locomotive would be accessible by personnel at the central service (dispatch) office. Additionally, since the amount of information normally passed between locomotive is relatively small, the bandwidth of the communication channel to carry this information may be correspondingly small. However, normal data transmission may be limited to allow more condition information (such as fault/health information) and/or associated commands to be communicated. It should also be appreciated that because the locomotives are communicated with each other, the crew may controllably switch control from one locomotive to another in the consist 210, 410. This may be useful if the lead locomotive is not operating correctly and must be shut down. In this situation, operators may switch control of the lead locomotive in the consist 210, 410 to one of the remaining locomotives 202, 204, 206, 208, 402, 404, 406, 408, such as second locomotive 204, 404, third locomotive 206, 406 or the fourth locomotive 208, 408. For example, if a traction motor 426 has failed, then the operator could cut out the traction motor 426 and proceed with a degraded mode of operation. Another example involves major equipment damage of MIS operation, the unit could be commanded to isolate or standby mode or to ignore throttle commands so that the rest of the consist 210, 410 could proceed. Another example would be to limit the total tractive/braking effort produced during certain periods of operation for the safe handling of the train.

It is contemplated that the at least one controller device 216, 416 may include any number and/or type of controller device(s) suitable to the desired end purpose, including but not limited to a throttle control, an environmental control and/or a brake control. Moreover, at least one sensor device 222, 422 may include any number and/or type of sensor device(s) suitable to the desired end purpose, including but not limited to a fault sensor device, a traction motor sensing device and/or a cab environment sensing device. Furthermore, in current systems only data was flowing from a remote locomotive to an operator. However, in one or more of the disclosed embodiments as described herein, more information flows and information flows between a remote locomotive and an operator and the operator may send commands to the remote locomotive to assume additional operational actions, such as diagnostics, performance, reconfiguration, etc.

As described above, the method 800 of FIG. 8, in whole or in part, may be embodied in the form of computer-implemented processes and apparatuses for practicing those processes. The method 800 of FIG. 8, in whole or in part, may also be embodied in the form of computer program code containing instructions embodied in tangible and non-transitory media, such as floppy diskettes, CD-ROMs, hard drives, or any other computer-readable storage medium, wherein, when the computer program code is loaded into and executed by a computer, the computer becomes an apparatus for practicing one or more aspects of the inventive subject matter. Existing systems having reprogrammable storage (e.g., flash memory) may be updated to implement the method 800 of FIG. 8, in whole or in part. Also as described above, the method 800 of FIG. 8, in whole or in part, may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing one or more aspects of the inventive subject matter. When implemented on a general-purpose microprocessor, the computer program code segments may configure the microprocessor to create specific logic circuits.

One or more embodiments of the inventive subject matter relate to systems (e.g., systems 1600, 270) and methods for communicating data in a locomotive consist or other vehicle consist, for inter-consist equipment sparing and redundancy. With initial reference to FIG. 16 and FIGS. 19 through 21 in overview, an embodiment of the method comprises, at 1900, receiving, at a second vehicle 1608b in a vehicle consist 1606, first data 1616 related to a first vehicle 1608a in the vehicle consist. (Data "related" to a vehicle means data originating from the vehicle, and/or data addressed to other otherwise intended for the vehicle, and/or data about the vehicle, and/or data used as a basis, indirect or direct, for controlling the vehicle.) The vehicle consist 1606 comprises at least the first vehicle 1608a and the second vehicle 1608b, with each vehicle 1608a, 1608b, 1608c in the consist being adjacent to and mechanically coupled with one or more other vehicles in the consist. The first vehicle and the second vehicle are linked by a communication channel (e.g., wireless or wired). As indicated at 1902, the method further comprises, in a second electronic component 1612b on board the second vehicle 1608b, processing the first data 1616 according to a function unavailable to the first vehicle 1608a. (An "unavailable" function is one which the first vehicle is unable to perform, due to the first vehicle not being equipped to perform the function or due to a failure, e.g., of an electronic component, on board the first vehicle.)

Figure 20:
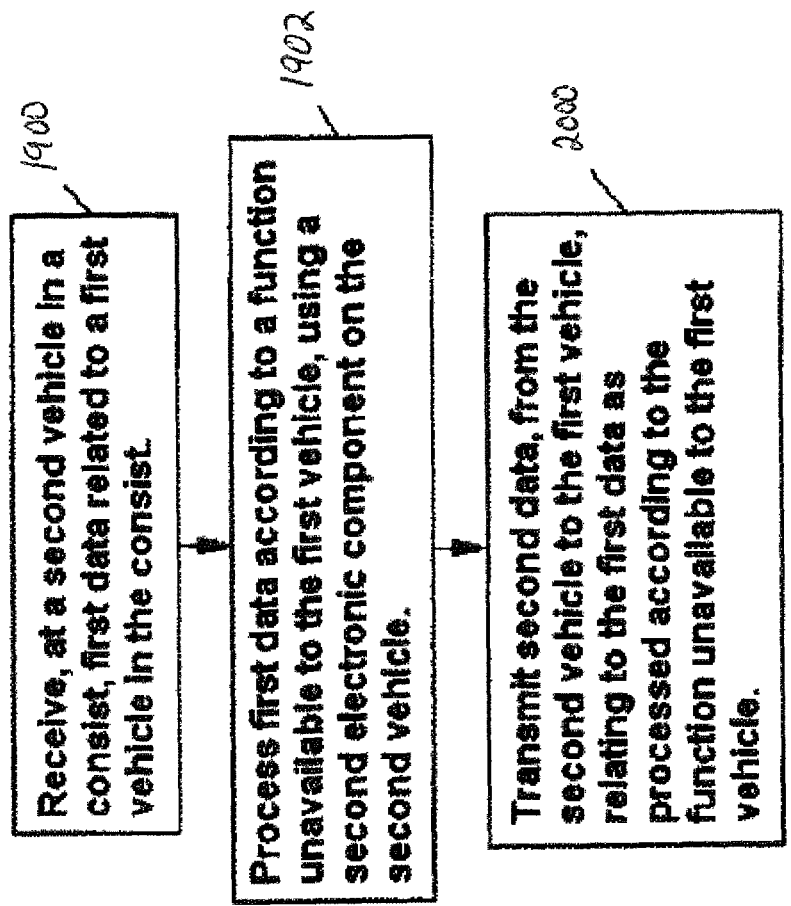
FIG. 20 is a flowchart of a method for communicating data in a vehicle consist for inter-consist equipment sparing and redundancy, according to an embodiment of the inventive subject matter.

In an embodiment, with reference to FIG. 20, the method further comprises, at 2000, transmitting second data 1622 from the second vehicle 1608b to the first vehicle 1608a over the communication channel. Alternatively, the second data 1622 may be transmitted from the second vehicle to a destination other than the first vehicle, such as an off-consist location. The second data 1622 relates to the first data as processed according to the function unavailable to the first vehicle.

Figure 21:
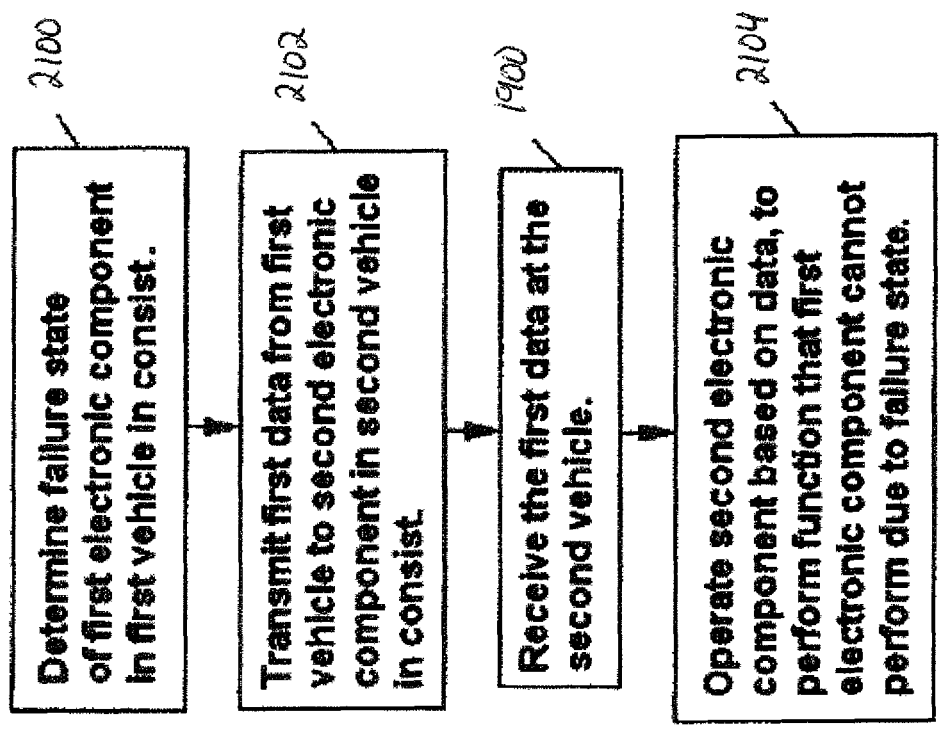
FIG. 21 is a flowchart of a method for communicating data in a vehicle consist for inter-consist equipment sparing and redundancy, according to an embodiment of the inventive subject matter.

In an embodiment, with reference to FIG. 21, a method comprises, at 2100, determining that a first electronic component 1612a in the first vehicle 1608a of the vehicle consist 1606 is in a failure state. "Failure state," or characterizing an electronic component as "having failed" or "has failed," refers to a state or condition of the first electronic component 1612a where the first electronic component 1612a is unable to perform a designated function, including being unable to perform the function at all, or being unable to perform the function in a manner that meets designated performance requirements. Upon determining the failure state, at 2102, first data 1616 is transmitted from the first vehicle 1608a to a second electronic component 1612b on the second vehicle 1608b, over a cable bus 1618 or other communication channel (e.g., wireless) linking the first vehicle and the second vehicle. The first data 1616 may be data related to the first vehicle 1608a, such as data that was intended or designated for receipt and/or processing by the first electronic component 1612a and/or control data (e.g., control instructions) originating from the first vehicle and used for controlling the second electronic component 1612b, and/or other data. At 2104, the second electronic component 1612b is operated based on the first data 1616 (e.g., it performs some function on or according to the data), for performing the designated function that the first electronic component 1612a is unable to perform.

In this manner, the sparing and redundancy system 1600 is able to remote "spare" or "swap" equipment between locomotives or other vehicles in a consist. If an electronic component connected to the cable bus or other communication channel (which in an embodiment is configured as part of a network, as described above) fails in one vehicle, a similar electronic component in another vehicle is used instead, through coordination of control functions and transfer of data over the cable bus or other communication channel (e.g., network) as facilitated by the control coordination systems. Advantageously, this provides a higher degree of dispatch reliability and lower costs to equip a locomotive or other vehicle, since each vehicle will not require redundant equipment. The redundancy is automatically provided by having multiple vehicles in the consist.

In the system(s) and method(s) for inter-consist equipment sparing and redundancy, data is transmitted between locomotives or other vehicles in a consist, over a communication channel linking the vehicles in the consist. The communication channel may be implemented using wireless technology (e.g., each vehicle is outfitted with a radio transceiver), a communication system such as described below in regards to FIGS. 9 to 14, or another type of electrical cable system (e.g., electrical conductors that extend between and interconnect the vehicles for communication purposes). The communication system of FIGS. 9 to 14 will now be described in detail, as one example. The system and method for inter-consist equipment sparing and redundancy is further described below. These systems and methods may be used in conjunction with one or more of the previously described aspects of the inventive subject matter.

Figure 9:
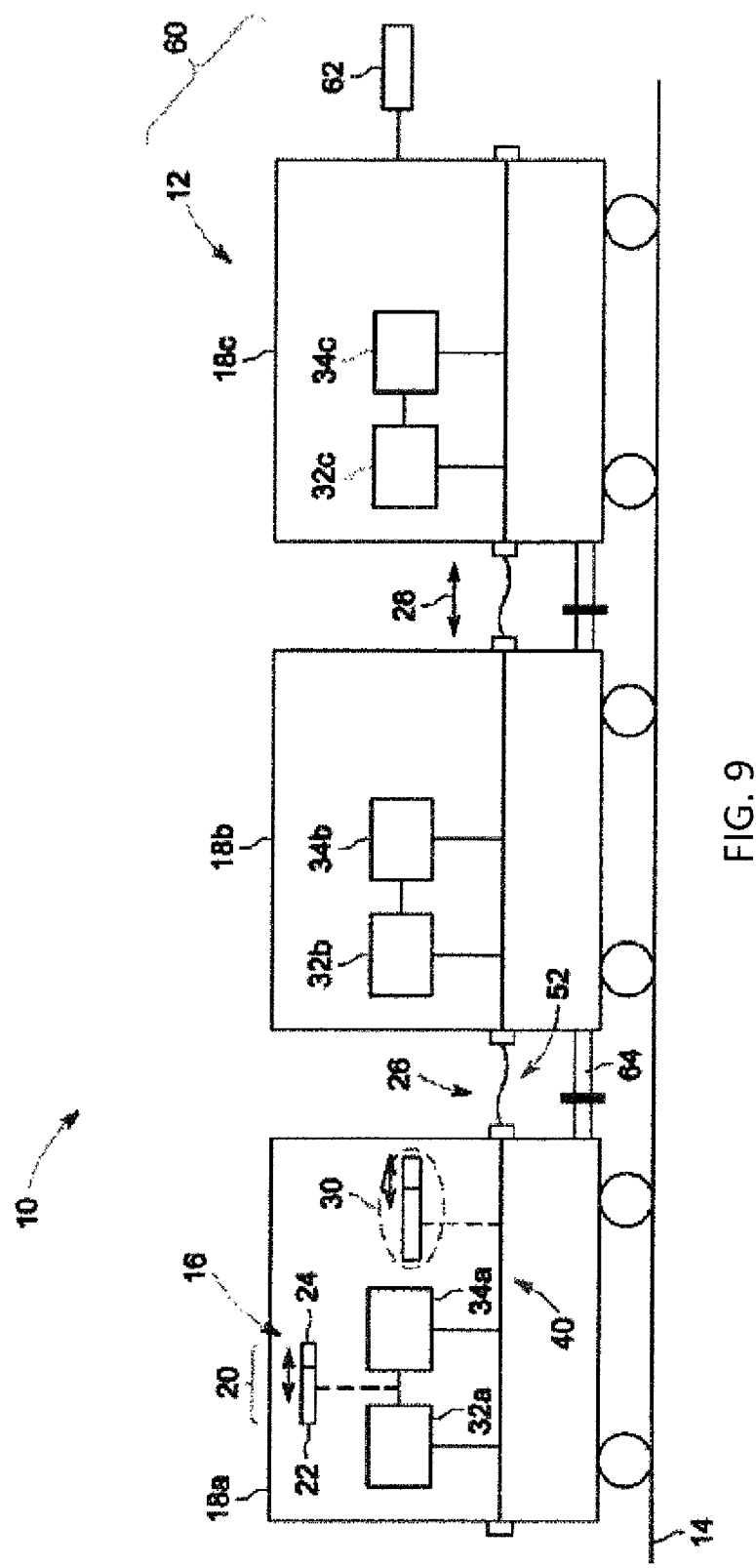
FIG. 9 is a schematic diagram of a communication system for communicating data in a locomotive consist, according to an embodiment of the inventive subject matter.

FIG. 9 shows a communication system 10 and method for communicating data in a locomotive consist 12. The consist comprises a group of locomotives 18a-18c that are mechanically coupled or linked together to travel along a railway 14. In the system 10, network data (e.g., information that is communicated in data packets) or other data 16 is transmitted from one propulsion-generating vehicle 18a in the consist 12 (e.g., a lead locomotive 18a) to another propulsion-generating vehicle 18b in the consist (e.g., a trail locomotive 18b). Each locomotive 18a-18c is adjacent to and mechanically coupled with another locomotive in the consist 12 such that all locomotives in the consist are connected. "Network data" 16 refers to data that is packaged in packet form, meaning a data packet that comprises a set of associated data bits 20. (Each data packet may include a data field 22 and a network address or other address 24 uniquely associated with a computer unit or other electronic component in the consist 12.) The network data 16 is transmitted over a locomotive MU cable bus 26. The MU cable bus 26 is an existing electrical bus interconnecting the lead locomotive 18a and the trail locomotives 18b, 18c in the consist. The MU cable bus 26 is used in the locomotive consist 12 for transferring non-network control information 28 between locomotives in the consist. "Non-network" control information 28 refers to data or other information, used in the locomotive consist for control purposes, which is not packet data. In another aspect, non-network control information 28 is not packet data, and does not include recipient network addresses. In another aspect, non-network control information is low bandwidth or very low bandwidth data.

In an embodiment, as discussed in more detail below, the network data 16 is converted into modulated network data 30 for transmission over the MU cable bus 26. The modulated network data 30 is orthogonal to the non-network control information 28 transferred between locomotives over the MU cable bus 26, to avoid interference. At recipient/subsequent locomotives, modulated network data 30 (shown in FIG. 12) is received over the MU cable bus 26 and de-modulated for use by a locomotive electronic component 32a, 32b, 32c. For these functions, the communication system 10 may comprise respective router transceiver units 34a, 34b, 34c positioned in the lead locomotive 18a and each of the trail or remote locomotives 18b, 18c in the locomotive consist 12.

Figure 10:
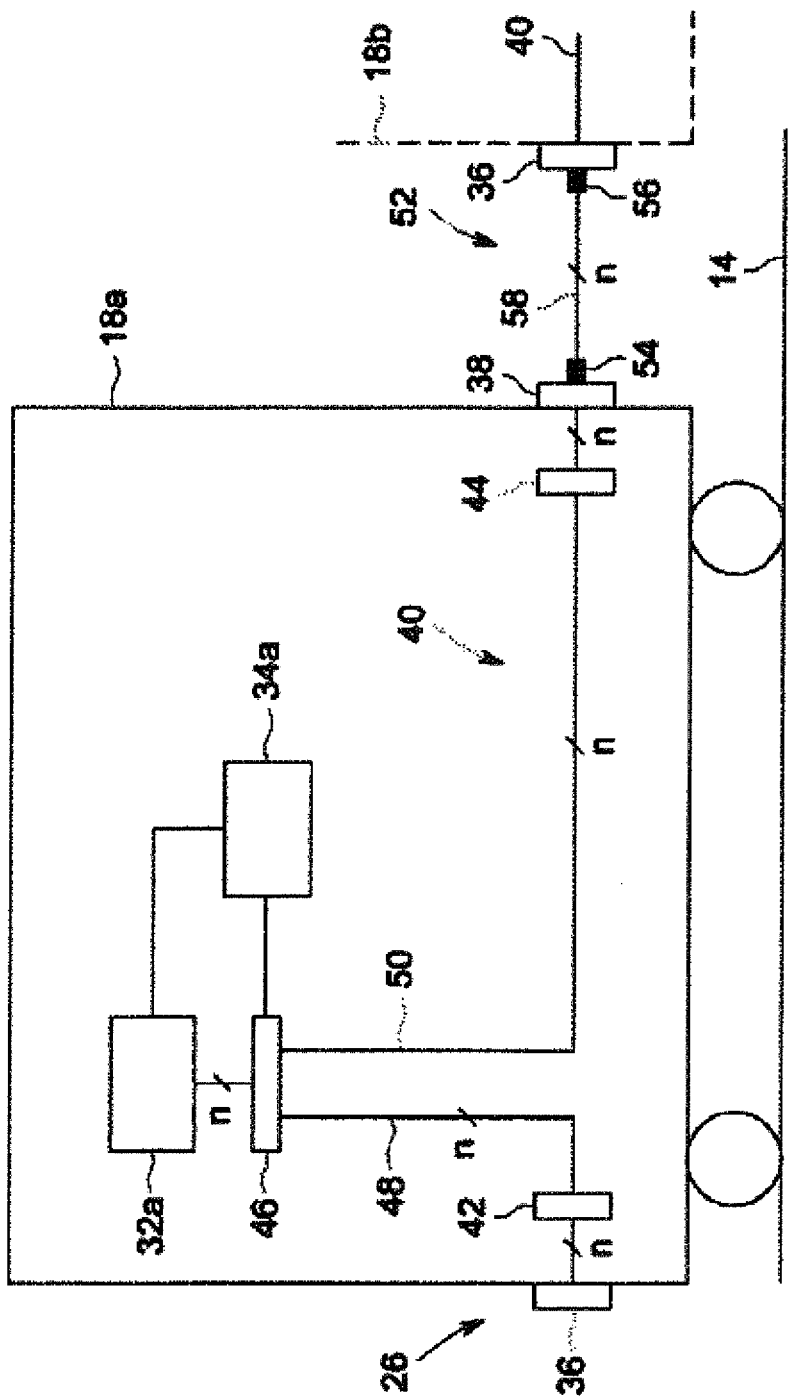
FIG. 10 is a schematic diagram of an MU cable bus in a locomotive, shown in the context of the communication system of FIG. 1.

One example of an MU cable bus 26 is shown in more detail in FIG. 10. Other configurations are possible, depending on the type of locomotive involved. As noted above, the MU cable bus 26 is an existing electrical bus interconnecting the lead locomotive 18a and the trail locomotives 18b, 18c in the consist. In each locomotive, e.g., the lead locomotive 18a as shown in FIG. 10, the MU cable bus 26 comprises a front MU port 36, a rear MU port 38, and an internal MU electrical system 40 that connects the front port 36 and the rear port 38 to one or more electronic components 32a of the locomotive 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the locomotive 18a may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

Figure 11:
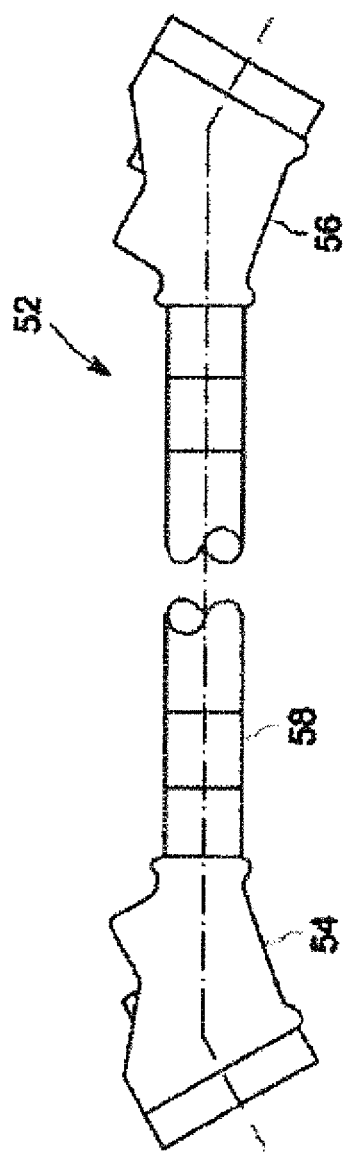
FIG. 11 is a schematic diagram of an MU cable jumpers.

As shown in FIGS. 10 and 11, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent locomotives 18a, 18b. As such, for each adjacent pair of locomotives 18a, 18b, one plug end 54 of an MU cable jumper 52 is attached to the rear MU port 28 of the front locomotive 18a, and the other plug end 56 of the MU cable jumper 52 is attached to the front MU port 36 of the rear locomotive 18b. The flexible cable portion 58 of the MU cable jumper 52 extends between the two plug ends, providing a flexible but secure electrical connection between the two locomotives 18a, 18b.

Depending on the particular type and configuration of locomotive, the electrical conduit portions 48, 50 and MU cable jumpers 52 may be configured in different manners, in terms of the number "n" ("n" is a real whole number equal to or greater than 1) and type of discrete electrical pathways included in the conduit or jumper. In one example, each conduit portion 48, 50 and the jumper cable portion 58 comprises a plurality of discrete electrical wires, such as 12-14 gauge copper wires. In another example, the cable portion 58 (of the MU cable jumper 52) comprises a plurality of discrete electrical wires, while the conduit portions 48, 50 each include one or more discrete electrical wires and/or non-wire electrical pathways, such as conductive structural components of the locomotive, pathways through or including electrical or electronic components, circuit board traces, or the like. Although certain elements in FIG. 10 are shown as including "n" discrete electrical pathways, it should be appreciated that the number of discrete pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discrete electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the locomotive) on which terminals for wires or cables have been mounted. This provides flexibility in terms of connecting different electronic components to the MU cable bus.

The MU cable bus 26 is used in the locomotive consist 12 for transferring non-network control information 28 between locomotives 18a, 18b, 18c in the consist. As noted above, "non-network" control information 28 is data or other information, used in the locomotive consist for control purposes, which is not packet data. In another aspect, non-network control information 28 is not packet data, and does not include recipient network addresses. In another aspect, non-network control information is low bandwidth or very low bandwidth. The non-network control information 28 is transmitted over the MU cable bus 26 according to a designated voltage carrier signal (e.g., a 74 volt on/off signal, wherein 0V represents a digital "0" value and +74 volts a digital "1" value or an analog signal 0 to 74 volts, wherein the 0 to 74 volt voltage level may represent a specific level or percentage of functionality). The non-network control information is transmitted and received using one or more electronic components 32a-32c in each locomotive that are configured for this purpose.

The term "MU cable bus" refers to the entire MU cable bus or any portion(s) thereof, e.g., terminal boards, ports, jumper cable, conduit portions, and the like. As should be appreciated, when two locomotives are connected via an MU cable jumper 52, both the MU cable jumper 52 and the internal MU electrical systems 40 of the two locomotives together form the MU cable bus. As subsequent locomotives are attached using additional MU cable jumpers 52, those cable jumpers and the internal MU electrical systems 40 of the subsequent locomotives also become part of the MU cable bus.

As indicated in FIG. 9, the vehicle consist 12 may be part of a vehicle system 60 (e.g., a train) that includes the consist 12, a plurality of non-propulsion-generating vehicles 62 (e.g., railcars), and possibly additional propulsion-generating vehicles and/or consists (e.g., locomotives or locomotive consists, not shown). Each locomotive 18a-18c in the consist 12 is mechanically coupled to at least one other, adjacent locomotive in the consist 12, through a coupler 64. The railcars 62 are similarly mechanically coupled together and to the locomotive consist to form a series of linked vehicles. The non-network control information may be used for locomotive control purposes or for other control purposes in the train 60.

As discussed above, the communication system 10 may comprise respective router transceiver units 34a, 34b, 34c positioned in the lead locomotive 18a and each of the trail locomotives 18b, 18c in the locomotive consist 12. The router transceiver units 34a, 34b, 34c are each electrically coupled to the MU cable bus 26. The router transceiver units 34a, 34b, 34c are configured to transmit and/or receive network data 16 over the MU cable bus 26. In an embodiment, each router transceiver unit receives network data 16 from a computer unit or other electronic component 32a, 32b, 32c in the locomotive consist 12, and modulates the received network data 16 into modulated network data 30 for transmission over the MU cable bus 26. Similarly, each router transceiver unit 34a, 34b, 34c receives modulated network data 30 over the MU cable bus 26 and de-modulates the received modulated network data 30 into network data 16. "Modulated" means converted from one form to a second, different form suitable for transmission over the MU cable bus 26. "De-modulated" means converted from the second form back into the first form. The modulated network data 30 is orthogonal to the non-network control information 28 transferred between locomotives over the MU cable bus 26. "Orthogonal" means that the modulated network data does not interfere with the non-network control information, and that the non-network control information does not interfere with the modulated network data (at least not to the extent that would corrupt the data). At recipient/subsequent locomotives, the modulated network data 30 is received over the MU cable bus 26 and de-modulated back into the network data 16 for use by a locomotive electronic component 32a, 32b, 32c.

The network data 16 is data that is packaged in packet form, meaning a data packet that comprises a set of associated data bits 20. Each data packet 20 may include a data field 22 and a network address or other address 24 uniquely associated with a computer unit or other electronic component 32a-32c in the consist 12. The network data 16 may be TCP/IP-formatted or SIP-formatted data, however, the electronic components and/or router transceiver units may use other communications protocols for communicating network data. As should be appreciated, the MU cable bus 26, electronic component 32a-32c, and router transceiver units 34a-34c together form a local area network. In an embodiment, these components are configured to form an Ethernet network.

Figure 12:
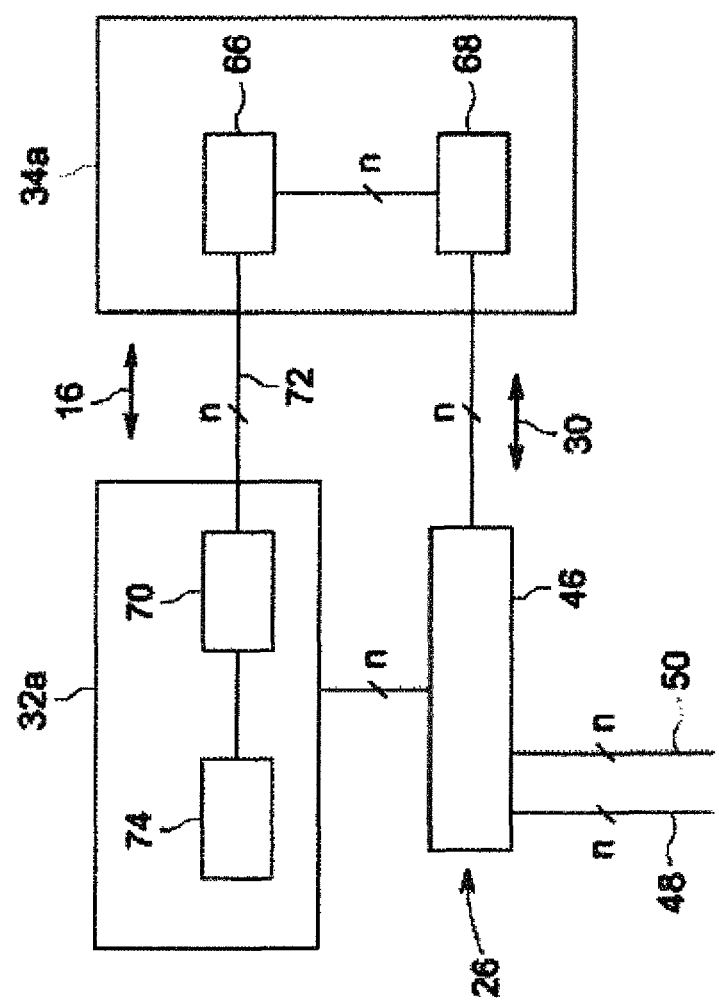
FIG. 12 is a schematic diagram of a router transceiver unit according to an embodiment.

FIG. 12 shows an embodiment of a router transceiver unit 34a in more detail. The router transceiver unit 34a comprises a network adapter module 66 and a signal modulator module 68. The signal modulator module 68 is electrically connected to the network adapter module 66 and to the MU cable bus 26. In the example shown in FIG. 12, the signal modulator module 68 is electrically connected to the MU cable bus 26 by way of the central terminal board 46, near a locomotive electronic component 32a. The network adapter module 66 is electrically connected to a network interface unit 70 that is part of and/or operably connected to the electronic component 32a. (The electronic component 32a may be, for example, a computer unit for controlling a locomotive.) The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32a that are configured for network communications. In an embodiment, the network interface unit 70, network cable 72, and software or hardware applications 74 include standard Ethernet-ready (or other network) components. For example, if the electronic component 32a is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which it then conveys to the network adapter module 66 for transmission to the network interface unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one both of the network adapter module 66 and the signal modulator module 68 may perform network data routing functions.

The signal modulator module 68 includes an electrical output (e.g., port, wires) for electrical connection to the MU cable bus 26, and internal circuitry (e.g., electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bitrate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data 16.

Figure 13:
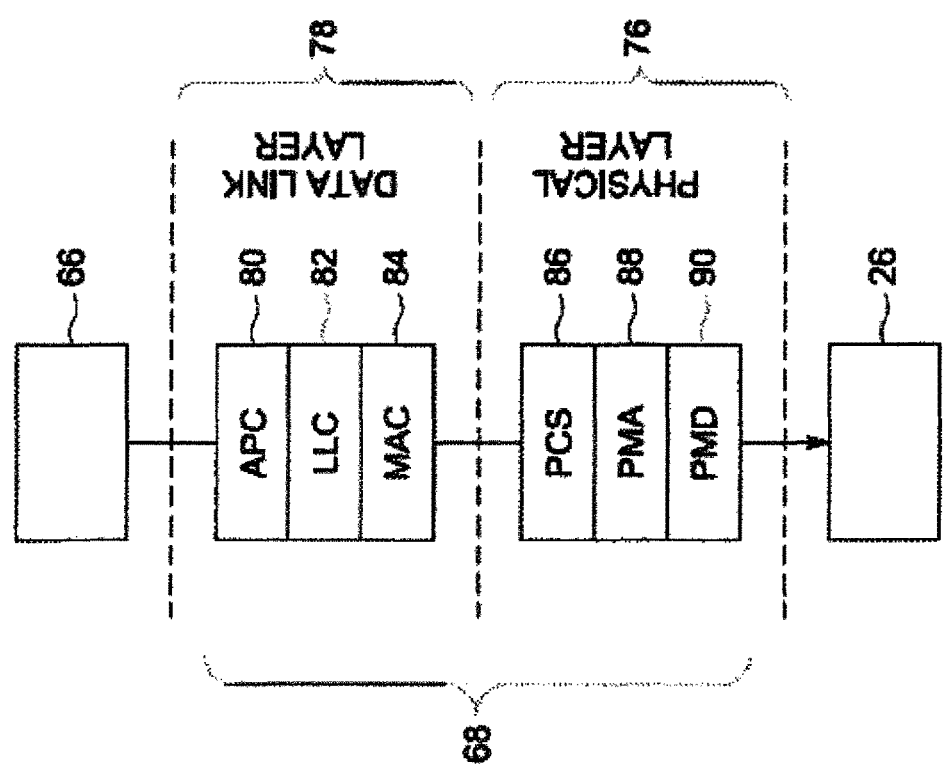
FIG. 13 is a schematic diagram illustrating the functionality of a signal modulator module portion of a router transceiver unit, according to an embodiment of the inventive subject matter.

FIG. 13 shows one possible example of how the signal modulator module 68 could function, cast in terms of the OSI network model, according to an embodiment of the inventive subject matter. In this example, the signal modulator module 68 includes a physical layer 76 and a data link layer 78. The data link layer 78 is divided into three sub-layers. The first sub-layer is an application protocol convergence (APC) layer 80. The APC layer accepts Ethernet (or other network) frames 16 from an upper application layer (e.g., the network adapter module 66) and encapsulates them into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus. The other sub-layers are medium independent, i.e., do not depend on the configuration of the MU cable bus.

Figure 14:
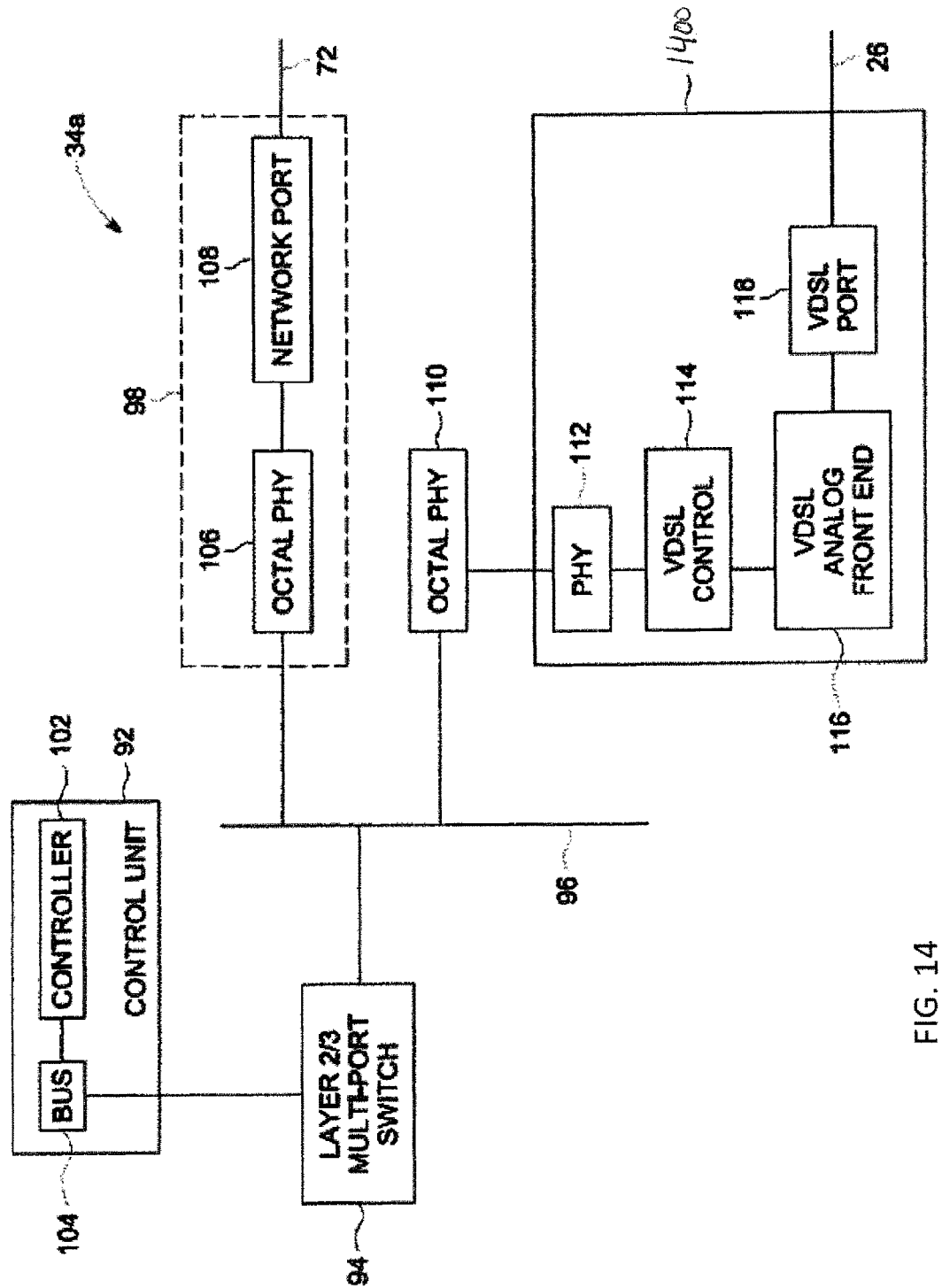
FIG. 14 is a circuit diagram of an embodiment of a router transceiver unit.

FIG. 14 is a circuit diagram of an embodiment of a router transceiver unit 34a. In this embodiment, the router transceiver unit 34a comprises a control unit 92, a switch 94, a main bus 96, a network interface portion 98, and a VDSL module 1400. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle) for receiving a network cable 72.

The VDSL module 1400 is also connected to the main bus 96 by way of an octal PHY unit 110, which may be the same unit as the octal PHY portion 106 or a different octal PHY unit. The VDSL module 1400 comprises a physical interface portion (PHY) 112 electrically connected to the octal PHY unit 110, a VDSL control 114 electrically connected to the physical interface portion 112, a VDSL analog front end unit 116 electrically connected to the VDSL control 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL control 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 1400 to the MU cable bus 26. Overall operation of the router transceiver unit 34a shown in FIG. 14 is similar to what is described in relation to FIGS. 9, 10, and 12.

An embodiment of the inventive subject matter relates to a method for communicating data in a locomotive consist 12. The method comprises transmitting network data 16, 30 between locomotives 18a-18c within a locomotive consist 12. (Each locomotive 18a-18c is adjacent to and mechanically coupled with one or more other locomotives in the consist.) The network data 16, 30 is transmitted over an MU cable bus 26 interconnecting at least adjacent locomotives 18a, 18b in the consist 12. The MU cable bus 12 is an existing cable bus used in the locomotive consist 12 for transferring non-network control information 28 between locomotives 18a-18c in the consist 12.

In an embodiment, the method further comprises, at one or more of the locomotives 18a-18c in the locomotive consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32a-32c of the locomotives. Certain locomotives in a consist may be network equipped according to the system and method of the inventive subject matter, e.g., outfitted with a router transceiver unit, and that other locomotives in the consist are not. For example, there may be first and third network-equipped locomotives physically separated by a second locomotive that is not network equipped. In this case, the first and third locomotives are still able to communicate and exchange data even though there is a non-network equipped locomotive between them. This is possible because all the locomotives are still electrically connected via the MU cable bus. In one case, for example, a locomotive consist comprises first, second, and third locomotives, with the second locomotive being disposed between the first and third locomotives. A first router transceiver unit is positioned in the first locomotive, and a second router transceiver unit is positioned in the third locomotive. The second locomotive, however, does not have a router transceiver unit or other functionality for transmitting and/or receiving network data over the MU cable bus. Nevertheless, network data is transmitted between the first and third locomotives through the second locomotive, with the network data passing through a portion of the MU cable bus in the second locomotive but not being transmitted or received by the second locomotive. In an embodiment, the method further comprises controlling at least one of the locomotives 18a-18c in the consist based at least in part on the network data 16.

The locomotive consist 12 may be part of a vehicle system 60 (e.g., a train) that comprises the locomotive consist 12 and a plurality of railcars 62. Here, the non-network control information 28 may be train control information that is transmitted over the MU cable bus according to a designated voltage carrier signal (e.g., +74V).

Figure 15:
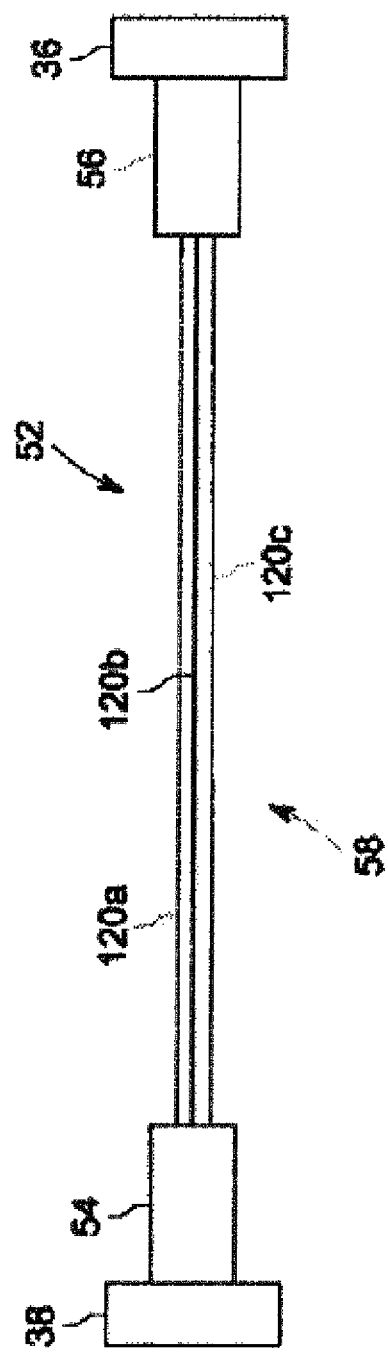
FIG. 15 is another schematic diagram of an MU cable jumpers.

With reference to FIG. 15, if the MU cable jumper 52 and/or internal electrical system 40 includes plural discrete electrical wires or other electrical pathways, e.g., three discrete electrical wires 120a-120c as shown in FIG. 15, it may be the case that network data 30 is transmitted over only one of the plural discrete electrical wires or other electrical pathways. This may depend on what each pathway is used for in the locomotive consist and what type of information it carries. For example, it may be undesirable to transmit network data over a wire 120a that carries analog non-network data, whereas a wire 120*b* that carries a digital signal (on +V, off 0 V) is more desirable for transmitting network data.

An embodiment of the inventive subject matter relates to a communication system 10 for communicating data in a locomotive consist 12. The system 10 comprises a respective router transceiver unit 34*a*-34*c* positioned in each locomotive 18*a*-18*c* of a locomotive consist 12. Each router transceiver unit 34*a*-34*c* is coupled to a locomotive multiple unit (MU) cable bus 26 in the locomotive consist 12 that interconnects adjacent locomotives 18*a*, 18*b*. The MU cable bus 16 is an existing cable bus used in the locomotive consist for transferring non-network control information 28 between locomotives within the locomotive consist. Each router transceiver unit 34*a*-34*c* is configured to transmit and/or receive network data 16, 30 over the MU cable bus 26.

In an embodiment of the system 10, each router transceiver unit 34*a*-34*c* is configured to convert the network data 16 into modulated network data 30 for transmission over the MU cable bus 26. The modulated network data being orthogonal to the non-network control information transferred between locomotives over the MU cable bus. Each router transceiver unit is further configured to de-modulate the modulated network data received over the MU cable bus for use by electronic components in the locomotives of the consist.

An embodiment of the inventive subject matter relates to a communication system for communicating data in a locomotive consist 12. In this embodiment, the system comprise a respective router transceiver unit 34*a*-34*c* positioned in each of a plurality of locomotives 18*a*-18*c* in the consist 12. The system further comprises, in each of the plurality of locomotives, a respective electronic component 32*a*-32*c* (e.g., computer unit) positioned in the locomotive and operably coupled to the router transceiver unit in the locomotive. The router transceiver units 34*a*-34*c* are electrically coupled to an MU cable bus 26, which is an existing cable bus used in the consist for transferring non-network control information 28 between the plurality of locomotives. The router transceiver units 34*a*-34*c* are configured to transmit and/or receive network data 16, 30 over the MU cable bus 16, the network data originating at one of electronic components 32*a*-32*c* and being addressed to another of the electronic components 32*a*-32*c*. Each router transceiver unit may be configured to convert the network data into modulated network data for transmission over the MU cable bus (the modulated network data being orthogonal to the non-network control information transferred between locomotives over the MU cable bus), and to de-modulate the modulated network data received over the MU cable bus for use in one of the electronic components.

An embodiment relates to a communication system for communicating data in a locomotive consist 12. The system comprises a computer network in the consist. The computer network comprises a respective electronic component 32*a*-32*c* positioned in each of a plurality of locomotives 18*a*-18*c* in the consist 12 and a locomotive multiple unit (MU) cable bus 26. The MU cable bus 26 interconnects the electronics components and is an existing cable bus used in the consist for transferring non-network control information 28 between the locomotives. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to carry out the functionality of the router transceiver units 34*a*-34*c* as described above, and/or the router transceiver units 34*a*-34*c* are part of (or comprise) the electronic components. The computer network may be an Ethernet network.

An embodiment relates to a method for retrofitting a vehicle (e.g., a locomotive) for network data communications. The method comprises outfitting a locomotive with a router transceiver unit, interfacing the router transceiver unit with an electronic component of the locomotive, and interfacing the router transceiver unit with a multiple unit (MU) cable bus of the locomotive. The MU cable bus is an existing cable bus used for transferring non-network control information between locomotives in a consist. The router transceiver unit is configured to transmit and/or receive network data over the MU cable bus.

An embodiment relates to a method for retrofitting a locomotive consist for network data communications. The method comprises, at each of a plurality of locomotives 18*a*-18*c* in a consist 12, outfitting the locomotive with a respective router transceiver unit 34*a*-34*c*, interfacing the router transceiver unit 34*a*-34*c* with an electronic component 32*a*-32*c* of the locomotive, and interfacing the router transceiver unit 34*a*-34*c* with a multiple unit (MU) cable bus 26 of the locomotive. The MU cable bus is an existing cable bus used for transferring non-network control information between locomotives in the consist. Each router transceiver unit is configured to transmit and/or receive network data 16, 30 over the MU cable bus 26.

Any of the aforementioned embodiments are also applicable for communicating data in vehicle consists generally. "Vehicle consist" refers to a group of vehicles that are mechanically coupled or linked together to travel along a route.

For example, an embodiment of the inventive subject matter relates to a system and method for communicating data in a vehicle consist 12. Network data 16, 30 is transmitted from a first vehicle 18*a* in the vehicle consist 12 to a second vehicle 18*b* in the vehicle consist. The network data 16, 30 is transmitted over an existing electrical cable bus 26 that interconnects the first vehicle 18*a* and the second vehicle 18*b*. The existing electrical cable bus 26 is used in the vehicle consist 12 for transferring non-network control information 28 between the first vehicle and the second vehicle. As should be appreciated, this method and system is applicable to communicating data between any of the linked vehicles 18*a*-18*c*, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

The network data may be TCP/IP-formatted or SIP-formatted data. Additionally, each vehicle may include a computer unit, with the computer units 32*a*-32*c* communicating with one another by transmitting the network data, formatted as TCP/IP data or SIP data or otherwise, over the existing electrical cable bus 26, and the computer units thereby forming a computer network, e.g., an Ethernet-type network.

The data transmitted over the MU cable bus may be "high bandwidth" data, meaning data transmitted at average rates of 10 Mbit/sec or greater. ("High bandwidth network data" is data that is packaged in packet form as data packets and transmitted over the MU cable bus at average rates of 10 Mbit/sec or greater.) This reflects that the communication system (and associated method) are applicable for realizing a high information density communication environment in a locomotive consist, e.g., it is possible to exchange relatively large amounts of data between locomotives in a timely manner. "Low bandwidth" data is data transmitted at average rages of less than 10 Mbit/sec. "Very low bandwidth" data is data transmitted at average rates of 1200 bits/sec or less.

Turning back to FIGS. 16 through 21, the systems and methods for communicating data in a locomotive consist or other vehicle consist, for inter-consist equipment sparing and redundancy, will now be described in more detail. The systems and methods may be implemented using the system architecture of any of the embodiments described above, or they may be implemented using wireless communication technology or another type of wire-based communication system.

Figure 16:
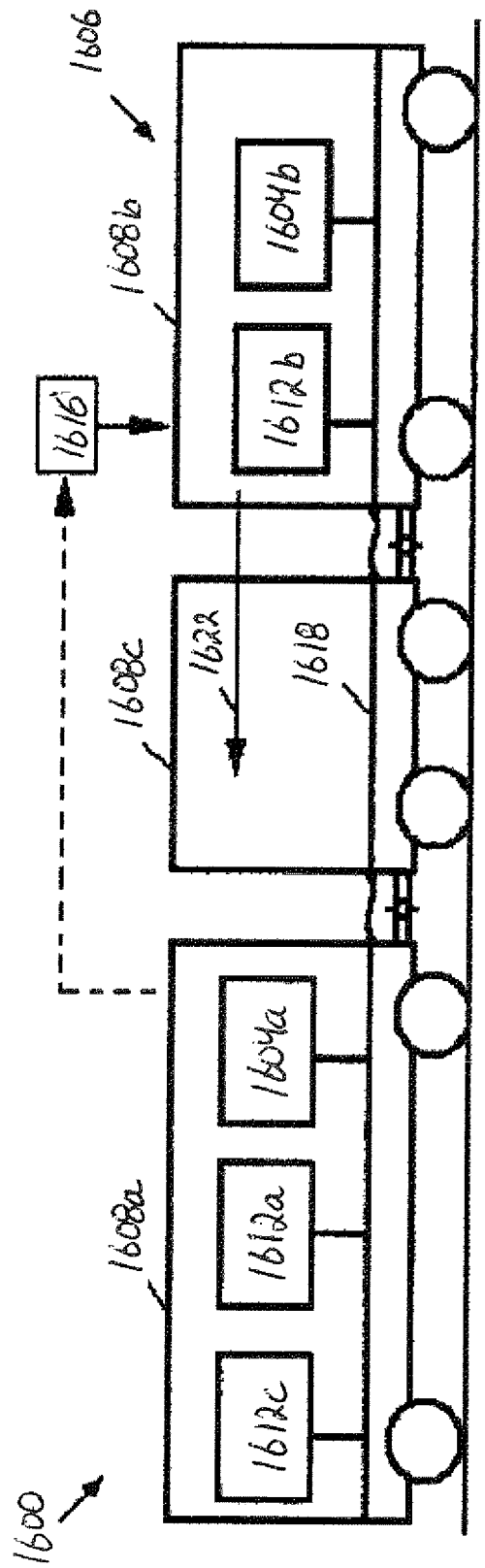
FIG. 16 is a schematic diagram of a system for communicating data in a vehicle consist for inter-consist equipment sparing and redundancy, according to an embodiment of the inventive subject matter.
Figure 19:
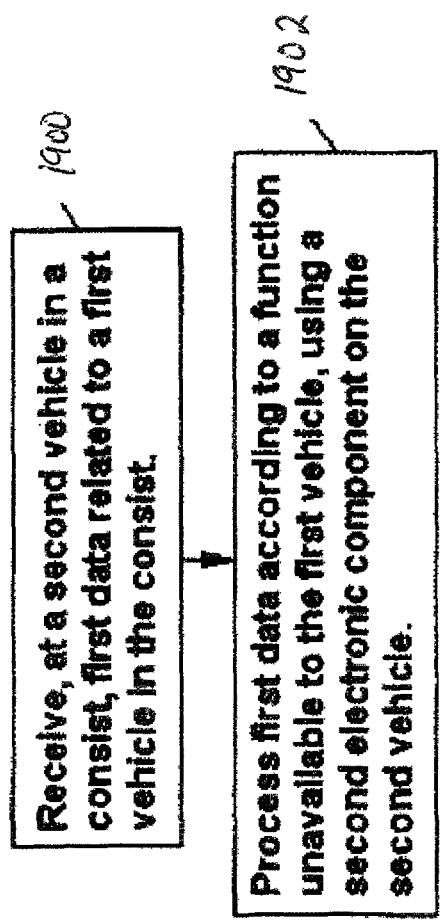
FIG. 19 is a flowchart of a method for communicating data in a vehicle consist for inter-consist equipment sparing and redundancy, according to an embodiment of the inventive subject matter.

FIG. 16 is illustrative of several embodiments of a system 1600 for locomotive inter-consist equipment sparing and redundancy. FIGS. 19 through 21 illustrate several embodiments of associated methods for communicating data in a vehicle consist. The system 1600 comprises a respective control coordination system 1604a, 1604b on each of at least two vehicles in a vehicle consist 1606, e.g., a first vehicle 1608a and a second vehicle 1608b. (As above, the vehicle consist 1606 comprises at least the first vehicle 1608a and a second vehicle 1608b, and possibly other vehicles 1608c, with each vehicle 1608a-1608c in the consist being adjacent to and mechanically coupled with one or more other vehicles in the consist. In an embodiment, the vehicles 1608a, 1608b are locomotives in a locomotive consist that is part of a train.) The control coordination systems 1604a, 1604b may be separate and distinct controller units (e.g., computer units), or they may be centralized or distributed functional elements (e.g., implemented using control logic, control circuitry, or otherwise) incorporated into other components of the vehicles, such as, but not limited to, the router transceiver units discussed above, or they may be a combination thereof (e.g., some coordination units are separate/distinct control units, and others are integrated functional components in another electronic or other component in a vehicle). In any case, the control coordination systems 1604a, 1604b are configured to coordinate carrying out one or more of the methods for communicating data within the system 1600.

In an embodiment, the method comprises receiving, at 1900, at a second vehicle 1608b in a vehicle consist 1606, first data 1616 related to a first vehicle 1608a in the vehicle consist. (As noted above, data "related" to a vehicle means data originating from the vehicle, and/or data addressed to other otherwise intended for the vehicle, and/or data about the vehicle, and/or data used as a basis, indirect or direct, for controlling the vehicle.) The first vehicle and the second vehicle are linked by a communication channel (e.g., wireless or wired). As indicated at 1902, the method further comprises, in a second electronic component 1612b onboard the second vehicle 1608b, processing the first data 1616 according to a function unavailable to the first vehicle 1608a. (As also noted above, an "unavailable" function is one which the first vehicle is unable to perform, due to the first vehicle not being equipped to perform the function or due to a failure, e.g., of an electronic component, on board the first vehicle.) The method can be used for sparing failed components, as described herein; however, in a broader sense, the method relates to processing data for a first vehicle using equipment on a second vehicle, for avoiding the need to outfit the first vehicle with the equipment (for example).

In an embodiment, with reference to FIG. 21, a method comprises, at 2100, determining that a first electronic component 1612a in the first vehicle 1608a of the vehicle consist 1606 is in a failure state. (As also noted above, "failure state," or characterizing an electronic component as "having failed" or "has failed," refers to a state or condition of the first electronic component 1612a where the first electronic component 1612a is unable to perform a designated function, including being unable to perform the function at all, or being unable to perform the function in a manner that meets designated performance requirements.) Upon determining the failure state, at 2102, first data 1616 is transmitted from the first vehicle 1608a to a second electronic component 1612b on the second vehicle 1608b, over a cable bus 1618 or other communication channel (e.g., wireless) linking the first vehicle and the second vehicle. The first data 1616 may be data related to the first vehicle 1608a, such as data that was intended or designated for receipt and/or processing by the first electronic component 1612a and/or control data (e.g., control instructions) originating from the first vehicle and used for controlling the second electronic component 1612b, and/or other data. At 2104, the second electronic component 1612b is operated based on the first data 1616 (e.g., it performs some function on or according to the data), for performing the designated function that the first electronic component 1612a is unable to perform.

In this manner, the sparing and redundancy system 1600 is able to remote "spare" or "swap" equipment between locomotives or other vehicles in a consist. If an electronic component connected to the cable bus or other communication channel (which in an embodiment is configured as part of a network, as described above) fails in one vehicle, a similar electronic component in another vehicle is used instead, through coordination of control functions and transfer of data over the cable bus or other communication channel (e.g., network) as facilitated by the control coordination systems. Advantageously, this provides a higher degree of dispatch reliability and lower costs to equip a locomotive or other vehicle, since each vehicle will not require redundant equipment. The redundancy is automatically provided by having multiple vehicles in the consist.

In an embodiment, for example, the electronic component 1612a is a data radio located on a lead locomotive 1608a, which communicates data from an on-board computer or other electronic component to a wayside or office device. If this radio device were to fail, a similar radio device 1612b on a trail locomotive 1608b is used in its place, under coordination and control of the control coordination systems, and by transferring data over the network implemented over the MU cable bus, for example. (As noted, an electronic component is "similar" to another electronic component if it can perform one or more functions of the other electronic component, within designated tolerance/performance levels.) In an embodiment, a camera system records data from the front end of the lead locomotive 1608a and stores the data in a long-term storage device 1612a also on the lead locomotive. Should the long-term storage device 1612a become inoperative or damaged in a collision or otherwise, the data is stored either redundantly or alternatively on a similar storage device 1612b on a trail locomotive 1608b. In an embodiment, if an on-board operator control computer in a first vehicle enters a failure state, then a similar on-board computer on a second vehicle in the consist is used instead, in part by "remoting" the display output and keyboard input to the lead locomotive. That is, the keyboard input or other control input would be transmitted from the first vehicle to the on-board computer on the second vehicle, and the display output of the on-board computer on the second vehicle would be routed back to the operator display on the first vehicle.

In an embodiment, with reference to FIG. 20, a method further comprises, at 2000, transmitting second data 1622 from the second vehicle 1608b to the first vehicle 1608a over the communication channel. Alternatively, the second data 1622 may be transmitted from the second vehicle to a destination other than the first vehicle, such as an off-consist location. The second data 1622 relates to the first data as processed according to the function unavailable to the first vehicle. As described in more detail below, the operation at 2000 is also applicable to the method of FIG. 21, such as subsequent operation 2104.

For example, a method may additionally comprise transmitting second, return data 1622 (data sent in response to receiving other data) from the second electronic component 1612b to the first vehicle 1608a over the cable bus 1618 or other communication channel, where the return data corresponds to a data format of the first electronic component, and where the return data is used by one or more "third" electronic components 1612c on the first vehicle. This means that the return data 1622 is formatted in a manner that allows it to be used/processed by the third electronic components 1612c in the first vehicle, as if it had instead originated at the first electronic component (the electronic component on the first vehicle that is in a failure state), for example.

Figure 17:
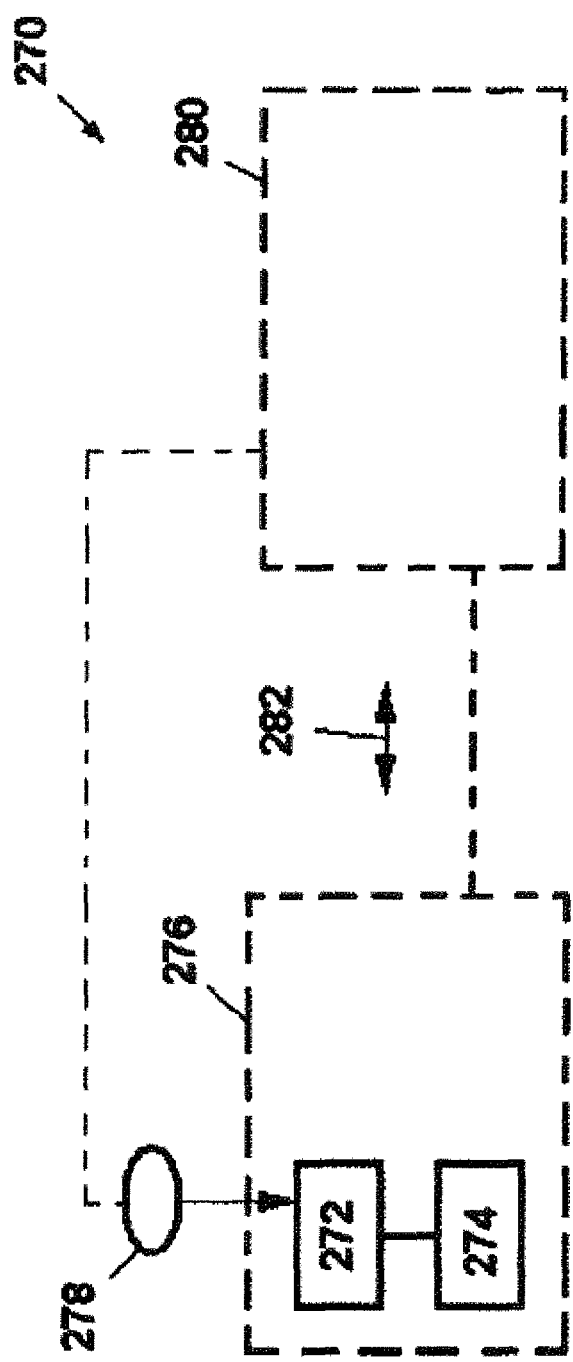
FIG. 17 is another schematic diagram of a system for communicating data in a vehicle consist for inter-consist equipment sparing and redundancy, according to an embodiment of the inventive subject matter.

FIG. 17 is a schematic diagram of an embodiment of a system 270 for communicating data in a vehicle consist. The system 270 comprises a data receiver module 272 and a data processor module 274 operably connected to the data receiver module. The data receiver module 272 is configured for deployment in a second vehicle 276 in a vehicle consist and further configured to receive first data 278 related to a first vehicle 280 in the vehicle consist. (In operation, the first vehicle is linked with the second vehicle by a communication channel 282.) The data processor module 274 is configured for processing the first data according to a function unavailable to the first vehicle 280.

Figure 18:
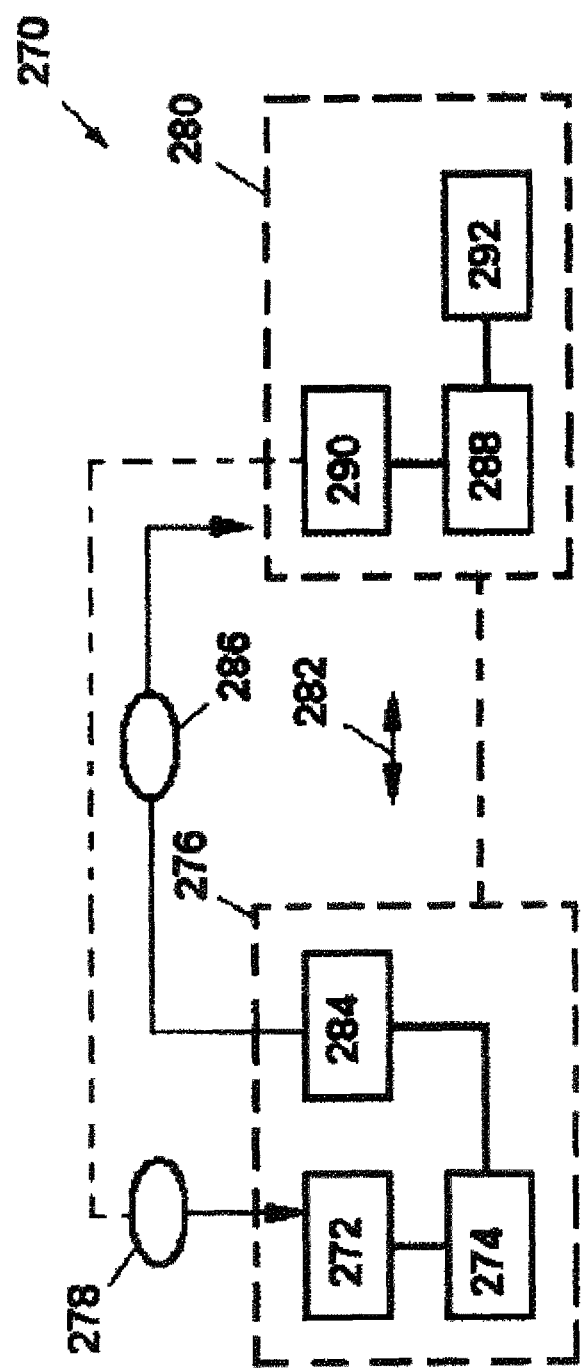
FIG. 18 is another schematic diagram of a system for communicating data in a vehicle consist for inter-consist equipment sparing and redundancy, according to an embodiment of the inventive subject matter.

In an embodiment of the system, with reference to FIG. 18, the system further comprises a second data transmitter module 284. The data processor module 274 is configured to generate second data 286 relating to the first data 278 as processed according to the function unavailable to the first vehicle. The second data transmitter module 284 is configured to transmit the second data 286 to the first vehicle.

In an embodiment of the system, still with reference to FIG. 18, the system further comprises a fault determination module 288 and a first data transmitter module 290. (The first data transmitter module 290 may be operably connected to the fault determination module 288.) The fault determination module 288 is configured for deployment in the first vehicle 280, and is further configured to determine that a first electronic component 292 in the first vehicle is in a failure state. (In the failure state, the first electronic component is unable to perform the function unavailable to the first vehicle, the function being a designated function of the first electronic component.) The first data transmitter module 290 is configured to transmit the first data 278 from the first vehicle to the second vehicle in response to the fault determination module determining that the first electronic component is in the failure state.

In an embodiment, the system includes: (i) the fault determination module 288 and the first data transmitter module 290; (ii) the fault determination module 288 is configured for deployment in the first vehicle 280, and is further configured to determine that a first electronic component 292 in the first vehicle is in a failure state; (iii) the first data transmitter module 290 is configured to transmit the first data 278 from the first vehicle to the second vehicle in response to the fault determination module determining that the first electronic component is in the failure state; (iv) the second data transmitter module 284; (v) the data processor module 274 is configured to generate second data 286 relating to the first data 278 as processed according to the function unavailable to the first vehicle; and (vi) the second data transmitter module 284 is configured to transmit the second data 286 to the first vehicle.

Each module 272, 274, 284, 288, and/or 290 may be a hardware (e.g., tangible and non-transitory) and/or software module, configured for carrying out the indicated functionality when deployed on a vehicle, e.g., when interfaced with an electronic component or other system of the vehicle. The indicated functionality may be carried out by the module itself, or in conjunction with other vehicle system elements under the control of, or as reconfigured by, the module. For example, a data transmitter module may be software-based for controlling a radio frequency transceiver unit for transmitted particular data.

Figure 24:
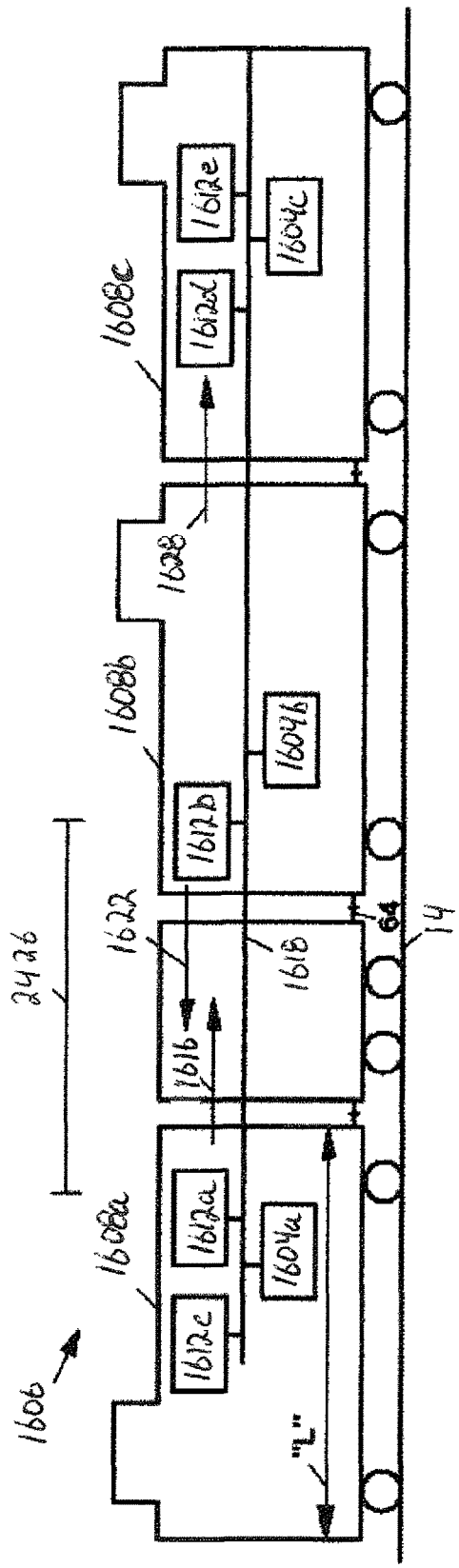
FIG. 24 is a schematic diagram of a vehicle consist according to an embodiment of the inventive subject matter.

In an embodiment, with reference to FIG. 24, the method further comprises determining a physical relationship between the first vehicle 1608a and the second vehicle 1608b in the vehicle consist 1606. The return data 1622 is used by the one or more third electronic components 1612c in consideration of the physical relationship, e.g., the return data 1622 may be adjusted or otherwise processed based at least in part on the physical relationship. In an embodiment, the physical relationship is a distance 2426 between the first vehicle and the second vehicle, including a distance between closest ends of the two vehicles or a distance between designated points on the vehicles. Taking distance or another physical relationship into account may be beneficial depending on the nature of the data 1616, the return data 1622, and the operation performed by the second, similar component 1612b on the second vehicle 1608b. For example, the return data 1622 could comprise location data (e.g., GPS data) relating to a location of vehicle consist (and/or a vehicle in the consist), with the return data being processed by adjusting the location data based on the distance. This would prevent error from being introduced into data processing/calculations if the system/component using the location data expects the data to originate at the first vehicle 1608a but the data instead comes from the second vehicle 208b.

In the case of a train, as an illustrative example, suppose a GPS unit 1612a in a first locomotive 1608a of the train enters a failure state, and is unable to provide location data of the first locomotive 1608a. The system 1600 sends data 1616 to a similar GPS unit 1612b on a second locomotive 1608b in the train, e.g., the data 1616 might be control data requesting that the GPS unit 1612b provide location data relating to the location of the second locomotive 1608b. (As should be appreciated, the GPS unit 1612b would typically be a component normally found on the second locomotive, so is not necessarily provided specially for the purpose of redundant equipment; rather, existing equipment is used for redundancy.) The GPS unit 1612b on the second locomotive 1608b transmits location data as return data 1622 to a third electronic component 1612c on the first locomotive 1608a. The third electronic component 1612c would typically be whatever component on the first locomotive 1608a was requesting or would have otherwise used or received GPS/location data generated by the failed GPS unit 1612a. When the third electronic component 1612c receives the return location data, it is "expecting" that the location data will be the location of the first, failed GPS unit 1612a. However, since the second GPS unit 1612b may be many meters away, the third electronic component processes the return location data based on the distance 2426 and/or other physical relationship between the locomotives 1608a, 1608b. For example, the third electronic component may factor in an amount of slack between the propulsion-generating vehicles 1608a and 1608b.

For adjusting or otherwise processing return data based on a physical relationship between vehicles, other factors may also be taken into account, such as vehicle heading. In particular, in order to adjust GPS coordinates based on a distance between vehicles, it would be necessary to not only account for the distance between vehicles, but also for their cardinal direction/orientation. Additionally, the physical relationship may include information relating to an orientation of the second vehicle with respect to the first vehicle and/or a respective length of the first vehicle and/or the second vehicle. For example, in the case of two locomotives 1608a, 1608b, as indicated in FIG. 24, one locomotive 1608a may be oriented short hood forward, and the other 1608b oriented long hood forward, with each locomotive having a length "L" based on the locomotive design/specification. This information (orientation, length, etc.), along with information on the placement of particular electronic components within a locomotive or other vehicle, may be used to calculate the distance between an electronic component 1612a on one vehicle 1608a and a similar electronic component 1612b on another vehicle 1608b.

In an embodiment, a physical relationship between vehicles in a consist is determined at least in part based on a respective identifier of each of one or more of the vehicles in the consist. For example, a physical relationship between a first vehicle 1608a and a second vehicle 1608b in a vehicle consist 1606 could be determined at least in part based on an identifier of the second vehicle. "Identifier" refers to information uniquely associated with the vehicle (e.g., VIN number, road number, serial number), or identifying information that is not necessarily uniquely associated with the vehicle but that provides or can be used to determine information about one or more characteristics of the vehicle (e.g., a vehicle model type may be used to determine a length of the vehicle and the positioning of components located on the vehicle).

In an embodiment, when a first electronic component on a first vehicle enters a failure state where it is unable to perform a designated function, instead of using another component to perform the same function, a second electronic component on a second vehicle is operated to perform a substitute function that is deemed a suitable equivalent (by the operators of the vehicle consist) in certain conditions, e.g., an emergency condition stemming from component failure or otherwise. This may be useful if none of the other components in a vehicle consist are able to perform a designated function of a failed component, but one is able to perform a suitable equivalent.

The system 1600 may be implemented using network communications over an MU cable bus, as described in regards to FIGS. 9 through 15. In an embodiment, for example, the system carries out a method for communicating data in a vehicle consist, such as a locomotive consist. The method comprises determining that a first electronic component in a first propulsion-generating vehicle (e.g., a first locomotive) of the consist is in a failure state. (The consist comprises at least the first propulsion-generating vehicle and a second propulsion-generating vehicle, with each locomotive propulsion-generating vehicle in the consist being adjacent to and mechanically coupled with one or more other propulsion-generating vehicles in the consist.) In the failure state, the first electronic component is unable to perform a designated function of the first electronic component. As above, unless otherwise specified, this encompasses the first electronic component being unable to perform the function at all, or being unable to perform the function in a manner that meets designated performance requirements. Upon determining the failure state, network data is transmitted from the first propulsion-generating vehicle to a second electronic component on the second propulsion-generating vehicle. The network data is transmitted over a cable bus (e.g., an MU cable bus) interconnecting at least the first and second propulsion-generating vehicles in the consist. The MU cable bus is an existing cable bus used in the consist for transferring non-network control information between propulsion-generating vehicles in the consist. The method further comprises operating the second electronic component based on the transmitted data, wherein the second electronic component performs the designated function that the first electronic component is unable to perform.

Alternatively or additionally, the system 1600 may be implemented using communications channels other than an MU cable bus, such as a dedicated cable interconnecting the locomotives or other vehicles, or one or more wireless/RF communication channels.

Figure 22:
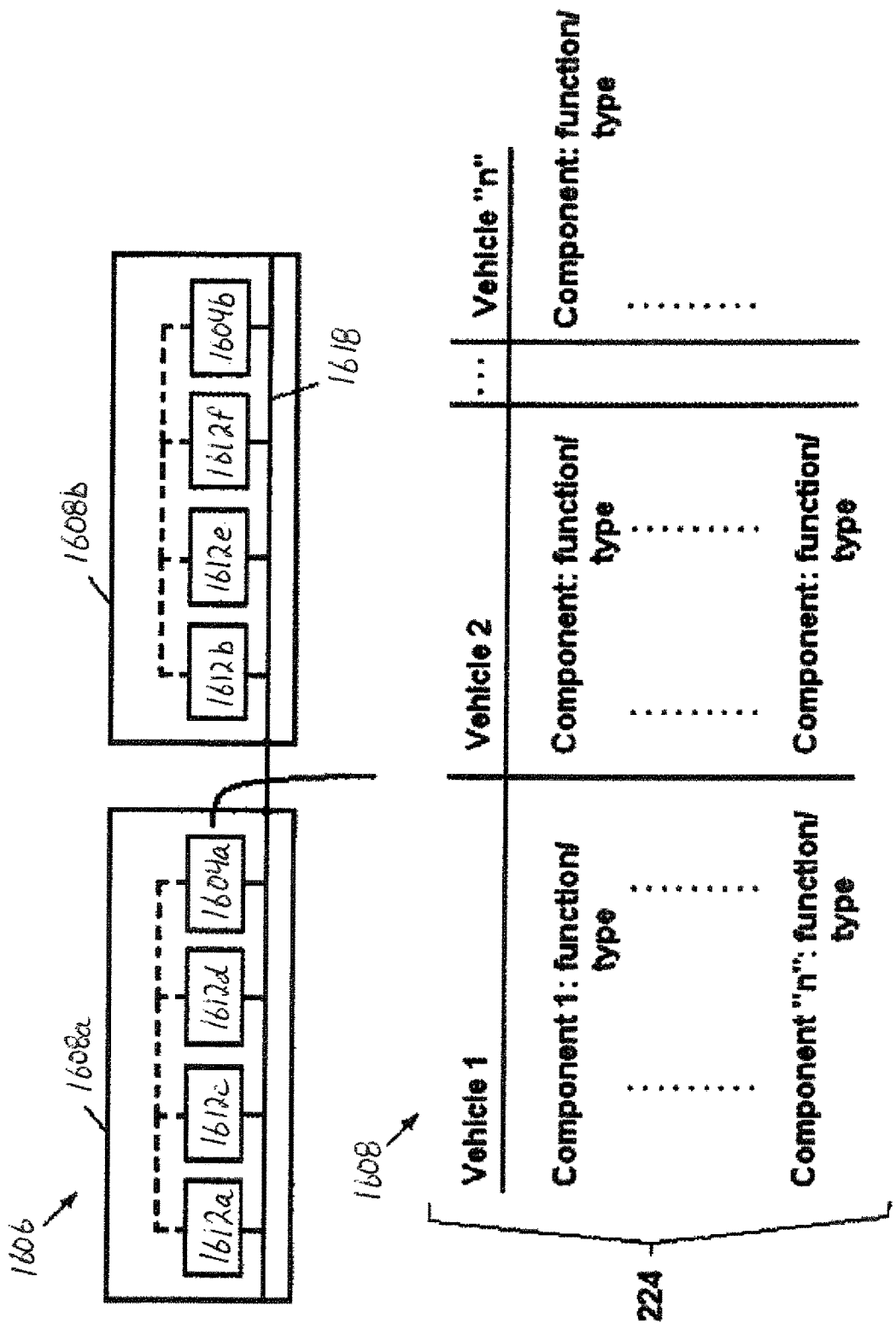
FIG. 22 is a schematic diagram of an embodiment of the system shown in FIG. 16.

From a control perspective, the functionality of the system 1600 for locomotive/vehicle inter-consist equipment sparing and redundancy may be implemented in different manners, depending on the vehicles and electronic components in question, the communication channel(s) used, etc. FIG. 22 is illustrative of an embodiment, in the context of first and second vehicles 1608a, 1608b in a vehicle consist 1606, and interconnected/linked via a cable bus or other communication channel 1618, implemented as a network or otherwise. Each vehicle includes a plurality of electronic components 1612a-1612f that perform various functions in the vehicles (for example, one vehicle 1608a includes electronic components 1612a, 1612c, 1612d, and the other vehicle 1608b includes electronic components 1612b, 1612e, 1612f). The vehicles and electronic components may be the same models, or they may be different. Each vehicle 1608a, 1608b is outfitted with a respective control coordination system 1604a, 1604b, as described above. In each vehicle, the control coordination system 1604a, 1604b on the vehicle is directly or indirectly interfaced with one or more designated ones of the electronic components in the vehicle; meaning that the control coordination system receives information relating to the electronic components or is able to determine or generate such information.

As discussed above, the control coordination systems 1604a, 1604b facilitate remote "swapping" of electronic components in different vehicles in a consist, so that when one component enters a failure state, a redundant component in another vehicle is used instead. For this process, the control coordination system in a vehicle monitors the health or status of each electronic component with which it is interfaced. This may be done in any of several different ways, such as, for example, the control coordination system periodically communicating with the electronic components, the control coordination system monitoring each electronic component's function or output (through sensing or otherwise), the electronic components being configured to send a failure message/signal to the control coordination system upon entering a failure state, the control coordination system receiving notification from other components, or the like. As noted above, the control coordination systems may be implemented in a distributed functional manner, wherein different functional aspects are deployed at different components within the system 1600; thus, the electronic components may be configured or reconfigured, as part of a control coordination system, to provide status information indicating when they have entered a failure state. If needed, each control coordination system may process information about the electronic components with which it is interfaced to determine if any of the electronic components have entered a failure state.

If a control coordination system 1604a in a first vehicle 1608a determines that an associated electronic component 1612a, 1612c, and/or 1612d has entered a failure state, data is transmitted from the first vehicle 1608a to an electronic component 1612b, 1612e, and/or 1612f in another vehicle 1608b for performing the function of the failed electronic component. In an embodiment, upon determining a failure state of an electronic component, the control coordination system determines the type and/or function of the failed component. This may be done by polling (communicating with) the failed component, by communicating with other components in the system (e.g., what the other component was attempting to use the failed component for), by referencing stored data about the failed component (e.g., model number, component type, function type, or the like), or otherwise. The control coordination system, possibly through coordination with another control coordination system, then identifies a similar/redundant electronic component in another vehicle in the consist, and manages the transfer of data to and from the similar electronic component, if needed. The similar electronic component may be identified by correlating the information about the failed component (e.g., model, type of component, and/or function of component) to information about the other components in the vehicle consist. For example, if the failed component is a data radio, then the control coordination system would identify another data radio, capable of performing the function of the failed data radio, in another vehicle in the consist. Data flow management may involve actively processing and/or rerouting data originally intended for the failed component, e.g., for receipt by a similar/redundant component, or it may involve informing other components in the vehicle, which were attempting to communicate with or otherwise utilize the failed component, how to communicate with the similar/redundant component. For example, a network address of the similar/redundant component may be provided, to which subsequent data (information and/or control commands) is addressed.

For identifying suitable similar/redundant electronic components in case an electronic component enters a failure state, each control coordination system may include memory or other functionality for storing information 224 about the electronic components with which it is interfaced and information about other components in the vehicle consist. FIG. 22 shows one example, where information is organized in tabular form (for illustration purposes). In this example, the table includes information, in the left hand column, about the electronic components ("component 1"-"component n") in a first vehicle, which in this example is the vehicle 1608a associated with the control coordination system 1604a. For each component, there is associated information about the component, such as model, category/type, function, or the like. Each subsequent column is for an additional vehicle in the vehicle consist, with each column containing information about the electronic components in that vehicle. When the control coordination system 1604a determines that an electronic component in its associated vehicle has entered a failure state, the control coordination system accesses information about the failed component in the stored information 224, and uses the accessed information to determine a suitable similar/redundant component in another vehicle, e.g., by correlating or cross-referencing the information about the failed component from the table to other information in the table. Additionally or alternatively, each electronic component in the table can be pre-linked to another electronic component in the table. The information in the table (or other data structure) may be pre-generated when vehicles are linked, through communication of the control coordination systems 1604a, 1604b, or it may be generated when needed. The stored information 224 may include data for facilitating communications with the various electronic components, for example, network addresses of each electronic component. In an embodiment, each control coordination system includes stored information about the electronic components on the vehicle with which it is associated, and determines a similar/redundant component on another vehicle by communicating information of the failed component to the control coordination systems on the other vehicles. For example, a control coordination system may query the other control coordination systems based on information of a failed component, which respond if they are associated with a suitable similar/redundant component on their respective vehicles.

To reiterate, in an embodiment where the various electronic components are configured as a network, with communications over the cable bus or other communication channel 1618, the system 1600 functions by: (i) when a component enters a failure state, a suitable similar/redundant component is identified, as above; and (ii) instead of addressing data to the failed component, data is addressed to the similar/redundant component in another vehicle. This may be done by each electronic component being informed of the substitution (e.g., that they should address data according to the address of the similar/redundant component), by using a data forwarding or translation function in the router transceiver units or otherwise (e.g., if data for a failed component is received at a router transceiver, the data is re-addressed or otherwise modified for transmission instead to the similar/redundant component), or the like.

The method and system 1600 for locomotive inter-consist equipment sparing and redundancy may be extended across plural electronic components in the vehicles of a vehicle consist, so that if a component enters a failure state, or if a "spare" or similar component (one performing a function of another, failed component) fails, a similar component in another vehicle is used in its place. For example, the system may be configured so that if two electronic components fail in a vehicle, the respective functions of the two components are carried out on similar electronic components on two other, different vehicles in the consist.

In an embodiment involving "swapping out" of plural failed components, as above, and with reference to FIG. 24, a first electronic component 1612a in a first vehicle 1608a of a vehicle consist 1606 is determined to be in a failure state, and data 1616 is transmitted from the first vehicle 1608a to a second electronic component 1612b on the second vehicle 1608b over a communication channel linking the vehicles in the consist. The second electronic component 1612b is operated based on the transmitted data 1616, for performing the designated function that the first electronic component 1612a is unable to perform, and possibly including the transmission of return data 1622 to a third electronic component 1612c in the first vehicle 1608a. Additionally, other electronic components in the vehicles are monitored for determining if any of the electronic components have failed. For example, it may be determined that the third electronic component 1612c in the first vehicle 1608a has failed. If so, third data 1628 is transmitted from the first vehicle 1608a (or possibly from the second or other vehicle) to a fourth electronic component 1612d located on a third vehicle 1608c of the vehicle consist. (The fourth electronic component 1612d could instead be located on the second vehicle.) The fourth electronic component 1612d is similar to the third, failed electronic component 1612c and is operated based on the third data 1628, e.g., for performing a function of the third electronic component 1612c that the third electronic component 1612c is unable to perform and/or for transmitting return data to another component in one of the other vehicles.

If one of the "swapped to" components subsequently fails, the system may be configured to "re-swap" to another, similar electronic component in the same or another vehicle. For example, if it is determined that the third electronic component 1612c in the first vehicle 1608a has failed, the system identifies a fourth electronic component 1612d in a third vehicle 1608c in the consist (or in the second vehicle 1608b) that is similar to the third electronic component 1612c. If it is then determined that the fourth electronic component 1612d has failed, third data 1628 is transmitted from the first vehicle and/or the second vehicle to a fifth electronic component 1612e that is located on the second vehicle or the third vehicle of the vehicle consist. The second data may be data designated for processing by the third, failed electronic component 1612c, and with the fifth electronic component 1612e being similar to the third electronic component and operated based on the second data.

In an embodiment involving "re-swapping," a first electronic component 1612a in a first vehicle 1608a of a vehicle consist 1606 is determined to be in a failure state, and first data 1616 is transmitted from the first vehicle 1608a to a second electronic component 1612b on the second vehicle 1608b over a communication channel linking the vehicles in the consist. The second electronic component 1612b is operated based on the transmitted first data 1616, for performing the designated function that the first electronic component 1612a is unable to perform, and possibly including the transmission of second, return data 1622 to a third electronic component 1612c in the first vehicle 1608a. Additionally, if it is determined that the second electronic component 1612b has failed, the first data 1616 is transmitted from the first vehicle and/or the second vehicle to a third electronic component 1612d on a third vehicle 1608c of the vehicle consist. The third electronic component 1612d is similar to the first electronic component 1612a and is operated based on the first data 1616, for performing a designated function that the first electronic component is unable to perform.

In an embodiment involving monitoring multiple electronic components, a first electronic component 1612a in a first vehicle 1608a of a vehicle consist 1606 is determined to be in a failure state, and first data 1616 is transmitted from the first vehicle 1608a to a second electronic component 1612b on the second vehicle 1608b over a communication channel linking the vehicles in the consist. The second electronic component 1612b is operated based on the transmitted first data 1616, for performing the designated function that the first electronic component 1612a is unable to perform. Additionally, the second electronic component 1612b and at least one third electronic component 1612c in the vehicle consist are monitored for determining if any of the second electronic component and at least one third electronic component has failed. For each of the second electronic component and at least one third electronic component that is determined as having failed, data, designated for the component that is determined as having failed, is transmitted to a fourth, similar electronic component 1612d. The fourth electronic component 1612d is located on a vehicle 1608c of the vehicle consist that is different than the vehicle 1608a or 1608b on which the component that is determined as having failed is located.

The method(s) and system(s) 1600 for locomotive inter-consist equipment sparing and redundancy may be implemented on a per-vehicle basis, on each of one or more of a plurality of vehicles in a vehicle consist (e.g., locomotives in a locomotive consist). Here, for each vehicle of a plurality of vehicles 1608a, 1608b, 1608c in the vehicle consist 1606, at least one electronic component 1612a, 1612b, 1612c in the vehicle is monitored to determine if the at least one electronic component has failed. For each of the at least one electronic component determined to have failed, say, for example, component 1612a, first data 1616 is transmitted from the vehicle 1608a or a second vehicle in the consist 1608b or 1608c to a similar electronic component (e.g., component 1612e) in a third or other vehicle 1608c in the consist. The first data 1616 is designated for the electronic component 1608a determined to have failed, and is transmitted over a communication channel 1618 linking vehicles in the vehicle consist. Additionally, second, return data 1622 is transmitted from the similar electronic component 1612e to one of the vehicles in the consist. The return data is generated by the similar electronic component 1612e based on the first data 1616. The first data 1616 may be transmitted based on a network address of the similar component 1612e, which is identified by the system when it is determined that a component has failed and a need exists for utilizing the similar component to perform a designated function of the failed component.

Figure 25:
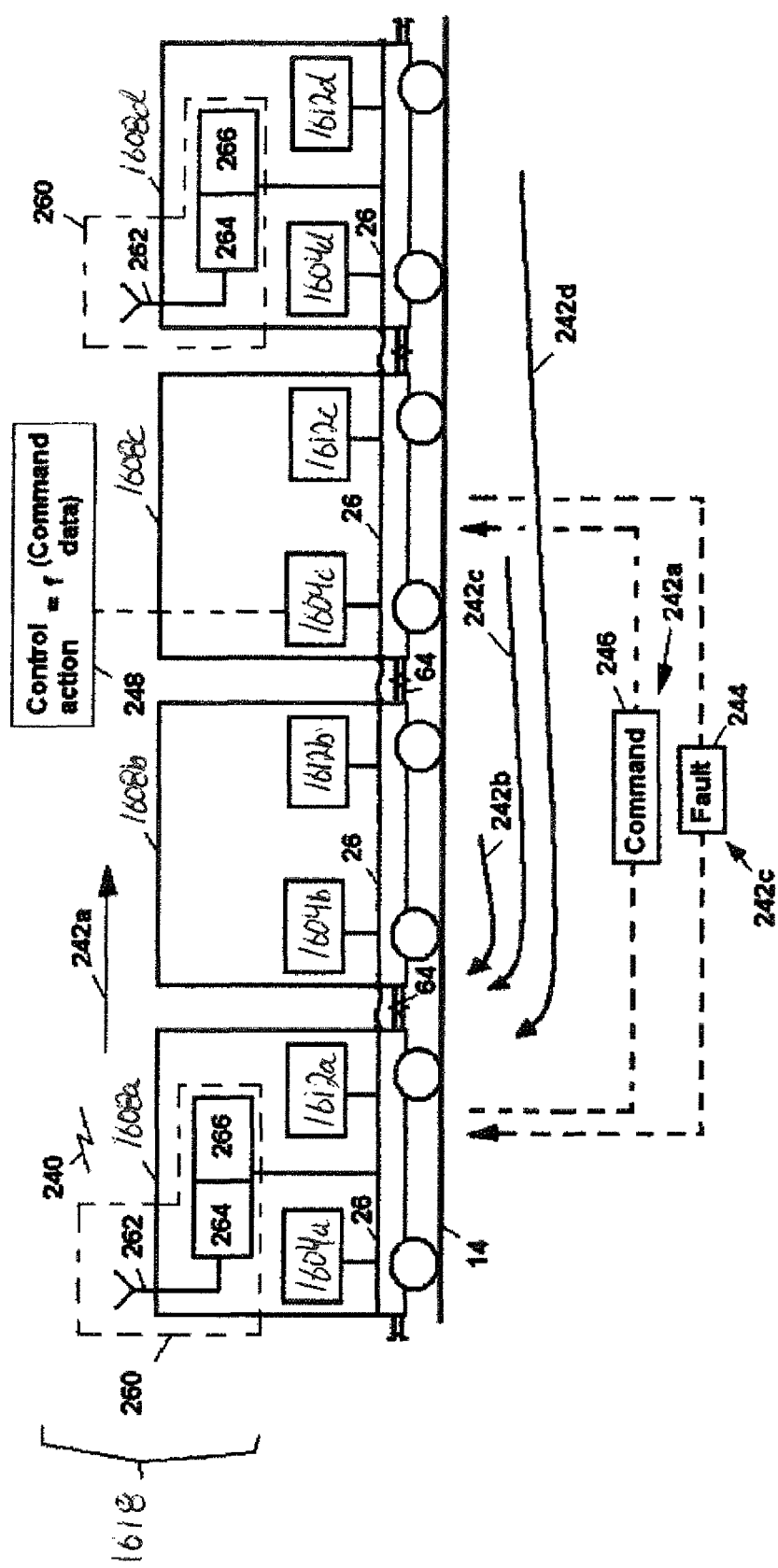
FIG. 25 is another schematic diagram of a vehicle consist according to an embodiment of the inventive subject matter.

In an embodiment of the system 1600, with reference to FIG. 25, the communication channel 1618 (e.g., MU cable bus 26 or other cable bus, wireless channel 240, or other communication channel) is used to communicate operations data, voice data, and/or command data (collectively, data 242) from one or more of the vehicles in the consist to another vehicle in the consist. For example, in the case of a train, data 242b, 242c, 242d may be transmitted from each of a plurality of remote locomotives 1608b, 1608c, 1608d, respectively, to a lead locomotive 1608a. Additionally, data 242a may be transmitted from the lead locomotive 1608a to one or more of the remote locomotives 1608b, 1608c, 1608d. (Data 242 may also be transmitted from one remote locomotive to one or more other remote locomotives.) The operations data is data relating to how a particular vehicle is operating/running, including data relating to one or more of vehicle speed, vehicle braking status, tractive effort including slippage, motor condition/performance, vehicle engine and power system output and status, emissions, and the like. Voice data is data comprising analog- or digital-encoded human or similar speech or other sound. Command data is data used to control one or more components or systems in a vehicle consist. (Unless otherwise specified, the terms "command data" and "control data" as used herein as synonymous.) The data 242 may be transmitted over the communication channel 1618 as network data and/or high bandwidth data, e.g., high bandwidth network data about operations of the second vehicle (operations data) is transmitted from a second vehicle in a consist to a first vehicle in the consist over the communication channel. In an embodiment, the system is additionally configured to transmit respective operations data about operations of each of a plurality of third vehicles 1608c in the vehicle consist to the first vehicle 1608a in the consist. The respective data is transmitted from the third vehicles to the first vehicle over the communication channel 1618. In an embodiment, the operations data about operations of a vehicle (a second vehicle or any third or other vehicles) is periodically regularly automatically transmitted, meaning transmitted without human initiation, on a periodic basis, at regular intervals. The operations, voice, and/or command data may be used by systems aboard the first vehicle (e.g., a train control computer or system), and/or it may be displayed to operators aboard the first vehicle using a display device (e.g., computer monitor/screen).

In an embodiment, the system 1600 is configured (or additionally configured in combination with one or more features of the embodiments set forth herein) for remote system control of vehicles 1608b-1608d in a consist based at least in part on data 242a-242d exchanged between vehicles 1608a-1608d. (The first vehicle 1608a may be a lead locomotive in a locomotive consist, and the other vehicles 1608b-1608d may be remote/trail locomotives in the consist; the data 242a-242d may be high bandwidth data and/or network data.) The first vehicle 1608a receives operational or other data 242b-242d from the other vehicles 1608b-1608d. Based on the operational or other data, the first vehicle 1608a transmits command data or other data 242a to the other vehicles 1608b-1608d. The vehicles 1608b-1608d respond to the command or other data by controlling one or more components or systems on the vehicles based on the data received from the first vehicle. In an embodiment, the data 242a is network data, which is respectively addressed to particular electronic components in the vehicle consist; the electronic components are configured to respond or act upon the received network data (e.g., network data addressed to them), based on the content of the data. In an embodiment, the data 242a is additionally or alternatively high bandwidth data.

As an example, in the context of a train, remote locomotives 1608b-1608d in the train may be configured to transmit operations data 242b-242d to the lead locomotive 1608a. The lead locomotive 1608a receives the operations data 242b-242d and reviews or otherwise processes the data, either automatically and/or in conjunction with operator review. Based on the processed data, the lead locomotive 1608a generates command data 242a for transmitting to one or more of the remote locomotives in the consist. The command data 242a may be network data (and/or high bandwidth data) addressed to particular electronic components in the remote locomotives, or it may be otherwise configured for reception at a particular electronic component. The command data is received at the electronic component for which it is designated, and is processed by the electronic component. The electronic component is then controlled based on the command content of the command data. For example, if a remote locomotive 1608c experiences a fault in an electronic component 1612c, information 244 relating to the fault may be transmitted as operations data 242c from the remote locomotive 1608c to the lead locomotive 1608a. The lead locomotive processes the data 242c, and recognizes that the remote locomotive has reported a fault in component 1612c. Based on the nature of the fault, the lead locomotive 1608a may take corrective or other control action by transmitting command data 242a to the remote locomotive 1608c. The command data 242a may include data 246 instructing the remote locomotive to reset the fault. If so, when the command data 242a is received and processed by the remote locomotive 1608c, it acts upon the command data by resetting the fault, as at 248, e.g., a control action=f (command data). The command data 242a may be addressed to the particular electronic component 1612c, if the electronic component is able to reset the fault, or it may be sent to another electronic component in the remote locomotive 208c for resetting the fault. An "electronic component" includes both a single component and a system of components, References to resetting a fault of an electronic component by transmitting command data to the electronic component includes the situation where one component is non-functional and command data is transmitted to and acted upon by another, second component. In a locomotive or other vehicle, command data may be processed and acted upon by a particular electronic component, or by a control coordination system in the vehicle, or by another control system/unit.

Figure 23:
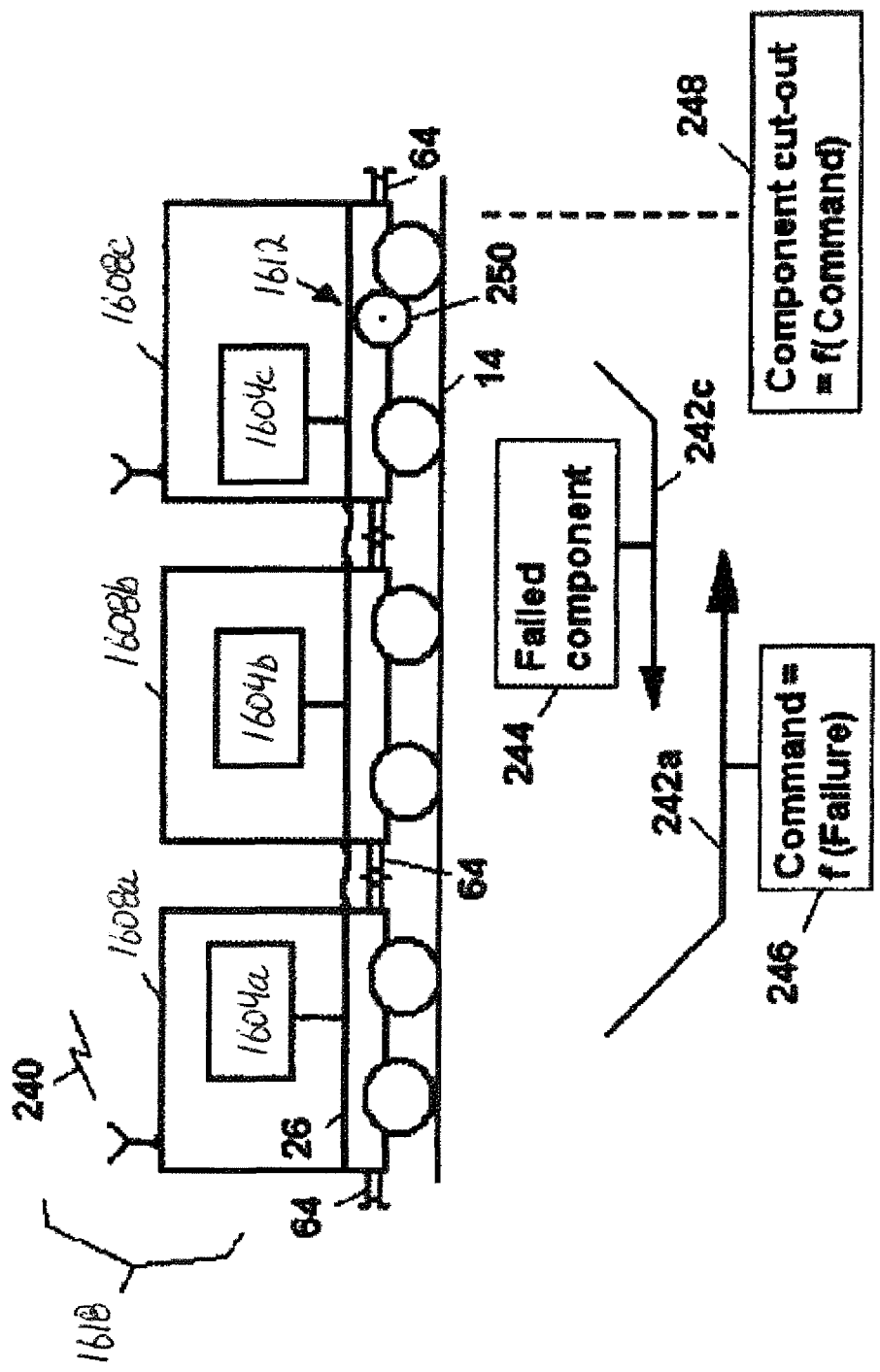
FIG. 23 is a schematic diagram of an embodiment of the systems/methods shown in FIGS. 16 through 22.

As another example, a locomotive typically includes a number of power electronic components (e.g., alternators, energy storage units), tractive electronic components (e.g., inverters, motors, dynamic braking resistive grids), and other electronic components (e.g., control systems, communication equipment). If one of these components fails, the locomotive may not be able to take self-corrective action. In any event, other locomotives in the train or consist may be unaware of the failed component and will be unable to act accordingly, for corrective compensation action or otherwise. This may lead to damage, or at least to lowered performance levels in a locomotive, consist, or train. In an embodiment, therefore, with reference to FIG. 23, the system 1600 is configured for the remote cutout of failed components in a locomotive in a consist. Here, if an electronic component 1612 (e.g., a traction motor 250) in a remote locomotive 1608c fails, fault data 244 (or data otherwise relating to the failure) is generated by the locomotive 1608c (e.g., by a control coordination system, or control system/unit, or otherwise) and transmitted as operations data 242c to a lead or other designated locomotive 1608a in the consist. The lead or other designated locomotive 1608a processes the received operations data, determines if it is possible to initiate a corrective or compensatory action, generates appropriate command data 242a (e.g., command data=f (reported failure)) that contains data 246 for initiating the corrective or compensatory action, such as cutting out the failed component, and transmits the command data 242a to the remote locomotive 1608c. The remote locomotive 1608c receives the command data 242a, processes the command data 242a, and carries out a control action 248 based on the data content 246 of the command data 242a. For example, for a failed traction motor 250, the command data 242a may specify that the traction motor 250 should be cut out, e.g., shut down and electrically and/or mechanically bypassed. The remote locomotive receives the command data and cuts out the failed motor 250, by shutting down the motor and electrically and/or mechanically bypassing the motor. Other failed electronic components may be cut out in a similar manner, by deactivating/bypassing the component. Where applicable, the functions of failed components may be carried out using inter-consist equipment sparing, as described herein.

A consist may include a plurality of locomotives that are able to communicate network and/or high bandwidth data with one another and with a designated locomotive (e.g., lead locomotive), wherein the designated/lead locomotive is able to command individual locomotive operations via the network and/or high bandwidth communication channel. In an embodiment, the lead loco runs performance algorithms to determine the most efficient mode of operation for the locomotives in the consist, and adjusts individual locomotives accordingly. For example, if the consist is operating at a certain throttle notch level, it may be more advantageous and/or efficient to set one locomotive in the consist to idle and adjust the throttle notches of the other locomotives to maintain the same level of tractive effort in the consist while operating all locos in the consist in the most efficient mode of operation.

The remote locomotive 1608c may transmit operations data 242c to the lead locomotive confirming that the remote cutout command or other command 246 specified in the command data 242a was executed. Additionally, the lead locomotive 1608a may modify its current operational mode based on the knowledge that the failed component in question has been cut out. For example, if the cutout failed component is a traction motor, and the remote locomotive 1608c is only operable using its remaining traction motors, then the lead locomotive 1608a may increase its own traction output to compensate for the failed motor 250. Information about the failed, cutout component 250 may be provided to the other locomotives in the consist for acting accordingly, and/or the lead locomotive may generate and transmit command data 242a to the other locomotives, where the command data is generated based at least in part on knowledge of the failed, cutout component 250. That is, the remote locomotives are not provided with explicit knowledge of the cutout component in the other locomotive 1608c, but are commanded to act in a manner for compensating for the cutout component. For example, for a cutout motor in one locomotive 1608c, the lead locomotive 1608a may command the other locomotive(s) 1608b in the consist to adjust their dynamic braking and/or other tractive efforts accordingly.

In any of the embodiments described herein, the system may be configured to account for legacy equipment in a consist, and, more specifically, to account for and accommodate legacy locomotives or other vehicles that are not equipped to receive and process high bandwidth data and/or network data. To explain further, in train and similar fleet vehicle systems, new technology may only be implemented, at least initially, on a relatively small number of the total vehicles in the fleet. This is typically for cost control purposes, for evaluation purposes, and/or because it may not be deemed necessary to outfit all vehicles in a fleet with particular new technology (e.g., based on how and where the vehicles are used). As such, it will oftentimes be the case that "updated" vehicles may be operated along with legacy vehicles, such as in a train, where the train may include both newer/updated locomotives and older locomotives.

Figure 26:
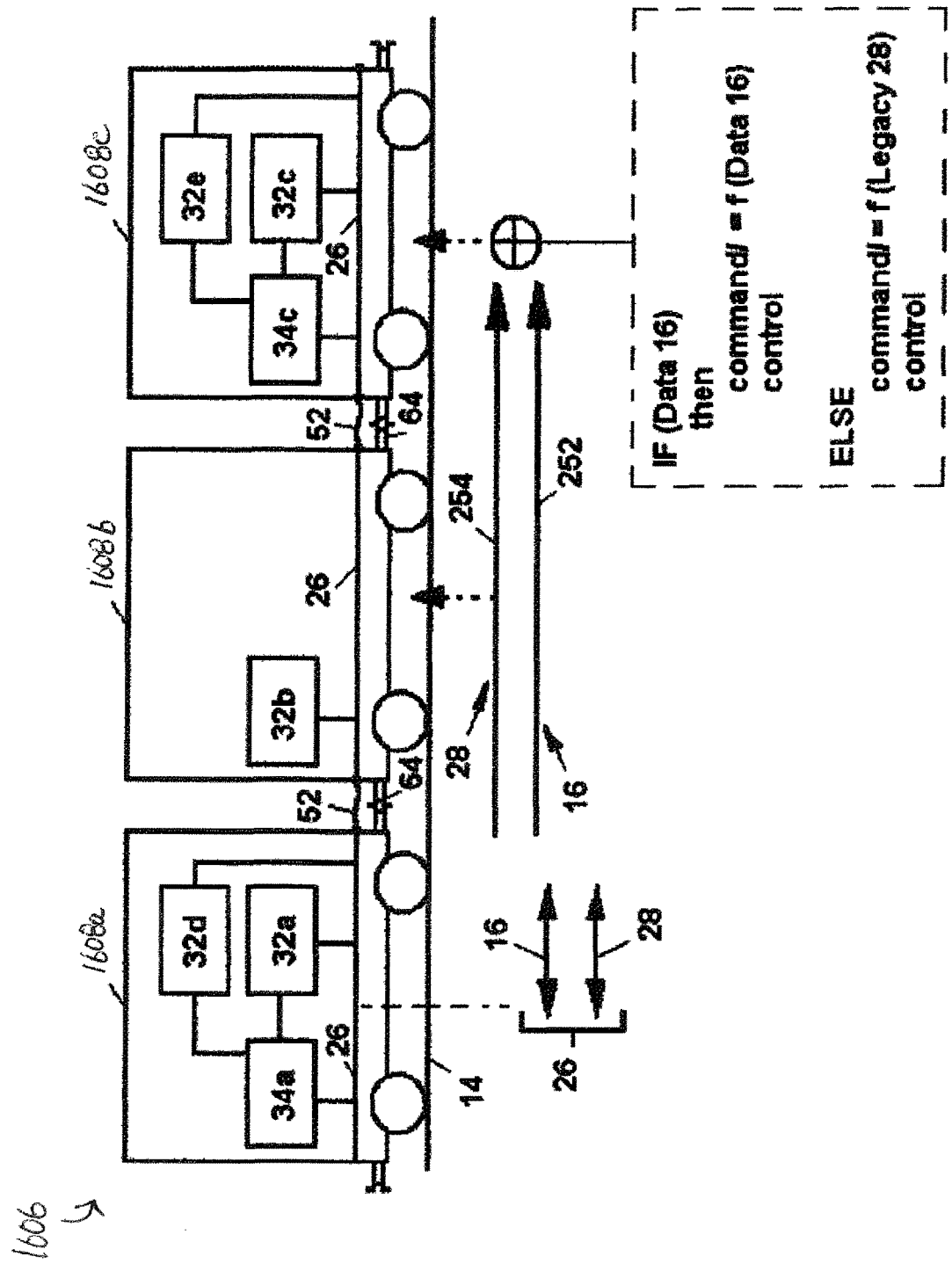
FIG. 26 is another schematic diagram of a vehicle consist according to an embodiment of the inventive subject matter.

FIG. 26 shows an embodiment of the system 1600 configured to accommodate legacy vehicles in a vehicle consist. Here, as an illustrative example, the vehicle consist 1606 is a locomotive consist having a lead locomotive 1608a, a first remote locomotive 1608b, and a second remote locomotive 1608c. The lead and second remote locomotives 1608a, 1608c are "updated" locomotives, meaning each is equipped with functionality, e.g., router transceiver units 34a, 34c, for transceiving network data and/or high bandwidth data 16. The first remote locomotive 1608b, on the other hand, is a "legacy" locomotive, meaning that it is not equipped with functionality for transceiving network data and/or high bandwidth data. However, as discussed above, each of the locomotives 1608a-1608c, including the updated locomotives, is still equipped with legacy communication equipment, such as an MU cable bus or other existing electrical cable bus 26 that interconnects the locomotives in the consist. In operation, non-network control information 28 ("legacy information") is generated and transmitted over the cable bus 26 in a standard manner, as low bandwidth analog signals. Additionally, network data and/or high bandwidth data 16 is also transmitted over the cable bus 26. The data 16 is formatted and/or transmitted in a manner where it does not interfere with the legacy information 28. This may be done by converting the data 16 into modulated data that is orthogonal to the non-network control information 28, using frequency multiplexing, time multiplexing, or the like, as discussed above.

The legacy locomotive 1608b is unable to receive or process the network data and/or high bandwidth data 16. However, since the data 16 is orthogonal to the legacy information 28, it does not interfere with the legacy information; in effect, the data 16 is transparent to the legacy locomotive 1608b. The legacy information 28 is transmitted over the cable bus and is received and processed by electronic equipment 32b (e.g., an MU cable bus modem) in the legacy locomotive 1608b, in a standard manner. The cable bus 26 extending through the legacy locomotive 1608b acts as a communication conduit for the network data and/or high bandwidth data 16, as transmitted between the two updated locomotives 1608a, 1608b.

In an embodiment, each "updated" locomotive 1608a, 1608c retains legacy equipment 32d, 32e (e.g., MU cable bus modem functionality), respectively, for transceiving legacy information 28. Legacy information 28 may be used supplemental to or in addition to data 16, but in a more typical situation the data 16 and information 28 overlap in terms of functional content. For example, both may include throttle command information. Here, each updated locomotive 1608a, 1608c may be configured to act upon network data and/or high bandwidth data 16 when it is available and supersedes legacy information 28, but to otherwise use and act upon the legacy information 28. For example, in the case of a train throttle command, the updated locomotives 1608a, 1608c may be outfitted with a train control system that provides for an "infinite" throttle. That is, between a minimum throttle position of "0" (idle) and a maximum of "8" (for example), instead of having grossly discrete throttle/notch levels of 0, 1, 2, 3, 4, and so on, as in conventional/legacy train traction systems, throttle positions are allowed at a more granular level, such as in 0.1 or 0.01 increments. For commanding throttle operations, the lead locomotive 208a transmits an "infinite" throttle command 252 (e.g., notch level 4.25) as high bandwidth and/or network data 16 over the cable bus 26. The lead locomotive 1608a also transmits a legacy notch command 254 over the cable bus 26 as legacy information 28, based on the established legacy throttle control format. The legacy notch command may be the legacy notch command closest to the infinite throttle command, or it may be another designated notch command that is utilized for particular train control purposes. For example, in the case where certain locomotives are controlled to operate at an infinite throttle command of 4.25, the legacy notch setting may be 4.

As indicated in FIG. 26, the legacy notch command 254 is transmitted over the cable bus 26 from the lead locomotive 1608a and is received at both the remote locomotives 1608b, 1608c. Additionally, an infinite throttle command 252 is transmitted over the cable bus as data 16. Although the data 16 passes through the legacy remote locomotive 1608b, the remote locomotive 1608b cannot process or use the data 16. Instead, the locomotive 1608b receives, processes, and acts upon the legacy notch command 254. The updated locomotive 1608c receives both the legacy notch command 254 and the infinite notch command 252. The updated locomotive 1608c determines that both commands 252, 254 relate to notch settings. Since the infinite notch command 252 arrives as part of the network data and/or high bandwidth data 16, the updated locomotive 1608c acts upon the command 252 and not the legacy command 254. That is, in an embodiment the system is configured so that if an updated locomotive receives command data over both a high-bandwidth/network channel and a legacy channel, the network data and/or high bandwidth data 16 received over the high-bandwidth/network channel is considered to supersede the data received over the legacy channel. In an embodiment, updated locomotives may be configured to disregard all data present on a legacy channel when a high-bandwidth/network channel is present and operating within designated parameters. In an embodiment, updated locomotives are configured to select between legacy data and high-bandwidth data and/or network data based on the nature of the data and the internal control algorithms of the locomotive.

In an embodiment, updated locomotives 1608a, 1608c are configured to utilize network data and/or high bandwidth data 16 when data 16 is present and usable (e.g., the data is not only present but able to be processed and "understood" by the locomotive), but to otherwise use legacy information 28. This is illustrated in FIG. 26 with respect to the updated locomotive 1608c. The locomotive 1608c may receive both data 16 and legacy information 28, or only legacy information 28. If the network data and/or high bandwidth data 16 is present and usable, then command/control of the locomotive 208c is carried out as a function of the data 16. Otherwise, command and control of the locomotive 1608c is carried out as a function of the legacy information 28. Such a configuration is beneficial for instances where network data and/or high bandwidth data 16 is not received or usable by the locomotive 1608c, such as due to router transceiver unit failure, a failure in the lead locomotive, a communication channel disruption, or the like. For example, if the high-bandwidth and/or network system goes down, but the existing cable bus system is still operational, the system automatically reverts to using the legacy equipment for communications and control within the locomotive consist, as a fallback means.

As an example, suppose a locomotive consist as in FIG. 26 is operating in a traction mode where the lead locomotive 1608a has transmitted an infinite throttle command 252 of "5.5" and a legacy notch command 254 of "5" over the cable bus 26. All communication systems are operating normally. The legacy locomotive 1608b receives the legacy notch command 254 of "5" and adjusts its tractive effort accordingly. The updated remote locomotive 1608c receives both the legacy notch command and the infinite throttle setting, and adjusts its tractive effort to level "5.5." However, further suppose that at a later point in time, the network/high-bandwidth communication channel between the two updated locomotives 1608a, 1608c fails. The updated remote locomotive 1608c simply adjusts its tractive effort to "5," based on the legacy notch command 254 received over the legacy channel.

Although illustrated in regards to the case where both the legacy information and network/high-bandwidth data 16 is transmitted over a cable bus 26 (e.g., MU cable bus), the embodiments described above are also applicable to cases where legacy information 28 is transmitted over a cable bus and network and/or high bandwidth data 16 is transmitted over a different medium, such as wireless. Here, for example, an updated remote locomotive 1608c could be configured to base control operations on data 16 when it is received over a wireless channel and usable by the locomotive 1608c, but, if the wireless channel fails or the data 16 is otherwise not usable, to instead use legacy information 28 received over the cable bus 26.

The aforementioned embodiments enable the interoperability of legacy and updated locomotives. Network and/or high bandwidth data is transmitted over an MU cable bus or other cable bus interconnecting the locomotives, as is legacy information (e.g., conventional MU signals). If a locomotive control system is equipped and able to read the network and/or high bandwidth data, it uses the network and/or high bandwidth data (and makes use of any information available in such data that is not available in legacy information). If not equipped in this manner, a locomotive continues to use the legacy information. Over time, legacy communication equipment will be replaced (or legacy locomotives will be replaced with updated locomotives), and in the meantime locomotives already updated with equipment for transceiving and processing network and/or high bandwidth data can take advantage of the network and/or high bandwidth data. This makes for a backward compatible communication method that allows equipped locomotives to take advantage of additional data, while still controlling older unequipped locomotives.

For wireless communications, a locomotive or other vehicle may be outfitted with a radio communication unit 260 (see FIG. 25). In an embodiment, the radio communication unit 260 comprises an antenna unit 262, a transceiver unit 264 connected to the antenna unit 262, and an interface unit 266 for interfacing the transceiver unit 264 with other electronic equipment in the vehicle. The interface unit 266 receives data/information from elsewhere in the vehicle (e.g., high bandwidth data and/or network data) and converts the data/information to a form a usable by the transceiver unit 264. The transceiver unit 264 processes the data/information it receives from the interface unit 266 for transmission over the antenna unit 262. For example, the received data/information may be converted, modulated, and amplified to an RF signal or microwave signal. The antenna unit 262 is configured to transmit (as wireless RF radiation) electrical signals received from the transceiver unit 264. The antenna unit, transceiver unit, and interface module are also configured to receive data. For example, the antenna unit receives wireless RF signals, the transceiver unit demodulates and de-converts the received RF signals, and the interface unit communicates the received signals to other components in the vehicle.

In an embodiment, if all locomotives in a consist have been updated to operate via wireless (e.g., as a wireless network), all the locomotives in the consist may be operated solely over the wireless link/network, thus eliminating the need for use of the MU cable or other cable bus.

In any of the embodiments described herein, the existing electrical cable bus 26, 1618 may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 27:
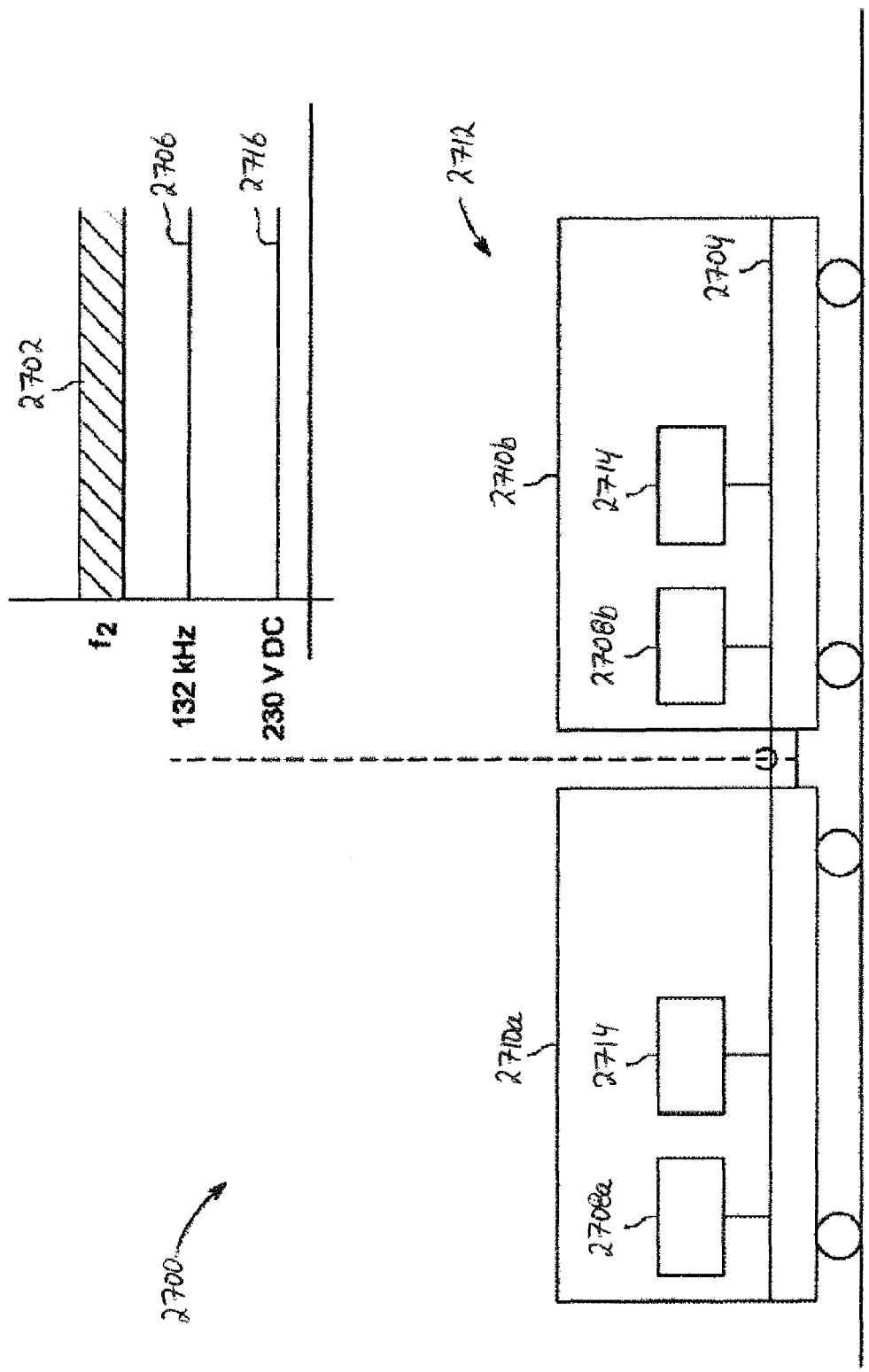
FIG. 27 is a schematic diagram of an embodiment of the communication system implemented in conjunction with an ECP train line.

In an embodiment, with reference to FIG. 27, a system 2700 for communicating data in a locomotive consist or other vehicle consist is configured to transmit network and/or high bandwidth data 2702 over an ECP train line 2704, in a manner orthogonal to ECP brake data 2706 transmitted over the ECP train line 2704. The system 2700 comprises a router transceiver unit 2708a, 2708b on each of a plurality of vehicles 2710a, 2710b in a consist 2712. On each vehicle, the router transceiver unit 2708a, 2708b is in addition to an ECP transceiver 2714 on the vehicle. (Alternatively, an ECP transceiver may be reconfigured to include the functionality of the router transceivers 2708a, 2708b.) Each router transceiver unit 2708a, 2708b is electrically connected to the ECP train line 2704, and is configured to transmit network and/or high bandwidth data 2702 over the ECP train line 2704 at one or more frequencies f2 (i) that are different than the 132 kHz frequency of the ECP brake data 2706, (ii) that do not interfere with (or receive significant interference from) the ECP brake data 2706, and (iii) that do not interfere with (or receive significant interference from) the 230V DC signal 2716 present on the ECP train line 2704. (That is, the data 2702 is orthogonal to the data 2706 and DC signal 2716.) For example, the network and/or high bandwidth data may be modulated into a carrier wave/RF signal transmitted over the ECP train line at a frequency in the megahertz (MHz) range. The router transceiver units 2708a, 2708b may be similar to the router transceiver units 34 described above. The embodiment of FIG. 27 may be implemented in conjunction with any of the other embodiments described herein.

As should be appreciated, the system 2700 establishes a high bandwidth data network that operates superimposed on, and separate from, the 132 kHz communication link that is specified in the 4200 series specifications for ECP brake traffic between the locomotive and the rail cars. This data network may be used to communicate non-brake data (e.g., in the form of network and/or high bandwidth data) between vehicles in a consist. Examples of the data that may be transferred include vehicle sensor data indicative of vehicle health, commodity condition data, temperature data, weight data, security data, data as otherwise specified herein, and/or other data.

Figure 28:
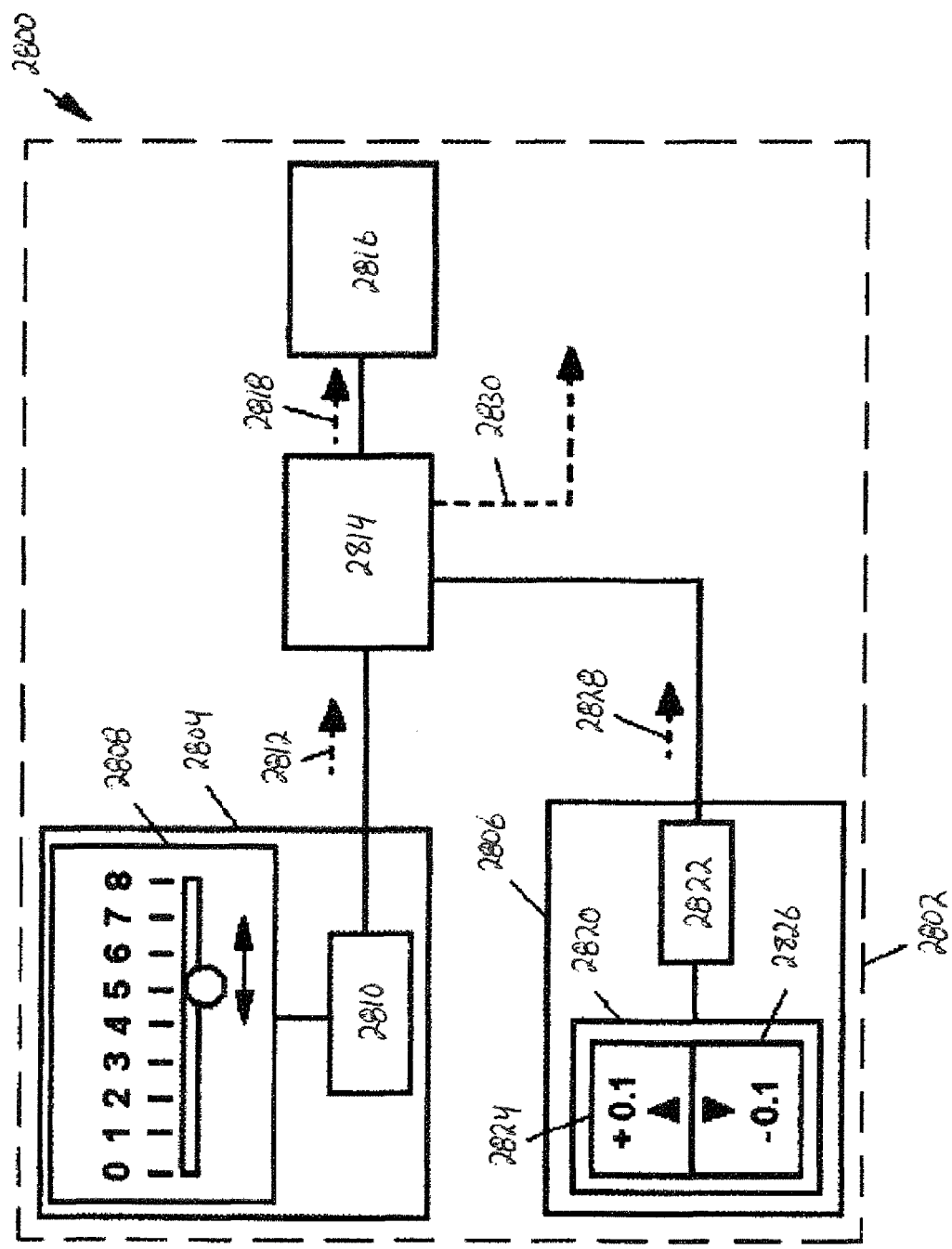
FIG. 28 is a schematic diagram of an incremental notch secondary throttle control system, according to an embodiment of the inventive subject matter.

FIG. 28 is a schematic diagram of an incremental notch secondary throttle control system 2800 for a vehicle 2802, according to an embodiment of the inventive subject matter, which may be used in conjunction with a system or method for communicating data in a locomotive consist or other vehicle consist as described herein. The secondary throttle control system 2800 includes a primary throttle control 2804 and an incremental notch secondary throttle control 2806. The primary throttle control 2804 includes a first manually adjustable control member 2808 and a primary control output unit 2810, which is operably connected to the control member 2808. The manually adjustable control member 2808 is moveable (e.g., by a human operator) to and between discrete notch/throttle settings, from a zero or minimum throttle setting to a maximum throttle setting. In the example shown in FIG. 28, the minimum is indicated by "0" and the maximum by "8"; thus, in this example, the control member 2808 can be moved to the discrete throttle settings 0, 1, 2, 3, 4, 5, 6, 7, and 8. The primary control output unit 2810 senses (or is provided with information about) the position of the control member 2808, and outputs a primary control output signal 2812 indicative of the position, at a particular one of the discrete throttle settings. The primary control output signal ranges in informational value/content in correspondence with the discrete throttle settings, e.g., the primary control output signal indicates the discrete throttle setting currently selected according to the position of the control member 2808. To the extent the control member 2808 may be positioned between the discrete throttle settings, this "in between" positioning is not captured by the primary control output unit and is not included in the primary control output signal. (For example, starting with the control member at a particular discrete throttle setting, it could be the case that the primary control output signal indicates that throttle setting until the control member is moved to and arrives at the next discreet throttle setting.)

The primary control output signal 2812 is communicated to an engine or other motive control unit 2814 of the vehicle 2802 (e.g., a control unit that controls one or more traction motors). The motive control unit 2814 is operably connected to a traction unit 2816, which may be an engine, one or more traction motors, a hybrid system, etc. The motive control unit 2814 generates a motive control signal 2818 as a function of the primary control output signal 2812 received from the primary throttle control 2804, for controlling an output level of the traction unit 2816. For example, when the primary control output signal 2812 is indicative of the control member 2808 being positioned at the minimum throttle setting, the motive control unit 2814 generates a motive control signal 2818 for controlling the traction unit to a lower output level (such as a minimum or other designated or previously set lower limit) or other first designated level. When the primary control output signal 2812 indicates another, higher throttle level, the motive control unit 2814 generates a motive control signal 2818 for controlling the traction unit to a higher level than the lower output level or other first designated level. The relationship between the primary throttle control 2804 and the motive control unit, across the entire accessible range of output levels of the traction unit 2816, is a step-wise function, differentiating the system from other systems where throttle level is selected continuously across a range, where the relationship between throttle selection and traction unit output is a ramp or curve-based function.

The primary throttle control 2804, and underlying functionality of the motive control unit 2814, may be an existing throttle control of the vehicle 2802. For example, such systems are found on some types of locomotives or other rail vehicles.

The incremental notch secondary throttle control 2806 includes a second manually adjustable control member 2820 and a secondary control output unit 2822, which is operably connected to the second control member 2820. The second manually adjustable control member 2820 includes two (first and second) switches, buttons, or other selectable control inputs 2824, 2826. The secondary control output unit 2822 senses when one of the control inputs 2824, 2826 is actuated, or is provided with an indication of when and which of the control inputs 2824, 2826 is actuated (e.g., pressing a control input may generate a designated electrical signal which is supplied to the secondary control output unit 2822). In response, the secondary control output unit 2822 outputs a secondary control output signal 2828 as a function of which control input 2824, 2826 was actuated, which is communicated to the motive control unit 2814.

How the motive control unit 2814 uses the secondary control output signal 2828 can vary depending on a desired operational configuration, but in an embodiment, the secondary control output signal 2828 is used as a basis for a more granular or incremental step-wise throttle selection in between the discrete throttle settings of the primary throttle control 2804. Thus, in the example shown in FIG. 28, the first control input 2824 is designated for adjusting a discrete throttle setting up by a positive adjustment factor or one-tenth (0.1) of the range separating adjacent discrete throttle settings in the primary throttle control 2804, and the second control input 2826 is designated for adjusting a discrete throttle setting down by a negative adjustment factor of one-tenth (0.1) of the range separating adjacent discrete throttle settings in the primary throttle control 2804. In operation, when one of the control inputs 2824, 2826 is actuated, information indicative of the control input having been actuated is supplied to the motive control unit 2814, by way of the secondary control output unit 2822 generating a secondary control output signal 2828 to that effect. In response, the motive control unit 2814 adjusts the motive control signal 2818 accordingly; that is, the motive control signal 2818 is a function of both the primary control output signal 2812 and the secondary control output signal 2828, with the gross output level of the fraction unit 2816 being based, in effect, on the primary control output signal 2812, but adjusted up or down based on the secondary control output signal 2828. For the adjustment, in a linear system, if the output level range of the traction unit is "X" (designated/minimum traction output to maximum available traction output), and the number of discrete throttle settings of the primary throttle control is "n", and the adjustment factor (assumed the same for both positive and negative in this example) is "y", then the percentage of total available traction output by which to adjust the output of the traction unit each time the second manually adjustable control member 2820 is actuated is=(X/n)·y. For example, if X is simply 100 (0 is minimum output and 100 maximum), and n=8 and y=0.1, as in the example of FIG. 28, then each time a control input 2824, 2826 is actuated, then traction unit output is reduced or increased, as applicable, by 1.25%.

For a locomotive vehicle with "n" discrete notch settings of the primary throttle control 2804, the secondary throttle control 2806 allows an operator to selectively adjust a currently selected notch level up or down by an adjustment factor of "y" (for symmetric positive and negative adjustments), or by adjustment factors of "y1" and "y2" in the case where the positive and negative adjustment factors, respectively, are not the same. Thus, for example, for a 0.1 adjustment factor available through the secondary throttle control 2806, each time a control input of the secondary throttle control 2806 is selected, the current notch setting is raised or lowered by 0.1; for a current notch setting of 7, for example, an operator actuating the first control input 2824 (corresponding to a 0.1 positive adjustment factor) would increase the notch level to 7.1, and actuating the second control input 2826 (corresponding to a 0.1 negative adjustment factor) would decrease the notch level to 6.9.

In an embodiment of the system 2800, actuation of the first manually adjustable control member 2808 to arrive at a next adjacent discrete throttle setting overrides the current output of the secondary throttle control 2806, such that the motive control signal 2818 is based solely on the primary control output signal 2812. For example, if the motive control signal 2818 currently reflects a throttle setting of 5.7, with the first manually adjustable control member 2808 being currently positioned at throttle setting 6 (meaning a downward/negative adjustment factor of 0.1 was applied three times), moving the first manually adjustable control member 2808 to throttle setting 7 would reset the motive control signal 2818 to reflect a 7 throttle setting, and moving the first manually adjustable control member 2808 to throttle setting 5 would reset the motive control signal 2818 to reflect a 5 throttle setting.

In an embodiment, the motive control signal 2818 cannot be set outside (above or below) its operational range, and actuating the secondary throttle control 2806 for a positive or negative adjustment, when the primary throttle control 2804 is at its maximum and designated/minimum levels, respectively, has no effect. For example, if the primary throttle control 2804 is set at a maximum notch or other throttle setting of 8, and the first control input 2824 (corresponding to a 0.1 positive adjustment factor) is actuated, this has no effect on the motive control signal 2818.

In an embodiment of the system 2800, information 2830 about the motive control signal 2818 (in effect, information about the primary control output signal 2812 as adjusted by the secondary control output signal 2828) is communicated over a communication channel from the vehicle 2802 to another vehicle in a consist that is not equipped with a secondary throttle control 2806. The other vehicle is controlled based on the information 2830, e.g., the information 2830 may be fed to a motive control unit 2814 of the other vehicle for outputting a motive control signal 2818 to control traction unit 2816 based on the information 2830.

As should be appreciated, embodiments of the system 2800 implement a secondary throttle control technique that confers more granular control of the throttle in a step-wise throttle system. Where "in between" traction output is desired, e.g., traction output that would be between existing discrete throttle settings, it eliminates the need to oscillate between the notches. The system will work by allowing an operator of a locomotive or other vehicle to increase a notch or other throttle setting by a measured increment.

In one aspect, the second manually adjustable control member 2820 of the secondary throttle control 2806 is implemented as, or as part of, a smart display (e.g., control touchscreen). Thus, "manually adjustable control member" means any functionality that allows an operator to select a control input, thereby including not only a button, switch, or other moveable control, but also software-based control selections. In another aspect, the secondary throttle control 2806 is implemented as a stand-alone box that allows an operator to increase a vehicle throttle setting by a designated increment between primary discrete throttle settings, with the stand-alone box being configured for use in retrofitting an existing vehicle throttle control system. Thus, in an embodiment, the system 2800 is implemented as a retrofit kit or assembly that includes: (i) the secondary throttle control 2806 housed in a small housing that can be attached to a vehicle dashboard or other support surface in a control cabin; (ii) a software and/or hardware module (e.g., set of computer instructions contained on a tangible medium) for replacing or augmenting the existing motive control unit 2814 of the vehicle to accept and function with secondary control output signals 2828; and (iii) optionally, cables, wires, or other functional conduits (including wireless conduits) for connecting the secondary throttle control 2806 to electrical power and to the motive control unit 2814, or at least the secondary throttle control 2806 is configured for accepting cables, wires, or other conduits for this purpose.

Although an adjustment factor of 0.1 is shown as an example in the drawings, other adjustment factors may be used instead. Additionally, the second manually adjustable control member 2820 may be configured to allow an operator to select different levels of positive and/or negative adjustment factors, such as 0.1 and 0.5 positive adjustment factors and 0.1 and 0.5 negative adjustment factors. Also, as noted, the positive and negative adjustment factors do not have to be the same.

An embodiment of the inventive subject matter relates to a vehicle control method. The vehicle control method comprises generating a primary control output signal based on a current operator selection of a first one of a plurality of designated discrete throttle settings of a primary throttle control. (An output level of a traction unit of the vehicle is step-wise controlled based at least in part on the primary control output signal.) The method further comprises generating a secondary control output signal based on operator actuation of a secondary throttle control. The secondary control output signal is indicative of (contains information indicating) a positive or negative adjustment of the first one of the plurality of designated discrete throttle settings by a designated amount that is less than an amount of throttle variance between adjacent ones of the plurality of designated discrete throttle settings. The method further comprises generating a motive control signal based on the primary control output signal and the secondary control output signal, and controlling the output level of the traction unit based on the motive control signal.

Figure 29:
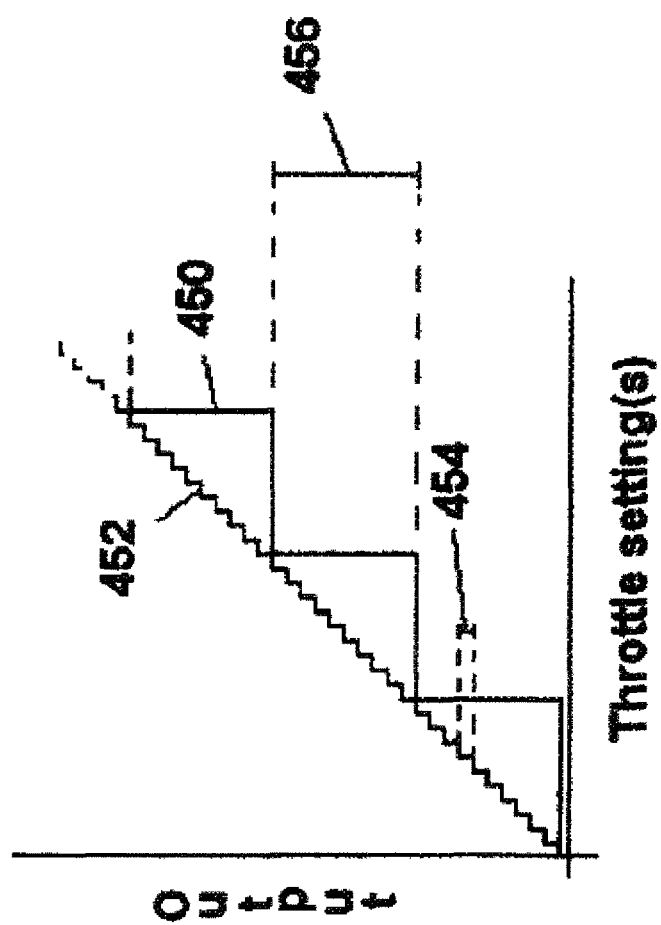
FIG. 29 is a graph of step-wise throttle settings, according to an embodiment.

With reference to FIGS. 28 and 29, an embodiment relates to a vehicle control method comprising controlling a traction unit of a vehicle as a first step-wise function 450 based on operator selection of any of a plurality of designated discrete throttle settings of a primary throttle control. The method further comprises controlling the traction unit as a second step-wise function 452 based on operator actuation of a secondary throttle control. The second step-wise function is indicative of a positive or negative adjustment of the designated discrete throttle settings by a designated amount 454 that is less than an amount 456 of throttle variance between adjacent ones of the plurality of designated discrete throttle settings.

An embodiment relates to a method for communicating data in a vehicle consist. The method comprises determining that a first electronic component in a first vehicle of a vehicle consist is in a failure state. (The vehicle consist comprises at least the first vehicle and a second vehicle, with each vehicle in the consist being adjacent to and mechanically coupled with one or more other vehicles in the consist.) In the failure state, the first electronic component is unable to perform a designated function of the first electronic component. Upon determining the failure state, first data is transmitted from the first vehicle to a second electronic component on the second vehicle, the first data being transmitted over a communication channel linking the first vehicle and the second vehicle. The method further comprises operating the second electronic component based on the first data, wherein the second electronic component performs the designated function that the first electronic component is unable to perform.

In one aspect of the method, the method comprises determining that a first electronic component in a first vehicle of the vehicle consist is in a failure state. First data is transmitted from the first vehicle to a second electronic component on a second vehicle of the vehicle consist; the first data is designated for the first electronic component, and is transmitted over a communication channel linking the first vehicle and the second vehicle. The method further comprises operating the second electronic component based on the first data, wherein the second electronic component is similar to the first electronic component. In an embodiment, the method further comprises transmitting return data from the second electronic component to the first vehicle over the communication channel, wherein the return data corresponds to a data format of the first electronic component, and wherein the return data is used by one or more third electronic components on the first vehicle.

An embodiment relates to a method for communicating data in a vehicle consist. The method comprises, for each vehicle of a plurality of vehicles in the vehicle consist: monitoring at least one electronic component in the vehicle to determine if the at least one electronic component has failed; and for each of the at least one electronic component determined to have failed: transmitting first data from the vehicle or a second vehicle in the consist to a similar electronic component in a third vehicle in the consist, the first data being designated for the electronic component determined to have failed, and the first data being transmitted over a communication channel linking vehicles in the vehicle consist; and transmitting return data from the similar electronic component to one of the vehicles in the consist, the return data being generated by the similar electronic component based on the first data. Each of the first data and the return data may be high bandwidth network data. Additionally, the method may further comprise identifying a network address of the similar electronic component, wherein the first data is transmitted based on the network address.

In an embodiment, the method further comprises periodically regularly automatically transmitting high bandwidth information about respective operations of each of at least one of the plurality of vehicles in the vehicle consist over the communication channel to a designated one of the plurality of vehicles.

An embodiment relates to a method for communicating data in a vehicle consist. The method comprises transmitting first data from a first vehicle in the consist to each of a second vehicle and a third vehicle in the consist, wherein the first data comprises non-network control information. The method further comprises initiating transmission of second data from the first vehicle to at least the third vehicle, wherein the second data comprises high bandwidth data and/or network data that at least partially overlaps the first data. If the second data is available to the third vehicle, the third vehicle is controlled based on the second data; otherwise, the third vehicle is controlled based on the first data. The method further comprises controlling the second vehicle based on the first data, wherein the second vehicle is a legacy vehicle incompatible with the second data. According to another aspect, the first data and the second data may be transmitted over a cable bus interconnecting the first, second, and third vehicles, with the first data being orthogonal to the second data.

In any of the embodiments set forth herein, data communicated to a vehicle in a vehicle consist may be used to control the vehicle for moving along a route, or otherwise for controlling a mechanical, electrical, or electro-mechanical system that is operated in relation to the vehicle moving along the route. That is, the data is received at the vehicle, and the vehicle is controlled, as relating to moving along the route, based on the informational content of the data.

In an embodiment, a method (e.g., for controlling operations of a vehicle consist) includes obtaining first data relating to operation of a first vehicle in the vehicle consist that includes the first vehicle and at least a second vehicle mechanically interconnected with each other in the vehicle consist. The first vehicle may or may not be the first vehicle in the consist along a direction of travel of the vehicle consist. The first and second vehicles are communicatively coupled with each other by a communication channel. The first vehicle includes a tangible and non-transitory first electronic component configured to perform one or more functions for the first vehicle using the first data. The method also includes communicating the first data over the communication channel from the first vehicle to a tangible and non-transitory second electronic component disposed onboard the second vehicle. The first data is communicated responsive to the first electronic component being unable to perform the one or more functions for the first vehicle using the first data. The method further includes performing the one or more functions of the first electronic component for the first vehicle with the second electronic component of the second vehicle. The one or more functions are performed by the second electronic component using the first data that is received from the first vehicle.

In one aspect, the first data is communicated from the first vehicle to the second electronic component of the second vehicle over a multiple unit (MU) cable bus that conductively couples the first electronic component with the second electronic component.

In one aspect, the method also includes determining that the first electronic component is in a failure state when the first electronic component is unable to perform the one or more functions. The first data is communicated to the second electronic component responsive to the first electronic component being determined to be in the failure state.

In one aspect, the first and second electronic components are a common type of electronic component and configured to perform the same one or more functions.

In one aspect, performing the one or more functions of the first electronic component with the second electronic component generates return data from the second electronic component. The method may further include communicating the return data to one or more tangible and non-transitory third electronic components disposed onboard the first vehicle for performing one or more control functions for control of the operation of the first vehicle.

In one aspect, the method also includes determining at least one of a vehicle separation distance or a component separation distance. The vehicle separation distance is representative of a distance between the first vehicle and the second vehicle. The component separation distance is representative of another, different distance between the first electronic component and the second electronic component. The method also includes modifying the first data using the at least one of the vehicle separation distance or the component separation distance prior to the second electronic component performing the one or more functions using the first data that is modified.

In one aspect, the first data represents location data indicative of a location of at least one of the vehicle consist or the first vehicle. Modifying the first data includes changing the location of the at least one of the vehicle consist or the first vehicle that is represented by the location data prior to the second electronic component performing the one or more functions to generate the return data.

In one aspect, the first data is communicated through the communication channel as high bandwidth network data and the communication channel is a conductive cable bus interconnecting the first vehicle and the second vehicle.

In one aspect, the first data is communicated over the communication channel that includes an existing electrical cable bus being used in the vehicle consist for transferring non-network control information between the first vehicle and the second vehicle.

In an embodiment, a system (e.g., a control system) includes a router transceiver unit (e.g., a second router transceiver unit) and an electronic component (e.g., a second electronic component). The second router transceiver unit is configured to be disposed onboard a second vehicle of a vehicle consist that includes the second vehicle and at least a first vehicle mechanically interconnected with each other in the vehicle consist. The first vehicle may or may not be the first vehicle in the consist along a direction of travel of the vehicle consist. The second router transceiver unit also is configured to be communicatively coupled with a first router transceiver unit disposed onboard the first vehicle by a communication channel. The second electronic component is configured to be disposed onboard the second vehicle and to be communicatively coupled with the second router transceiver unit. The second router transceiver unit also is configured to receive first data from the first vehicle over the communication channel responsive to a first electronic component of the first vehicle being unable to perform one or more designated functions of the first electronic component using the first data. The second electronic component is configured to perform the one or more functions of the first electronic component using the first data that is received by the second router transceiver unit.

In one aspect, the second electronic component is configured to receive the first data over a multiple unit (MU) cable bus that conductively couples the first electronic component with the second electronic component.

In one aspect, the second electronic component is configured to receive the first data for performing the one or more functions for the first vehicle responsive to determining that the first electronic component is in a failure state when the first electronic component is unable to perform the one or more functions.

In one aspect, the first and second electronic components are a common type of electronic component and configured to perform the same one or more functions.

In one aspect, the second electronic component is configured to generate return data from the performing the one or more functions using the first data. The second router transceiver unit is configured to communicate the return data to one or more tangible and non-transitory third electronic components disposed onboard the first vehicle for performing one or more control functions for control of the operation of the first vehicle.

In one aspect, the second electronic component is configured to obtain at least one of a vehicle separation distance or a component separation distance. The vehicle separation distance is representative of a distance between the first vehicle and the second vehicle. The component separation distance is representative of another, different distance between the first electronic component and the second electronic component. The second electronic component also is configured to modify the first data using the at least one of the vehicle separation distance or the component separation distance prior to the second electronic component performing the one or more functions using the first data that is modified.

In one aspect, the first data represents location data indicative of a location of at least one of the vehicle consist or the first vehicle. The second electronic component is configured to modify the first data by changing the location of the at least one of the vehicle consist or the first vehicle that is represented by the location data prior to the second electronic component performing the one or more functions to generate the return data.

In one aspect, the router transceiver unit is configured to receive the first data as high bandwidth network data communicated over a conductive cable bus interconnecting the first vehicle and the second vehicle.

In one aspect, the router transceiver unit is configured to receive the first data over the communication channel that includes an existing electrical cable bus being used in the vehicle consist for transferring non-network control information between the first vehicle and the second vehicle.

In an embodiment, a method (e.g, for controlling a vehicle consist) includes obtaining operational data related to operation of a vehicle consist that includes at least a first vehicle and a second vehicle mechanically interconnected with each other and processing the operational data using one or more first processors disposed onboard the first vehicle to generate first return data. The first vehicle may or may not be the first vehicle in the consist along a direction of travel of the vehicle consist. The first return data is usable to control upcoming operation of the vehicle consist. The method also includes, responsive to the one or more first processors entering a failure state where the one or more first processors can no longer process the operational data to generate the return data, communicating the operational data to one or more second processors disposed onboard the second vehicle. The method further includes processing the operational data using the one or more second processors disposed onboard the second vehicle to generate second return data. The second return data is usable to control upcoming operation of the vehicle consist.

In one aspect, the operational data is communicated to the one or more second processors through a multiple unit (MU) cable bus of the vehicle consist.

In the context of "communication link" or "linked by a communication channel," "link"/"linked" refers to both physical interconnections for communication (such as over a cable, wire, or other conductor) and to wireless communications, using radio frequency or other wireless technologies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and to enable a person of ordinary skill in the art to practice the embodiments of inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A system comprising:
a second router transceiver unit configured to be disposed onboard a second vehicle of a vehicle consist that includes the second vehicle and at least a first vehicle mechanically interconnected with each other in the vehicle consist, the second router transceiver unit configured to be communicatively coupled with a first router transceiver unit disposed onboard the first vehicle by a communication channel;
a second electronic component configured to be disposed onboard the second vehicle and to be communicatively coupled with the second router transceiver unit,
wherein the second router transceiver unit also is configured to receive first data from the first vehicle over the communication channel responsive to a first electronic component of the first vehicle being unable to perform one or more designated functions of the first electronic component using the first data,
wherein the second electronic component is configured to perform the one or more functions of the first electronic component using the first data that is received by the second router transceiver unit.

2. The system of claim 1, wherein the second electronic component is configured to receive the first data over a multiple unit (MU) cable bus that conductively couples the first electronic component with the second electronic component.

3. The system of claim 1, wherein the second electronic component is configured to receive the first data for performing the one or more functions for the first vehicle responsive to determining that the first electronic component is in a failure state when the first electronic component is unable to perform the one or more functions.

4. The system of claim 1, wherein the first and second electronic components are a common type of electronic component and configured to perform the same one or more functions.

5. The system of claim 1, wherein the second electronic component is configured to generate return data from the performing the one or more functions using the first data, and the second router transceiver unit is configured to communicate the return data to one or more tangible and non-transitory third electronic components disposed onboard the first vehicle for performing one or more control functions for control of the operation of the first vehicle.

6. The system of claim 5, wherein the second electronic component is configured to obtain at least one of a vehicle separation distance or a component separation distance, the vehicle separation distance representative of a distance between the first vehicle and the second vehicle, the component separation distance representative of another, different distance between the first electronic component and the second electronic component, the second electronic component also configured to modify the first data using the at least one of the vehicle separation distance or the component separation distance prior to the second electronic component performing the one or more functions using the first data that is modified.

7. The system of claim 6, wherein the first data represents location data indicative of a location of at least one of the vehicle consist or the first vehicle, and wherein the second electronic component is configured to modify the first data by changing the location of the at least one of the vehicle consist or the first vehicle that is represented by the location data prior to the second electronic component performing the one or more functions to generate the return data.

8. The system of claim 1, wherein the router transceiver unit is configured to receive the first data as high bandwidth network data communicated over a conductive cable bus interconnecting the first vehicle and the second vehicle.

9. The system of claim 1, wherein the router transceiver unit is configured to receive the first data over the communication channel that includes an existing electrical cable bus being used in the vehicle consist for transferring non-network control information between the first vehicle and the second vehicle.

* * * * *